(12) United States Patent
Araikum

(10) Patent No.: US 7,778,455 B2
(45) Date of Patent: Aug. 17, 2010

(54) METHOD OF AND SYSTEM FOR RECONSTRUCTING A DIGITAL OPTICAL IMAGE

(76) Inventor: Shawn Araikum, 102 Cranwell Hall, 311 Second Street, Killarney (ZA) 2193

( * ) Notice: Subject to any disclaimer, the term of this patent is extended or adjusted under 35 U.S.C. 154(b) by 942 days.

(21) Appl. No.: 11/568,045

(22) PCT Filed: May 18, 2005

(86) PCT No.: PCT/IB2005/001343

§ 371 (c)(1),
(2), (4) Date: Oct. 18, 2006

(87) PCT Pub. No.: WO2005/114549

PCT Pub. Date: Dec. 1, 2005

(65) Prior Publication Data

US 2009/0324029 A1      Dec. 31, 2009

(30) Foreign Application Priority Data

May 18, 2004   (ZA)   ................................. 2004/3808

(51) Int. Cl.
   *G06K 9/00*   (2006.01)
(52) U.S. Cl. ...................................... 382/131; 382/254
(58) Field of Classification Search ................. 382/128, 382/131, 132, 280, 254
See application file for complete search history.

(56) References Cited

U.S. PATENT DOCUMENTS

| 4,991,093 A | 2/1991 | Roberge et al. ......... 364/413.15 |
| 6,366,638 B1 | 4/2002 | Hsieh et al. ................... 378/19 |
| 2003/0215154 A1 | 11/2003 | Pauly et al. ................. 382/254 |

*Primary Examiner*—Andrew W Johns
(74) *Attorney, Agent, or Firm*—David A. Guerra

(57) ABSTRACT

According to a first aspect of the invention there is provided a system of and method for processing a digitized image derived from detector instrumentation (11) to form a reconstructed image. In a typical image processing system (9), γ-rays (10) impinge upon a gamma camera unit (11), defining detector instrumentation, and then pass through a lead collimator (12) to cause a scintillator (14) to emit light in the visible electromagnetic spectrum at given locations above an array of analogue photomultiplier tubes (16). With appropriate circuitry (18) these analogue signals may then be digitized, by means of processor (20), and then stored in memory (22). The present invention aims to more accurately reconstruct these digital images, with, in broad terms, the raw data stored in memory (22) being sent to a processor (24), which processes the data in terms of algorithms that form part of the invention. According to a further aspect of the invention there is provided a method of processing a digitized phantom image derived from detector instrumentation to form a reconstructed point spread function image.

20 Claims, 43 Drawing Sheets pixel value pixel value

METHOD OF AND SYSTEM FOR RECONSTRUCTING A DIGITAL OPTICAL IMAGE

CROSS-REFERENCE TO RELATED APPLICATIONS

This application is a U.S. national phase application under 35 U.S.C. §371 based upon co-pending International Application No. PCT/IB2005/001343 filed on May 18, 2005. Additionally, this U.S. national phase application claims the benefit of priority of co-pending International Application No. PCT/IB2005/001343 filed on May 18, 2005 and South Africa Application No. 2004/3808 filed on May 18, 2004. The entire disclosures of the prior applications are incorporated herein by reference. The international application was published on Dec. 1, 2005 under Publication No. WO 2005/114549 A3.

FIELD OF THE INVENTION

THIS invention relates to a method of and system for reconstructing a digital optical image that has been degraded in some physically known or deducible manner as a consequence of imaging hardware instrumentation limitation.

Specific embodiments of the present invention are presented for nuclear medicine diagnostic gamma ray ($\gamma$) imaging. However, the invention can be applied to other areas of medical imaging and broader scientific pursuits wherein intrinsic point spread responses are obtainable, for example, from:

(i) X-ray beam calibrations as required of computed tomographic (CT) and conventional radiographic modalities (e.g. mammography). Any improvement in image resolution to enhance tumour detection rates embodies a vital diagnostic component of medical systems.

(ii) Ultrasonic transducers. Accurate echo ultrasonic measurements of cardiac wall thickness, for example, are key to treatments and diagnosis of left-ventricular hypertrophy.

(iii) Magnetic resonance imaging (MRI) units. Such technique as dependent upon magnetic field stimulation and radio-frequency (RF) detection characteristics could also conceivably benefit from digital signal enhancements.

(iv) Optical and nuclear mass spectrometers as deployed in the basic sciences.

(v) Patient pixel regions-of-interest (ROI) derived from nuclear medicine dynamic scintigraphy. Such measurements, wherein blood activity is captured as time-activity histogram of ROI measurements over heart left ventricle, for example, provide temporal point spread histograms for blood transport to peripheral organs of interest.

(vi) Field spectrometers and instrumentation such as are required for portable geophysical measurements.

(vii) Remote sensing hardware and instrumentation. Such hardware, as is required for inter satellite communications, comprising receiving-transmitting relay station networks amongst other electronic instrumentation, is also sensitive to degradation from electronic and other sources of noise.

(viii) Radio and conventional optical astronomical telemetry arrays containing antennae and CCD, inter alia. Here effects of the ionosphere, electronic noise and extraneous terrestrial sources of interference also necessitate signal reconstructions.

BACKGROUND OF THE INVENTION

In the field of in vivo medical imaging, diagnostic specificities and therapeutic dosing efficacies are paramount. This is because the best available diagnostic information is prerequisite to optimal patient treatment planning.

A limitation of patient scintigraphic imaging refers to $\gamma$-radiation collimation that is necessary for an orthogonal planar image to be formed. Such collimation is never perfect since $\gamma$-emission is only ever exponentially attenuated. Collimators in routine clinical practice having thicker septa lack sensitivity, whereas those of thinner septal thickness lack spatial resolution. Therefore the fundamental limitation of, for example, a point source being imaged as having greater physical extent than it really has, endures. This effect clearly impacts the accuracy of quantitative digital signals from in vivo radiopharmaceutical imaging. Each pixel measurement of orthogonal projection of radiopharmaceutical within a given patient of interest therefore has counts detected belonging to adjacent pixels. Hence the problem under scrutiny and the invention now advanced.

FIG. 1(a) clearly shows an image processing system 9 in which the problem described above is highlighted, wherein $\gamma$-rays 10 impinge upon a gamma camera unit 11, defining detector instrumentation, passes through a lead collimator 12 and causes a scintillator 14 to emit light in the visible electromagnetic (EM) spectrum at given locations above an array of analogue photomultiplier tubes (PMT) 16. With appropriate position location, timing and other circuitry 18 these analogue signals may then be conditioned, digitized, binned over a predetermined counting interval, by means of processor 20, and stored in memory and hard drive locations 22. FIG. 1(b) depicts a point spread function measured at a resolution of 128×128 pixels square, which shows the exaggerated extent of a point source whose physical diameter was <1 mm. In particular, the measured point spread function was done at a resolution of 128×128 pixels square with a pinpoint source of Technetium-99m radionuclide isotope (Tc-99m) at approximately 30 mm from the gamma camera surface. The full width at half maximum of this distribution was approximately 2 pixels. The quoted spatial resolution places 1 pixel as being 3×3 mm$^2$, and thus provides a good indication as to exaggeration of the diameter of the point source. Furthermore in current commercial modalities where collimation is either not applied or selectively applied using a pre-selected detector aperture width (e.g. computed tomography and positron emission scanners), the applicability of the invention is equally, if not more, relevant as the well-known Lorentzian point spread distribution of source counts at detector must then equivalently be corrected for.

Numerous methods have to date been devised to reconstruct digital images that have been degraded in the manner described above. A subset of these methods, as with the present invention, are confined to linear, space invariant restorations subject to an entropic class of nonlinear functionals. This is described in more detail in the following two papers:

Gull S F and Daniell G J (1978). "Image reconstruction from incomplete and noisy data" *Nature* 272, 686-690.

Gull S F and Skilling J (1984). "Maximum entropy image reconstruction" *IEEE Proc* 131F, 646-659.

Generally, another analytically simpler subset of restorations comprising the following exclusively linear functionals have been studied:

$$J(f) = \|Qf\|^2 + \lambda(\|g - Hf\|^2 - \|n_\alpha\|^2) \quad (1)$$

where:
- f is the image reconstruction of the measured signal g when blurring is accounted for by H, a linear operator further wherein f(x,y), g(x,y) and h(x,y) are respectively, the functions from which the latter are constructed;
- λ is a Lagrange multiplier typically minimizing the least square deviation of residual, g-Hf, from noise signal $n_o$, at which minimum value the optimal reconstruction designated $f^{opt}$ results;
- Q is a linear matrix operator chosen for smoothing characteristics.

The above is described in more detail in the text entitled "Digital Image Processing" by Gonzalez R C and Wintz P, Addison-Wesley Reading, Massachusetts (1977).

For the purposes of this invention, Equation 1 can be reformulated in to the following general expressions:

$$J(f) = S + \lambda_0 \left[ \|\sigma^{-1}(g - Hf)\|^2 - \|n_\sigma\|^2 \right] + \\ \lambda_0 \left[ L^{asym} - \|n_{asym}\|^2 \right] + \lambda_1 \left[ \Gamma_0 - \sum_{ij} f_{ij} \right] + \lambda_2 \left[ \Gamma_0 - \sum_{ij} m_{ij} \right] \quad (2a)$$

$$J(f) = S + \lambda_0 \left[ \|g - Hf\|^2 - \|n\|^2 \right] + \lambda_1 \left[ \Gamma_0 - \sum_{ij} f_{ij} \right] + \lambda_2 \left[ \Gamma_0 - \sum_{ij} m_{ij} \right] \quad (2b)$$

Where Equation 2(b) is a special case of Equation 2(a) when the variance matrix $\sigma^{-2}$ is set equal to I and asymmetric $L^{asym}$ statistics omitted. Here S is the total reconstructed image entropy, a function of S(x,y) the reconstructed image entropy distribution represented as image vector $[S_{ij}]$ and $\Gamma_0$ is the original image total photon count value. The corresponding exact or primordial entropy is given by the following equation:

$$S \equiv \sum_{ij} S_{ij} = \sum_{ij} \log_e f_{ij}! - f_{ij}\log_e m_{ij}$$

However, to date this exact equation has not been used, primarily because of the apparent computational complexities involved when dealing with the factorials of large numbers. Thus, conventionally an approximation, called Stirling's approximation, of the primordial entropy is used, which is called the historic mathematician's entropy and is given by the following expression:

$$S \equiv \sum_{ij} S_{ij} = \sum_{ij} f_{ij}\log_e \left(\frac{f_{ij}}{m_{ij}}\right)$$

subject to some statistical measure $m_{ij}$ represented by an image vector m. The $\lambda_1$ and $\lambda_2$ are the Lagrange multipliers delegated for normalization of f and m respectively. The variational terms on the $\lambda_0$ in Equation 2(a) are proportional to the natural logarithm of the image data probability distribution P(x,y), represented as an image vector $[P_{ij}]$, designated L(x,y) and represented as an image vector $[L_{ij}]$. To highlight the normal statistic the first term in $\lambda_0$ encompasses such contribution. $L^{asym}$ is the partition representing higher order, asymmetric contributions to L(x,y) whose terms can be made an explicit function of Lagrange multiplier. The latter is achieved from Taylor series analysis of L(x,y) in the vicinity of optimal reconstruction $g^{opt}=Hf^{opt}$ of g. To further generalize the variational problem it follows that assignment of a single multiplier $\lambda_0$ can be extended by assigning multipliers to each image pixel by constructing the diagonal matrix representation $\Lambda_0 = [\lambda_{ij}]_{diagonal}$ where $\lambda_{ij}$ corresponds to the (ij)$^{th}$ image pixel, typical application of which is described later in the specification.

Furthermore, current use of historical entropy invokes statistical marginalization and regularization procedures which additionally reduce accuracy, particularly for high frequency imaging where count densities are typically lower and images more diffuse. This is described in more detail in the following two papers:

Gull S F (1989). "Developments in maximum entropy data analysis" *Maximum entropy and Bayesian Methods* ed. Skilling J Kluwer, Dordrecht. This document will be referred to later on in the specification as paper P1.

Skilling J and Bryan R K (1984). "Maximum entropy image reconstruction: general algorithm" *Mon. Not. R. Astr. Soc.* 211, 111-124. This document will be referred to later on in the specification as paper P2.

Exemplary applications of regularization, in stabilizing data reconstruction, is provided by Tikhonov A N and Arsenin V Y (1977), "Solutions of Ill-Posed problems" Halsted Press, New York, wherein extra terms are added to the functional J in Equations 2(a) and 2(b). This document will be referred to later on in the specification as paper P3.

Descriptions of statistical marginalization of the Lagrange multiplier and approximations that are the technique may be found in a paper entitled "Developments in maximum entropy data analysis" by Gull S F (1989) in Maximum entropy and Bayesian Methods ed. Skilling J, Kluwer, Dordrecht wherein the problem is reported to be a function of the number of good data (pixel) measurements. Further algorithmic details and refinements to this technique appear in a paper entitled "Maximum entropy image reconstruction: general algorithm" by Skilling J and Bryan R K (1984) in *Mon. Not. R. Astr. Soc* 211, 111-124. A competitive advantage claimed by the present invention, as will become clearer further on in the specification, is that its algorithm and methodology are stable and 100% inclusive of:

(i) each individual datum collected and described here; and (ii) every relevant measurement conducted in broader field-testings of the invention to date;

providing in addition improved accuracy at low count densities as demonstrated by FIGS. 6(a) to 6(d).

In view of the difficulties reported in Papers P1 to P3, and whereas no practical implementation exists for this problem, a niche presents for accurate, high fidelity and timeous, on-site mathematical reconstructions which obviate, the blurring effect of collimation, whilst simultaneously accounting for statistical noise.

SUMMARY OF THE INVENTION

According to a first aspect of the invention there is provided a method of processing a digitized image derived from detector instrumentation to form a reconstructed image comprising the steps of:

(S1) obtaining the digitized image from an image measuring system comprising the detector instrumentation, and representing the image as a raw image function g(x,y);

(S2) obtaining for the system a point spread function h(x, y);

(S3) selecting an analytical form for the reconstructed image entropy distribution S(x,y), a function of statistical measure m(x,y), represented by its image vector $[S_{ij}]$ wherein the following equivalent forms for the total reconstructed image entropy, $$S = \int_\Omega dxdy\, S(x,y)\; x,y \in \Omega \text{ and } S = \sum_{ij} S_{ij}$$

are used;

(S4) selecting a set of Lagrange multipliers $\lambda(x,y)$ represented by image vector $\lambda=[\lambda_{ij}]$ and constructing a diagonal matrix representation $\Lambda_0=[\lambda_{ij}]_{diagonal}$ from said image vector components;

(S5) calculating a variance statistic $\sigma^{-2}$ for normal quadratic statistics and an asymmetric statistic $L^{asym}(\Lambda_0)$ for statistical analysis beyond said normal statistics;

(S6) selecting the statistical measure $m(x,y)$ represented by an image vector $m=[m_{ij}]$;

(S7) producing a reconstructed image function $f(x,y)$ using the following restoration equation wherein an iterative process is repeated until the successive change in $f(x,y)$ is smaller than a user defined tolerance:

$$\nabla S = 2WD^*W^{-1}\Lambda_0\sigma^{-2}\Lambda_0(g-WDW^{-1}f)-\nabla L^{asym}(\Lambda_0)$$

further wherein $W^{-1}$ and $W$ denote Fourier transform and Fourier inverse transform matrix operators respectively, $D$ is a diagonal matrix representation of the point spread function $h(x,y)$, $g=[g_{ij}]$ and $f=[f_{ij}]$ are the vector representations of the unprocessed and normalized reconstructed images $g(x,y)$ and $f(x,y)$ respectively and $\Lambda$ the gradient operator over the vector field of f represented by the vector $[\partial/\partial f_{ij}]$ and * is the complex conjugation operator; and (S8) iteratively repeating steps (S3), (S4), (S5), (S6) and (S7) to determine values for Lagrange multipliers $\lambda(x,y)$ which optimize the cumulated probability $P^c$ of data reconstruction $g^{recon}(x,y)$, represented as an image vector $g^{recon}=[g_{ij}^{recon}]$ and defined as $h(x,y)$ convoluted with $f(x,y)$, matching $g(x,y)$ further wherein $g^{opt}(x,y)$ represented by image vector $g^{opt}=[g_{ij}^{opt}]$ is the optimum data reconstruction vector at which values said probability is maximal.

In one version, the historical entropy:

$$S \equiv \sum_{ij} S_{ij} = \sum_{ij} f_{ij}\log_e\left(\frac{f_{ij}}{m_{ij}}\right)$$

is selected and represented in the restoration equation by the following image vector elements: $\nabla S=[\log_e f_{ij}-\log_e m_{ij}+1]$.

Alternatively, the primordial entropy:

$$S \equiv \sum_{ij} S_{ij} = \sum_{ij} \log_e f_{ij}! - f_{ij}\log_e m_{ij}$$

is selected and represented in the restoration equation by the following image vector elements:

$$\nabla S = \left[\sum_{k=0}^{\Phi-1\geq 0} \frac{1}{f_{ij}-k} + \frac{1}{\rho!}\int_0^\infty dx e^{-x}x^\rho \log_e x - \log_e m_{ij}\right]k,\; \Phi \in Z\; \rho \in R.$$

Whereas the more discriminating Lagrange multiplier selections can comprise, for example, the steps of:

Initially selecting $\Lambda_0=\lambda_0 I$ wherein the equivalent restoration equation is:

$$\nabla S=2\lambda_0 WD^*W^{-1}\sigma^{-2}(g-WDW^{-1}f)-\nabla L^{asym}(\Lambda_0)$$

and;

subsequently selecting $\Lambda_0=[\lambda_{ij}]_{diagonal}$ for said restoration equation;

either step applied in isolation comprises a legitimate selection of Lagrange multipliers, as would those from any of a number of gradient search techniques.

Accordingly, the statistical measure $m(x,y)$ is set to the following normalized first-order approximation of the entropy functional:

$$m(x,y) = \mathcal{F}^{-1}\left\{\frac{2\lambda(x,y)H^*(u,v)G(u,v)}{2\lambda(x,y)|H(u,v)|^2+1}\right\}$$

wherein $\mathcal{F}^{-1}$ represents the inverse Fourier transform operation and $H(u,v)$ and $G(u,v)$ denote the Fourier transforms of $h(x,y)$ and $g(x,y)$, respectively.

Generally, the image data probability distribution $P(x,y)$, represented as an image vector $[P_{ij}]$, of each data reconstruction $g^{recon}(x,y)$ is set to the following equivalent forms for all convergent sets of $\lambda(x,y)$:

$$P(x,y)=\exp(-S(x,y)-L(x,y))$$

and $$P_{ij}=\exp(-S_{ij}-L_{ij})$$

further wherein the equivalent forms for cumulated probability are:

$$P^c = \exp\left(\int_\Omega dxdy\{-S(x,y)-L(x,y)\}\right) x,y \in \Omega \text{ and}$$

$$P^c = \exp\left(\sum_{ij} -S_{ij}-L_{ij}\right)$$

wherein the natural logarithm of the data probability distribution proportional to $L(x,y)$ is a function of the components of $g$ and $g^{recon}$ represented furthermore as $L$ in its Taylor series expansion at $g^{opt}$ and by its image vector $[L_{ij}]$.

Preferably, the natural logarithm of $1/P^c$ is set to either:

the following sum squared of residuals $(g-g^{recon})^T(g-g^{recon})$; or the following chis-squared quantity $(g-g^{recon})^T[1/g_{ij}]_{diagonal}(g-g^{recon})$;

wherein $[1/g_{ij}]_{diagonal}$ is a diagonal matrix constructed from the elements of $g$ and the superscripted T denotes the row-column transposition operation.

In each optimization of the primordial entropy an optimal recursion equation for each specified $f_{ij}$ is selected by computing a correspondingly unique integer $\Phi$ and a fractional remainder $\rho$ pair to satisfy $0<\rho=f_{ij}-\Phi<1$.

Typically, the step of obtaining a point spread function $h(x,y)$ for the image measuring system comprises the steps of:

suspending a radioisotope point source above the detector instrumentation of the image measuring system; and generating a digitized planar point spread function image from the image measuring system for selected co-ordinates of the radioisotope point source relative to the detector instrumentation.

Preferably, either a mean value of h(x,y) is computed and used in the restoration equation, or location dependent point spread functions h(x,y) are used in the restoration equation.

For the analysis of static scenes the method comprises obtaining a set of M multiple digitized planar images g wherein each said image is distinguished by the vector sequencing notation $g_k$, with k ranging from 1 to M.

Typically, the normal variance statistic $\sigma^{-2}$ is computed in any one of the following ways:

from $$\sigma^{-2} = \left[\frac{1}{M}\sum_{k=1}^{M}(g_k - \bar{g})(g_k - \bar{g})^T\right]^{-1}, \bar{g} = \frac{1}{M}\sum_{k=1}^{M}g_k$$

for a static scene wherein the superscripted T denotes row-column transposition;

from $\sigma^{-2}=[(g-g^{recon})(g-g^{recon})^T]^{-1}$ wherein the superscripted T denotes row-column transposition;

from diagonal matrix $\sigma^{-2}=[1/g_{ij}]_{diagonal}$;

from $\sigma^{-2}=I$ the identity matrix; or from $\sigma^{-2}=I$ further wherein the particular selection of Lagrange multipliers given above provides the following for the restoration equation:

$\Im\{\nabla S\}=2\lambda_{ij}\{H^*(u,v)G(u,v)-H(u,v)|^2F(u,v)\}$ wherein $\Im$ represents the Fourier transform operation and H(u,v), G(u,v) and F(u,v) denote the Fourier transforms of h(x,y), g(x,y) and f(x,y) respectively.

Preferably, the method selects:

an integer value of $r \geq 3$ prior to computing:

$$\nabla L^{asym}(\Lambda_0) = \left[\sum_{n=3}^{r}\frac{\nabla}{n!}\left[\sum_{ij}\lambda_{ij}(g_{ij}-g_{ij}^{recon})\left\{\frac{\partial}{\partial g_{ij}^{recon}}\right\}_{g_{ij}^{opt}}\right]^n L + \nabla R_n\right]$$

wherein $R_n$ is a remainder term used for error assessment when the topology of L is asymmetric with respect to $g^{recon}$ in the vicinity of $g^{opt}$; or the solution $\nabla L^{asym}=0$ when the topology of L is predominantly symmetric with respect to $g^{recon}$ in the vicinity of $g^{opt}$.

In each solution sought from the optimal recursion equation selected for primordial entropy of each $f_{ij}$, gradient search methods incorporating the Laplacian of entropy, namely:

$$\nabla^2 S = -\phi^2(f_{ij}) + \sum_{k=0}^{\Phi-1\geq 0}\frac{2\phi(f_{ij}-k-1)}{f_{ij}-k} + \frac{1}{\rho!}\int_0^{\infty}dxe^{-x}x^\rho(\log_e x)^2$$

wherein:

$$\phi(f_{ij}) = \sum_{k=0}^{\Phi-1\geq 0}\frac{1}{f_{ij}-k} + \frac{1}{\rho!}\int_0^{\infty}dxe^{-x}x^\rho\log_e x \ k, \Phi \in Z \ \rho \in R.$$

are used.

Consequently, the following integrals:

$$\frac{1}{\rho!}\int_0^{\infty}dxe^{-x}x^\rho\log_e x = \frac{1}{\rho!}\int_0^1 dy(\log_e y^{-1})^\rho\log_e\{\log_e y^{-1}\} \text{ and:}$$

$$\frac{1}{\rho!}\int_0^{\infty}dxe^{-x}x^\rho(\log_e x)^2 = \frac{1}{\rho!}\int_0^1 dy(\log_e y^{-1})^\rho[\log_e\{\log_e y^{-1}\}]^2$$

are calculated using interpolating coefficients derived from numerical values of said integrals computed on a pre-selected range of $\rho$ values, the latter-mentioned coefficients and integral values being computed prior to the preceding steps defined above.

Optionally, the statistical measure m is set equal to the reconstructed image $f=[f_{ij}]$ prior to the method being repeated.

According to a second aspect of the invention there is provided a machine-readable medium comprising instructions which, when executed by a machine, cause the machine to perform the method defined above.

According to a third aspect of the invention there is provided a computer which, when configured causes the execution of the method defined above.

According to a fourth aspect of the invention there is provided a method of processing a digitized phantom image derived from detector instrumentation to form a reconstructed point spread function image comprising the steps of:

(S1) obtaining the digitized phantom image from an image measuring system comprising the detector instrumentation, and representing the image as a raw image function g(x,y);

(S2) producing a digital image function f(x,y) of a calibration phantom;

(S3) selecting an analytical form for the reconstructed image entropy distribution S(x,y), a function of statistical measure m(x,y), represented by its image vector $[S_{ij}]$ wherein the following equivalent forms for the total reconstructed image entropy, $$S = \int_\Omega dxdy S(x,y)x, y \in \Omega \text{ and } S = \sum_{ij}S_{ij}$$

are used;

(S4) selecting a set of Lagrange multipliers $\lambda(x,y)$ represented by image vector $\lambda=[\lambda_{ij}]$ and constructing a diagonal matrix representation $\Lambda_0=[\lambda_{ij}]_{diagonal}$ from said image vector components;

(S5) calculating a variance statistic $\sigma^{-2}$ for normal quadratic statistics and an asymmetric statistic $L^{asym}(\Lambda_0)$ for statistical analysis beyond said normal statistics;

(S6) selecting the statistical measure m(x,y) represented by an image vector $m=[m_{ij}]$;

(S7) producing a reconstructed point spread image function h(x,y) using the following restoration equation wherein an iterative process is repeated until the successive change in h(x,y) is smaller than a user defined tolerance:

$\nabla S = 2WD^*W^{-1}\Lambda_0\sigma^{-2}\Lambda_0(g-WDW^{-1}h)-\nabla L^{asym}(\Lambda_0)$ wherein $W^{-1}$ and W denote Fourier transform and Fourier inverse transform matrix operators respectively, D is a diagonal matrix representation of the calibration phantom image f(x,y), g=[$g_{ij}$] and h=[$h_{ij}$] are the vector representations of the unprocessed and normalized reconstructed point spread function images g(x,y) and h(x,y) respectively, $\nabla$ is the gradient operator over the vector field of h represented by the vector [$\partial/\partial h_{ij}$] and * is the complex conjugation operator; and (S8) iteratively repeating steps (S3), (S4), (S5), (S6) and (S7) to determine values for Lagrange multipliers $\lambda(x,y)$ which optimize the cumulated probability $P^c$ of data reconstruction $g^{recon}(x,y)$, represented as an image vector $g^{recon}=[g_{ij}^{recon}]$ and defined as h(x,y) convoluted with f(x,y), matching g(x,y) further wherein $g^{opt}(x,y)$ represented by image vector $g^{opt}=[g_{ij}^{opt}]$ is the optimum data reconstruction vector at which values said probability is maximal.

In one version, the historical entropy:

$$S \equiv \sum_{ij} S_{ij} = \sum_{ij} h_{ij} \log_e\left(\frac{h_{ij}}{m_{ij}}\right)$$

is selected and represented in the restoration equation by the following image vector elements: $\nabla S = [\log_e h_{ij} - \log_e m_{ij} + 1]$.

Alternatively, the primordial entropy:

$$S \equiv \sum_{ij} S_{ij} = \sum_{ij} \log_e h_{ij}! - h_{ij} \log_e m_{ij}$$

is selected and represented in the restoration equation by the following image vector elements:

$$\nabla S = \left[\sum_{k=0}^{\Phi-1\geq 0} \frac{1}{h_{ij}-k} + \frac{1}{\rho!}\int_0^\infty dx e^{-x} x^\rho \log_e x - \log_e m_{ij}\right] k, \Phi \in Z \; \rho \in R.$$

Whereas the more discriminating Lagrange multiplier selections can comprise, for example, the steps of:

initially selecting $\Lambda_0 = \lambda_0 I$ wherein the equivalent restoration equation is:

$$\nabla S = 2\Lambda_0 WD^*W^{-1}\sigma^{-2}(g-WDW^{-1}h) - \nabla L^{asym}(\Lambda_0)$$

and;

subsequently selecting $\Lambda_0 = [\lambda_{ij}]_{diagonal}$ for said restoration equation;

either step applied in isolation comprises a legitimate selection of Lagrange multipliers, as would those from any of a number of gradient search techniques.

Accordingly, the statistical measure m(x,y) is set to the following normalized first-order approximation of the entropy functional:

$$m(x,y) = \mathfrak{S}^{-1}\left\{\frac{2\lambda(x,y)F^*(u,v)G(u,v)}{2\lambda(x,y)|F(u,v)|^2+1}\right\}$$

wherein $\mathfrak{S}^{-1}$ represents the inverse Fourier transform operation and F(u,v) and G(u,v) denote the Fourier transforms of f(x,y) and g(x,y), respectively.

Generally, the image data probability distribution P(x,y), represented as an image vector [$P_{ij}$], of each data reconstruction $g^{recon}(x,y)$ is set to the following equivalent forms for all convergent sets of $\lambda(x,y)$:

$$P(x,y) = \exp(-S(x,y) - L(x,y))$$

and $$P_{ij} = \exp(-S_{ij} - L_{ij})$$

further wherein the equivalent forms for cumulated probability are:

$$P^c = \exp\left(\int_\Omega dx dy\{-S(x,y)-L(x,y)\}\right) x,y \in \Omega \text{ and}$$

$$P^c = \exp\left(\sum_{ij} -S_{ij} - L_{ij}\right)$$

wherein the natural logarithm of the data probability distribution proportional to L(x,y) is a function of the components of g and $g^{recon}$ represented furthermore as L in its Taylor series expansion at $g^{opt}$ and by its image vector [$L_{ij}$].

Typically, the natural logarithm of $1/P^c$ is set to either:

the following sum squared of residuals $(g-g^{recon})^T (g-g^{recon})$; or the following chis-squared quantity $(g-g^{recon})^T [1/g_{ij}]_{diagonal}(g-g^{recon})$;

wherein $[1/g_{ij}]_{diagonal}$ is a diagonal matrix constructed from the elements of g and the superscripted T denotes the row-column transposition operation.

In each optimization of the primordial entropy an optimal recursion equation for each specified $h_{ij}$ is selected by computing a correspondingly unique integer $\Phi$ and fractional remainder $\rho$ pair to satisfy $0 < \rho = h_{ij} - \Phi < 1$.

For the analysis of static scenes the method comprises obtaining a set of M multiple digitized planar images g wherein each said image is distinguished by the vector sequencing notation $g_k$, with k ranging from 1 to M.

Typically, the normal variance statistic $\sigma^{-2}$ is computed in any one of the following ways:

from $$\sigma^{-2} = \left[\frac{1}{M}\sum_{k=1}^M (g_k - \bar{g})(g_k-\bar{g})^T\right]^{-1}, \bar{g} = \frac{1}{M}\sum_{k=1}^M g_k$$

for a static scene wherein the superscripted T denotes row-column transposition;

from $\sigma^{-2} = [(g-g^{recon})(g-g^{recon})^T]^{-1}$ wherein the superscripted T denotes row-column transposition;

from diagonal matrix $\sigma^{-2} = [1/g_{ij}]_{diagonal}$;

from $\sigma^{-2} = I$ the identity matrix; or from $\sigma^{-2} = I$ further wherein the particular selection of Lagrange multipliers given above provides the following for the restoration equation:

$$\mathfrak{S}\{\nabla S\} = 2\lambda_{ij}\{F^*(u,v)G(u,v) - |F(u,v)|^2 H(u,v)\}$$

wherein $\mathfrak{S}$ represents the Fourier transform operation and H(u,v), G(u,v) and F(u,v) denote the Fourier transforms of h(x,y), g(x,y) and f(x,y) respectively.

Preferably, the method selects:

an integer value of $r \geq 3$ prior to computing:

$$\nabla L^{asym}(\Lambda_0) = \left[ \sum_{n=3}^{r} \frac{\nabla}{n!} \left[ \sum_{ij} \lambda_{ij}(g_{ij} - g_{ij}^{recon}) \left\{ \frac{\partial}{\partial g_{ij}^{recon}} \right\}_{g_{ij}^{opt}} \right]^n L + \nabla R_n \right]$$

wherein $R_n$ is a remainder term used for error assessment when the topology of L is asymmetric with respect to $g^{recon}$ in the vicinity of $g^{opt}$; or the solution $\nabla L^{asym}=0$ when the topology of L is predominantly symmetric with respect to $g^{recon}$ in the vicinity of $g^{opt}$.

In each solution sought from the optimal recursion equation selected for primordial entropy of each $h_{ij}$, gradient search methods incorporating the Laplacian of entropy, namely:

$$\nabla^2 S = -\phi^2(h_{ij}) + \sum_{k=0}^{\Phi-1 \geq 0} \frac{2\phi(h_{ij}-k-1)}{h_{ij}-k} + \frac{1}{\rho!} \int_0^\infty dx e^{-x} x^\rho (\log_e x)^2$$

wherein:

$$\phi(h_{ij}) = \sum_{k=0}^{\Phi-1 \geq 0} \frac{1}{h_{ij}-k} + \frac{1}{\rho!} \int_0^\infty dx e^{-x} x^\rho \log_e x \; k, \Phi \in Z \; \rho \in R$$

are used.

Consequently, the following integrals:

$$\frac{1}{\rho!} \int_0^\infty dx e^{-x} x^\rho \log_e x = \frac{1}{\rho!} \int_0^1 dy (\log_e y^{-1})^\rho \log_e \{\log_e y^{-1}\} \text{ and:}$$

$$\frac{1}{\rho!} \int_0^\infty dx e^{-x} x^\rho (\log_e x)^2 = \frac{1}{\rho!} \int_0^1 dy (\log_e y^{-1})^\rho [\log_e \{\log_e y^{-1}\}]^2$$

are calculated using interpolating coefficients derived from numerical values of said integrals computed on a pre-selected range of $\rho$ values, the latter-mentioned coefficients and integral values being computed prior to the preceding steps defined above.

Optionally, the statistical measure m is set equal to the reconstructed point spread function image $h=[h_{ij}]$ prior to the method being repeated.

Integral to producing a reconstructed point spread image function of an x-ray emitting computed tomography scanner, an adipose equivalent radiographic calibration Perspex phantom of 20 mm×250 mm×250 mm dimension is imaged to produce a digitized raw image function g(x,y).

According to a fifth aspect of the invention there is provided a machine-readable medium comprising instructions which, when executed by a machine, cause the machine to perform the method defined above.

According to a sixth aspect of the invention there is provided a computer which, when configured causes the execution of the method defined above.

According to a seventh aspect of the invention there is provided an image measuring system for processing a digitized image to form a reconstructed Image comprising:
  detector instrumentation for generating:
    a raw image function g(x,y) represented by an image vector $g=[g_{ij}]$; and
    a point spread function h(x,y) represented by an image vector $h=[h_{ij}]$;
  a processor configured to process said image vector g and said point spread function image vector h by performing the steps of:
    (S1) selecting an analytical form for the reconstructed image entropy distribution S(x,y), a function of statistical measure m(x,y), represented by its image vector $[S_{ij}]$ wherein the following equivalent forms for the total reconstructed image entropy, $$S = \int_\Omega dx dy \, S(x,y) \; x, y \in \Omega \text{ and } S = \sum_{ij} S_{ij}$$

are used;
    (S2) selecting a set of Lagrange multipliers $\lambda(x,y)$ represented by image vector $\lambda=[\lambda_{ij}]$ and constructing a diagonal matrix representation $\Lambda_0=[\lambda_{ij}]_{diagonal}$ from said image vector components;
    (S3) calculating a variance statistic $\sigma^{-2}$ for normal quadratic statistics and an asymmetric statistic $L^{asym}(\Lambda_0)$ for statistical analysis beyond said normal statistics;
    (S4) selecting the statistical measure m(x,y) represented by an image vector $m=[m_{ij}]$;
    (S5) producing a reconstructed image function f(x,y) using the following restoration equation wherein an iterative process is repeated until the successive change in f(x,y) is smaller than a user defined tolerance:

$$\nabla S = 2WD^*W^{-1}\Lambda_0\sigma^{-2}\Lambda_0(g - WDW^{-1}f) - \nabla L^{asym}(\Lambda_0)$$

further wherein $W^{-1}$ and W denote Fourier transform and Fourier inverse transform matrix operators respectively, D is a diagonal matrix representation of the point spread function h(x,y), $g=[g_{ij}]$ and $f=[f_{ij}]$ are the vector representations of the unprocessed and normalized reconstructed images g(x,y) and f(x,y) respectively and $\nabla$ the gradient operator over the vector field of f represented by the vector $[\partial/\partial f_{ij}]$ and * is the complex conjugation operator; and
    (S6) iteratively repeating steps (S1), (S2), (S3), (S4) and (S5) to determine values for Lagrange multipliers $\lambda(x,y)$ which optimize the cumulated probability $P^c$ of data reconstruction $g^{recon}(x,y)$, represented as an image vector $g^{recon}=[g_{ij}^{recon}]$ and defined as h(x,y) convoluted with f(x,y), matching g(x,y) further wherein $g^{opt}(x,y)$ represented by image vector $g^{opt}=[g_{ij}^{opt}]$ is the optimum data reconstruction vector at which values said probability is maximal;
  memory means for storing at least the image vectors g, h, m, $\lambda$, $[S_{ij}]$ and f; and
  visual display means for displaying the reconstructed image vector f.

Typically, the detector instrumentation comprises:
an emission or transmission photon radiation source;
a beam collimating device;
a scintillator;

an analogue detector including a photomultiplier tube or an equivalent solid state component;
analogue-to-digital signal conversion circuitry; and
position logic circuitry.
Alternatively, the detector instrumentation comprises:
a transducer including a piezoelectric crystal array;
source signal generating circuitry;
circuitry for reflected acoustic signal detection; and
analogue-to-digital signal conversion circuitry.

According to an eighth aspect of the invention there is provided a system for forming a reconstructed point spread function image, the system comprising:
detector instrumentation for generating a raw phantom image function g(x,y) represented by an image vector g=[$g_{ij}$];
a processor configured to perform the following steps:
(S1) produce a digital image f(x,y) of a calibration phantom;
(S2) select an analytical form for the reconstructed image entropy distribution S(x,y), a function of statistical measure m(x,y), represented by its image vector [$S_{ij}$] wherein the following equivalent forms for the total reconstructed image entropy, $$S = \int_\Omega dx\, dy\, S(x, y)\ x, y \in \Omega \text{ and } S = \sum_{ij} S_{ij}$$

are used;
(S3) select a set of Lagrange multipliers λ(x,y) represented by image vector λ=[$λ_{ij}$] and constructing a diagonal matrix representation $Λ_0$=[$λ_{ij}$]$_{diagonal}$ from said image vector components;
(S4) calculate a variance statistic $\sigma^{-2}$ for normal quadratic statistics and an asymmetric statistic $L^{asym}(Λ_0)$ for statistical analysis beyond said normal statistics;
(S5) select the statistical measure m(x,y) represented by an image vector m=[$m_{ij}$];
(S6) produce a reconstructed point spread image function h(x,y) using the following restoration equation wherein an iterative process is repeated until the successive change in h(x,y) is smaller than a user defined tolerance:

$\nabla S = 2WD^*W^{-1}Λ_0\sigma^{-2}Λ_0(g-WDW^{-1}h)-\nabla L^{asym}(Λ_0)$ wherein $W^{-1}$ and W denote Fourier transform and Fourier inverse transform matrix operators respectively, D is a diagonal matrix representation of the calibration phantom image f(x,y), g=[$g_{ij}$] and h=[$h_{ij}$] are the vector representations of the unprocessed and normalized reconstructed point spread function images g(x,y) and h(x,y) respectively, ∇ is the gradient operator over the vector field of h represented by the vector [∂/∂$h_{ij}$] and * is the complex conjugation operator; and
(S7) iteratively repeating steps (S2), (S3), (S4), (S5) and (S6) to determine values for Lagrange multipliers λ(x,y) which optimize the cumulated probability $P^c$ of data reconstruction $g^{recon}$(x,y), represented as an image vector $g^{recon}$=[$g_{ij}^{recon}$] and defined as h(x,y) convoluted with f(x,y), matching g(x,y) further wherein $g^{opt}$(x,y) represented by image vector $g^{opt}$=[$g_{ij}^{opt}$] is the optimum data reconstruction vector at which values said probability is maximal.
memory means for storing at least the image vectors g, h, m, λ, [$S_{ij}$] and f; and
visual display means for displaying the reconstructed point spread function's image vector representation, h.

BRIEF DESCRIPTION OF THE DRAWINGS

FIG. 6(d) shows numerical values computed with Simpson's method using an interval width of $10^{-6}$ for each of the integral terms from ∇S (–) and $\nabla^2 S$ (- - -) in the range ρ in

Figure 7:
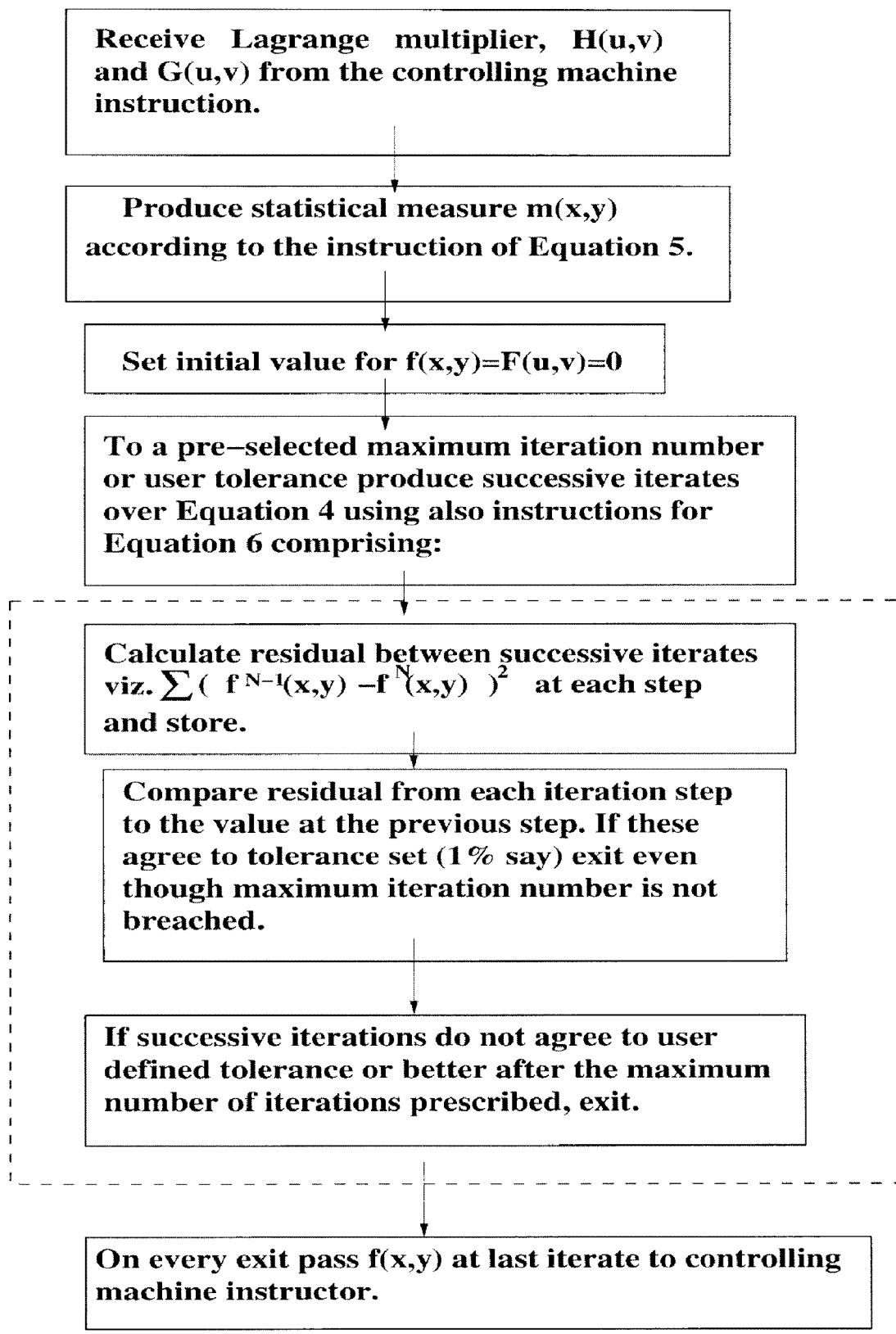
Figure 8:
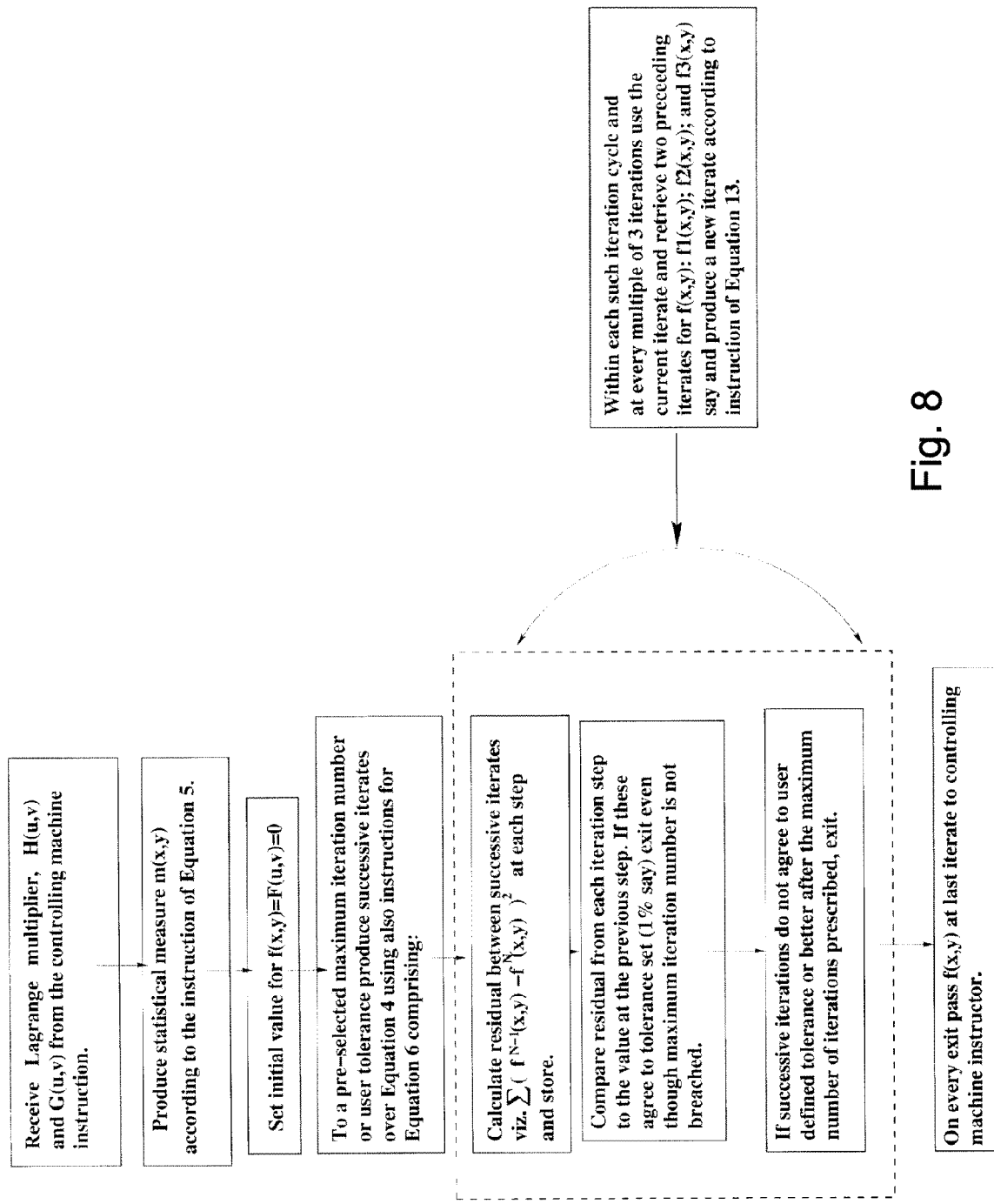
Figure 9:
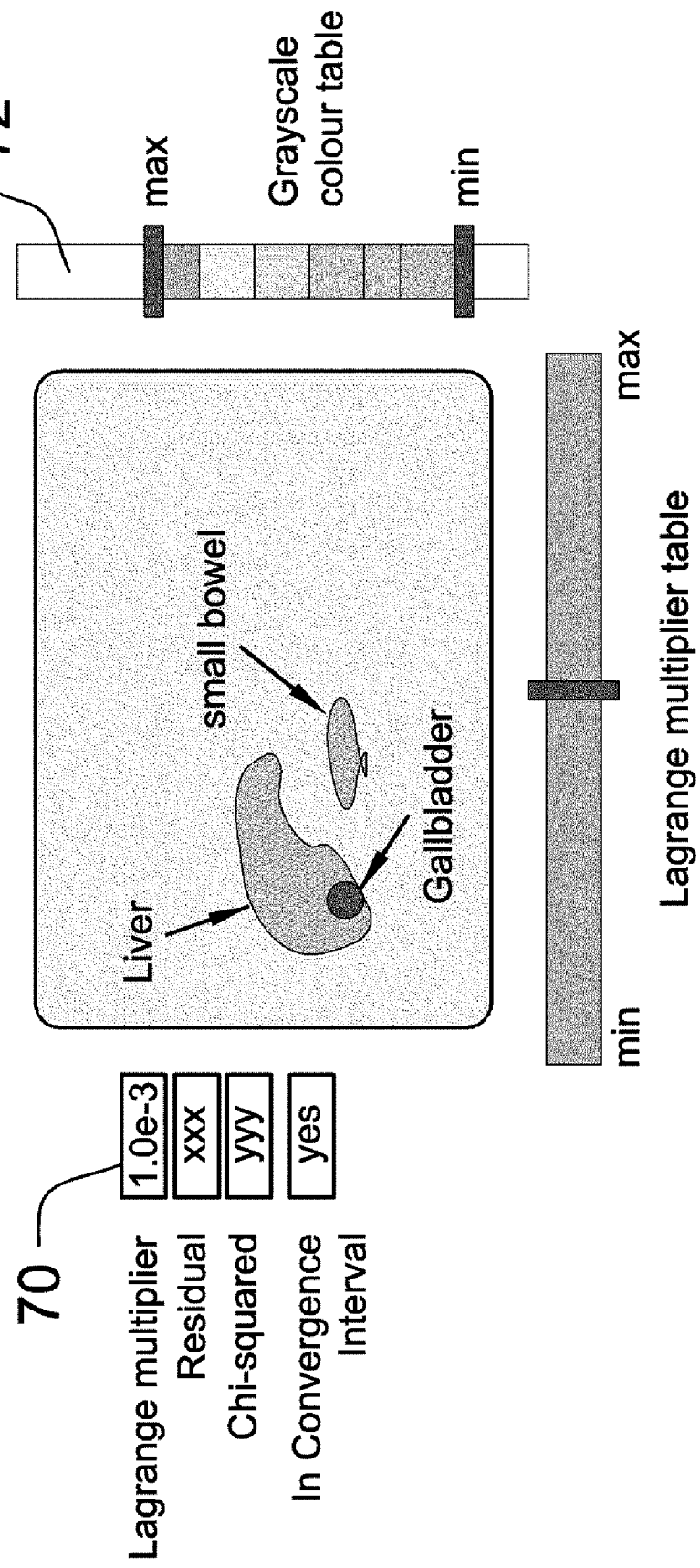
Figure 10:
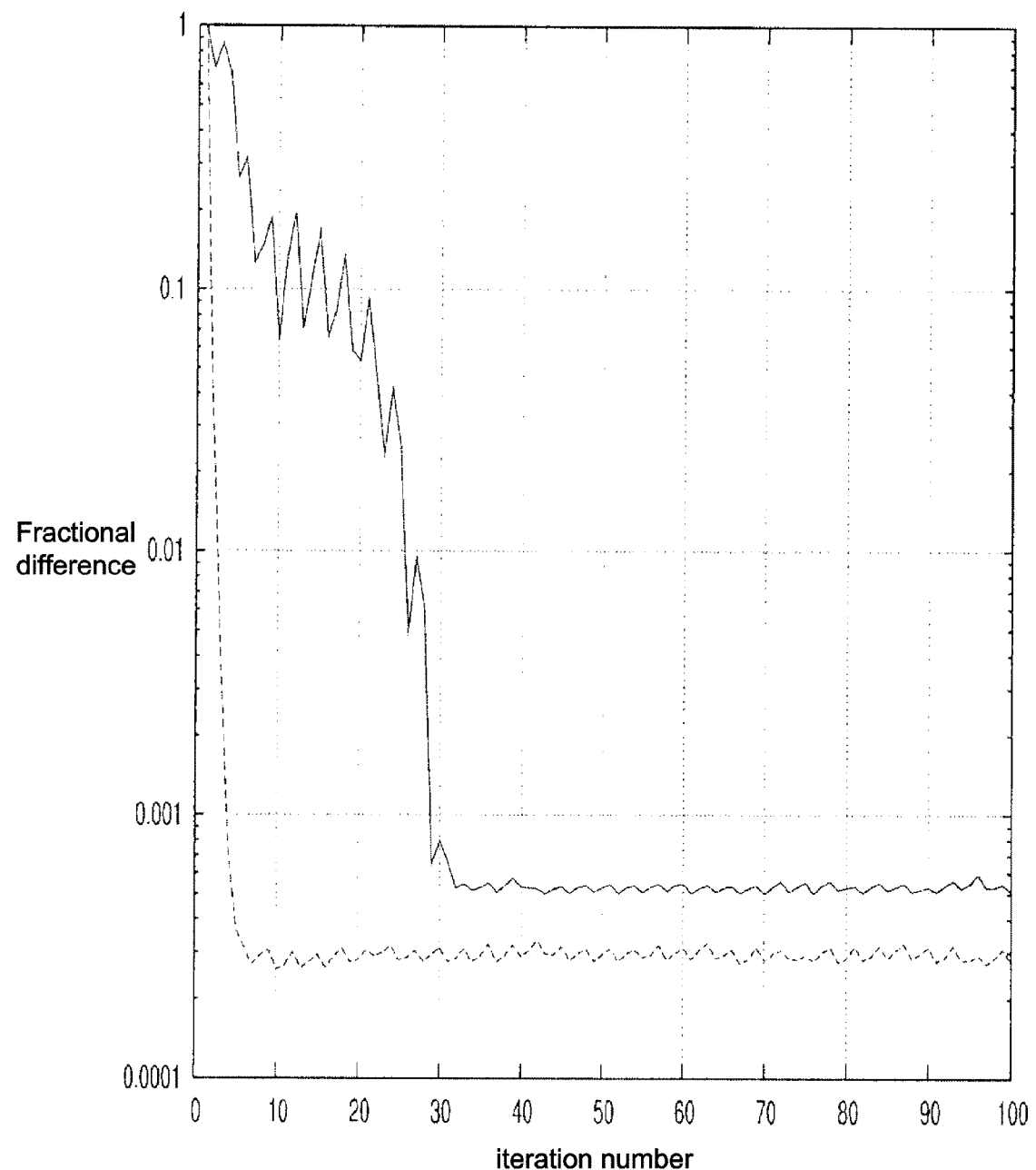
Figure 11:
Figure 11:
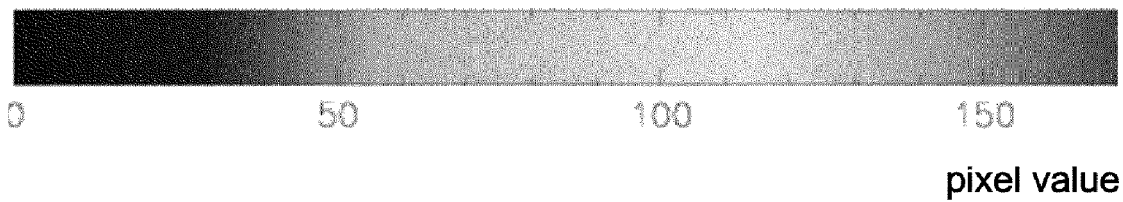
Figure 12:
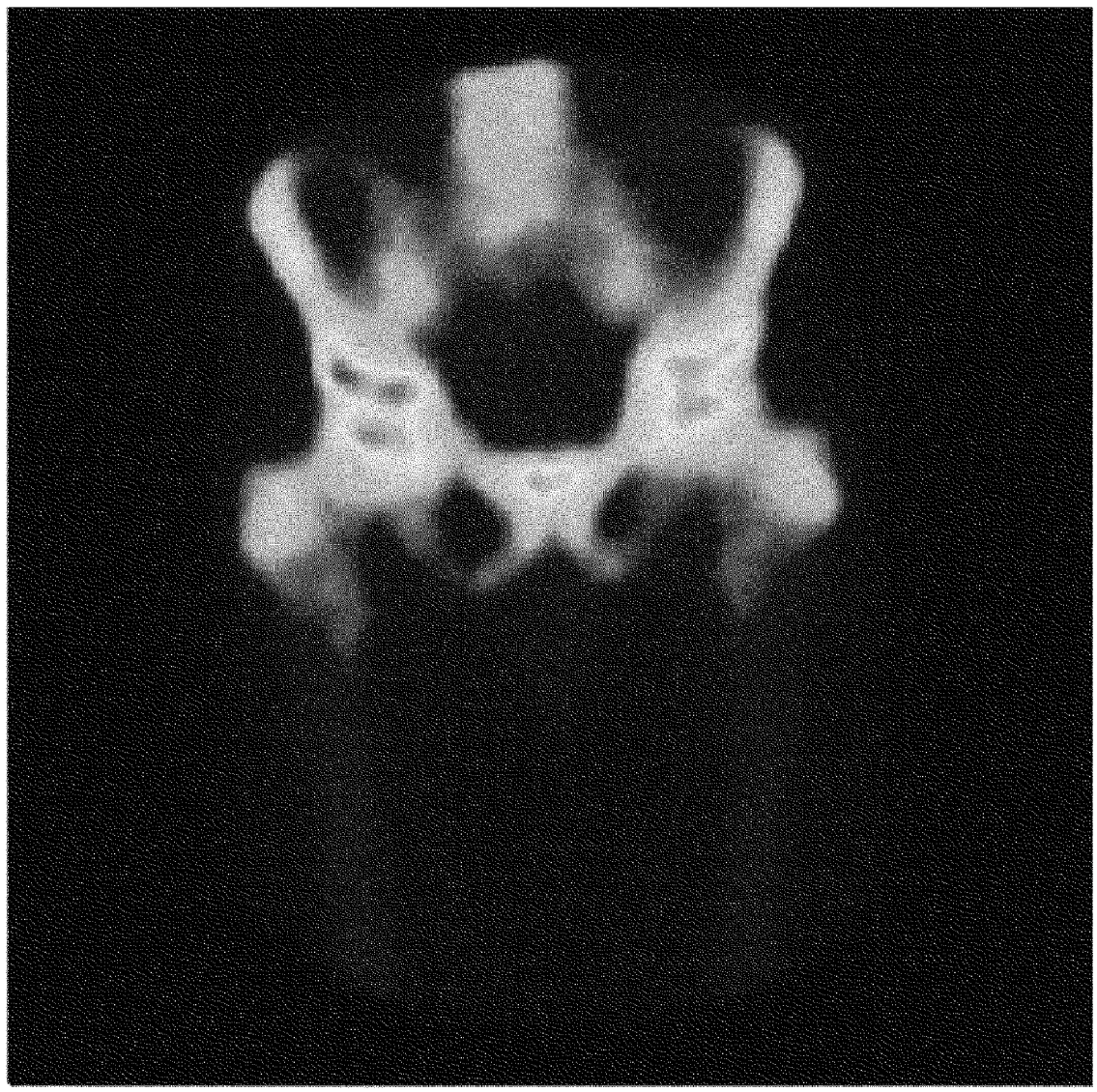
Figure 12:
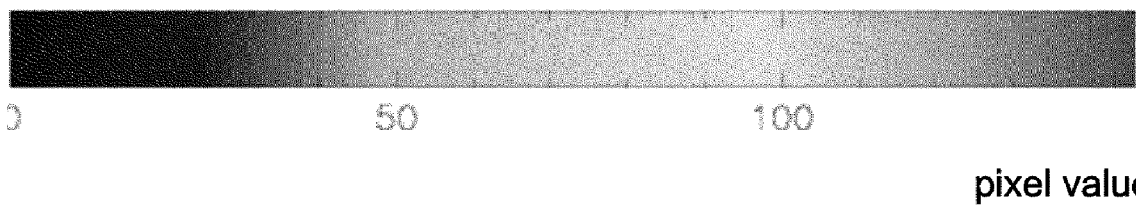
Figure 13:
Figure 14:
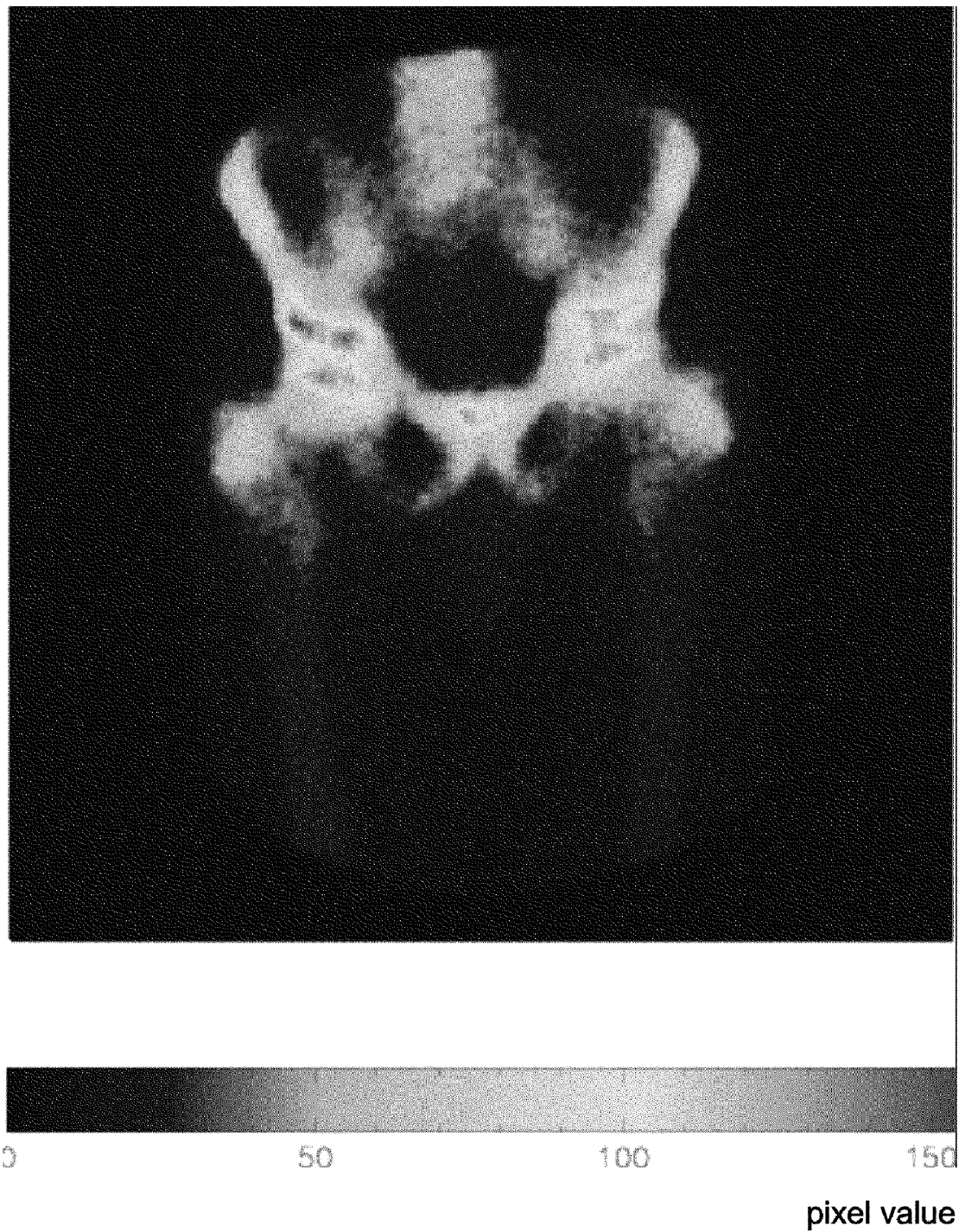
Figure 15:
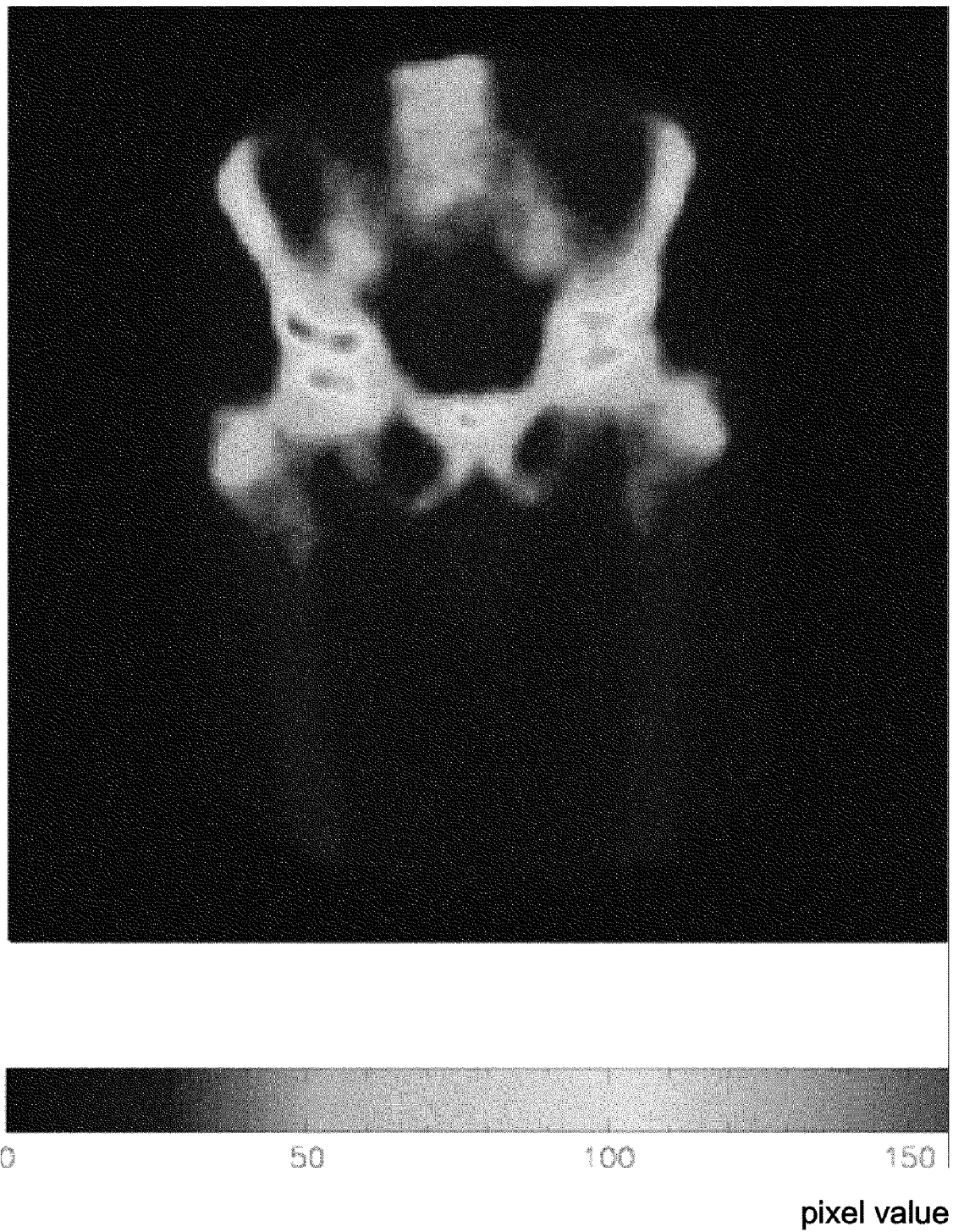
Figure 16:
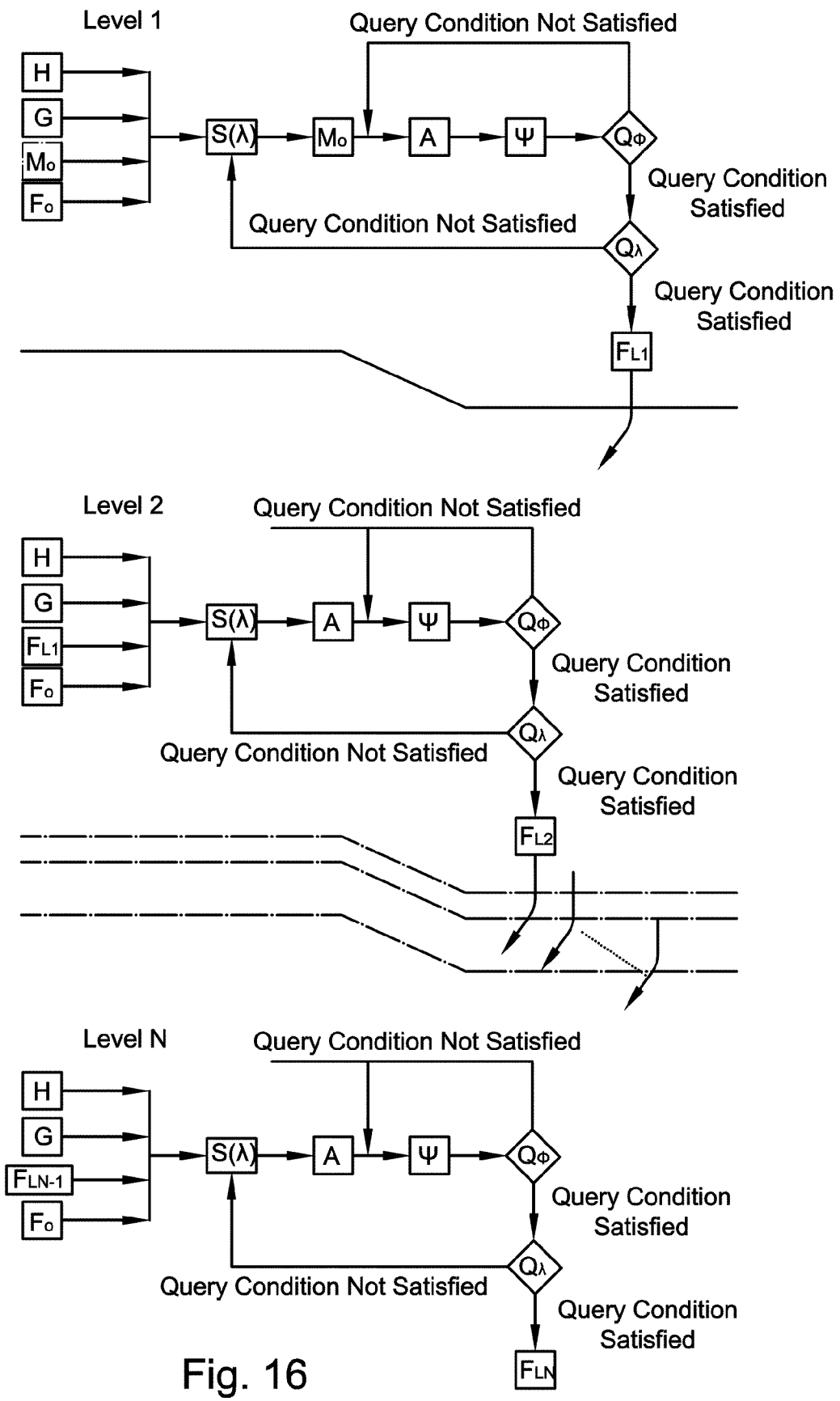
Figure 17A:
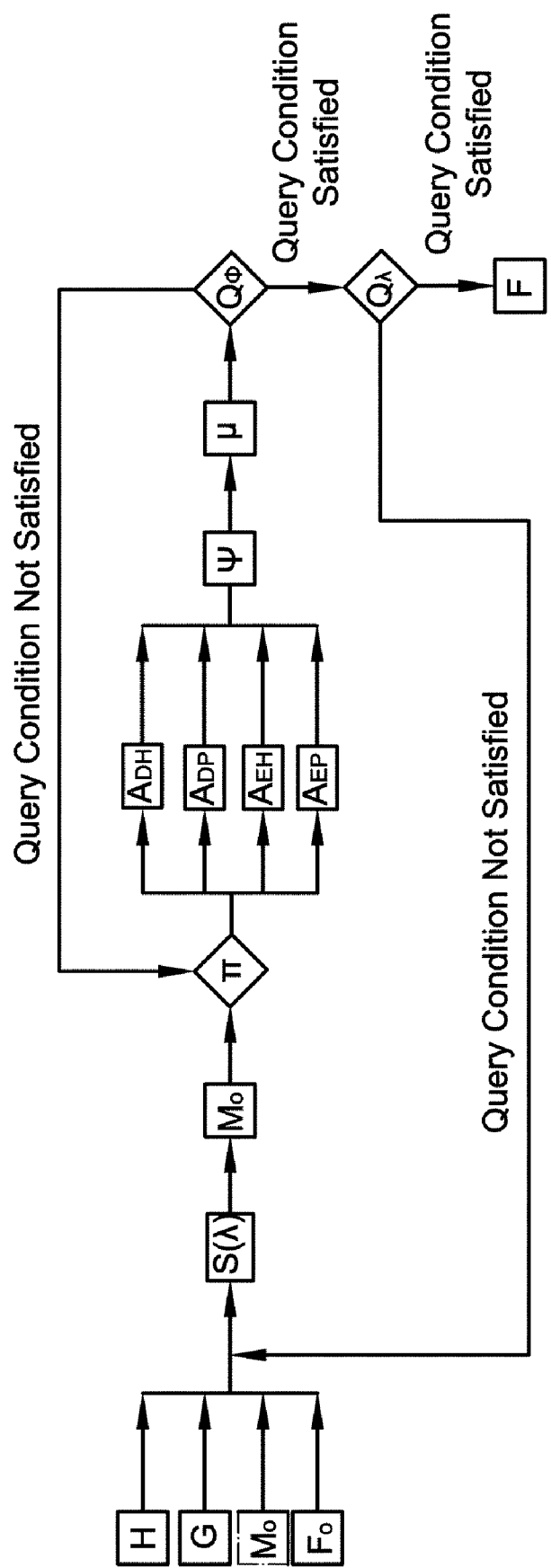
Figure 17B:
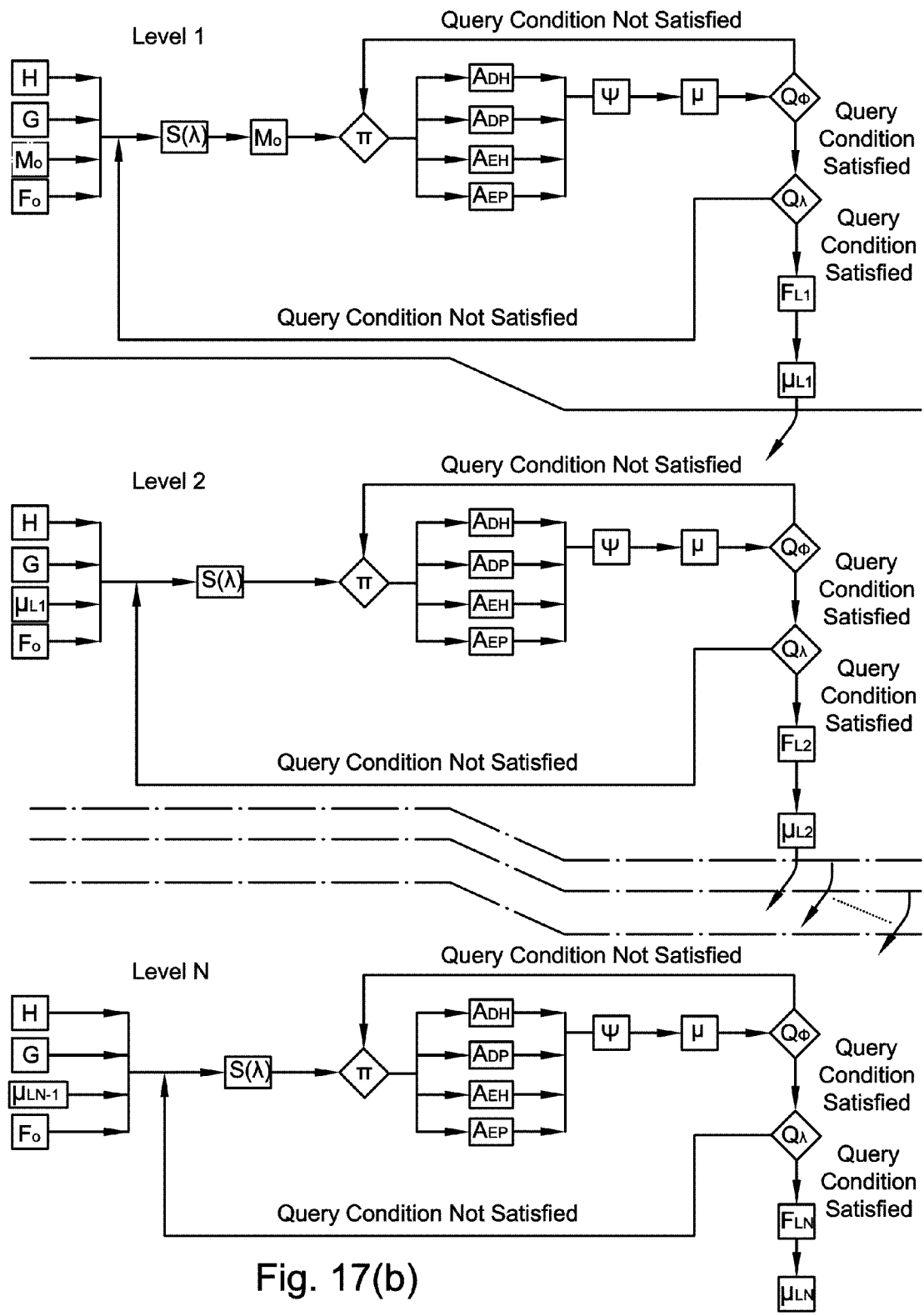
Figure 17C:
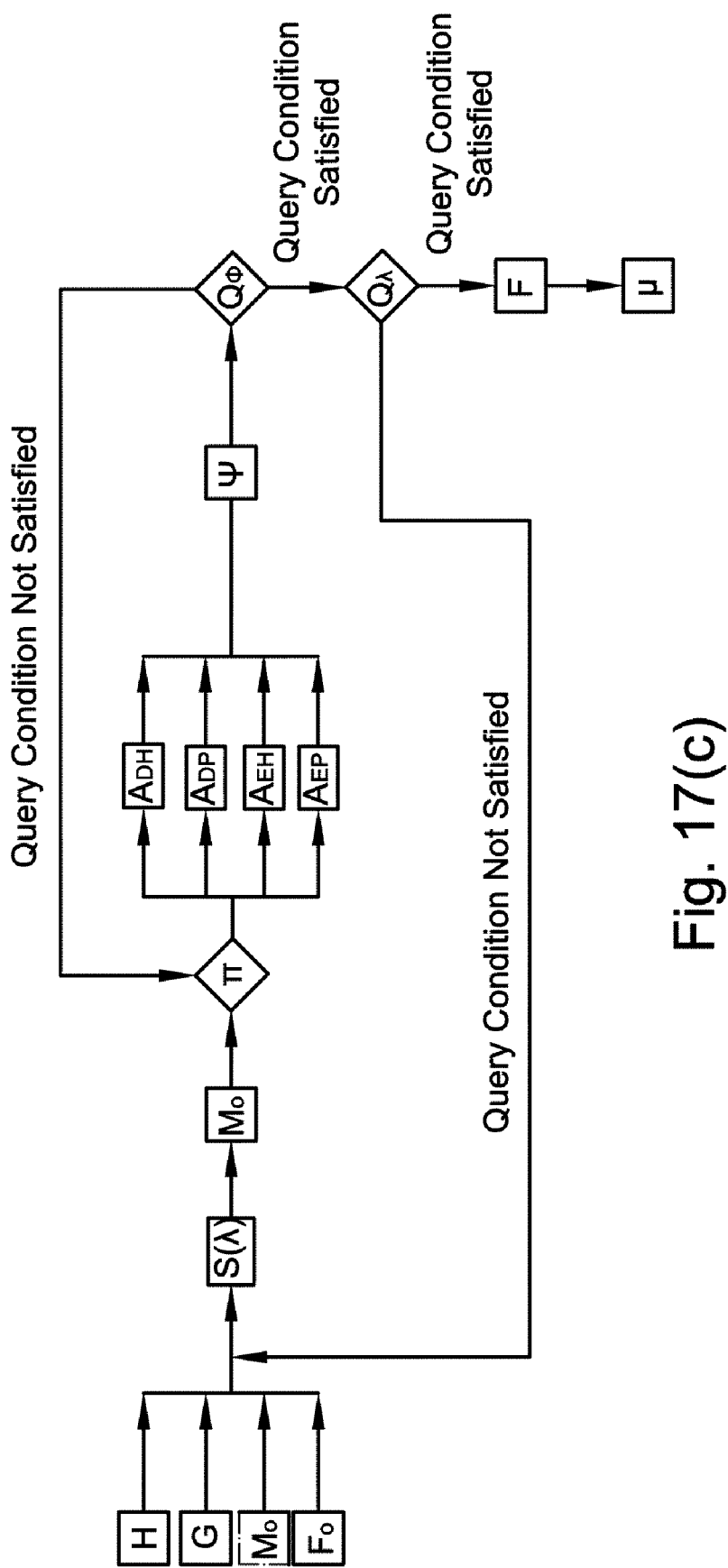
Figure 17D:
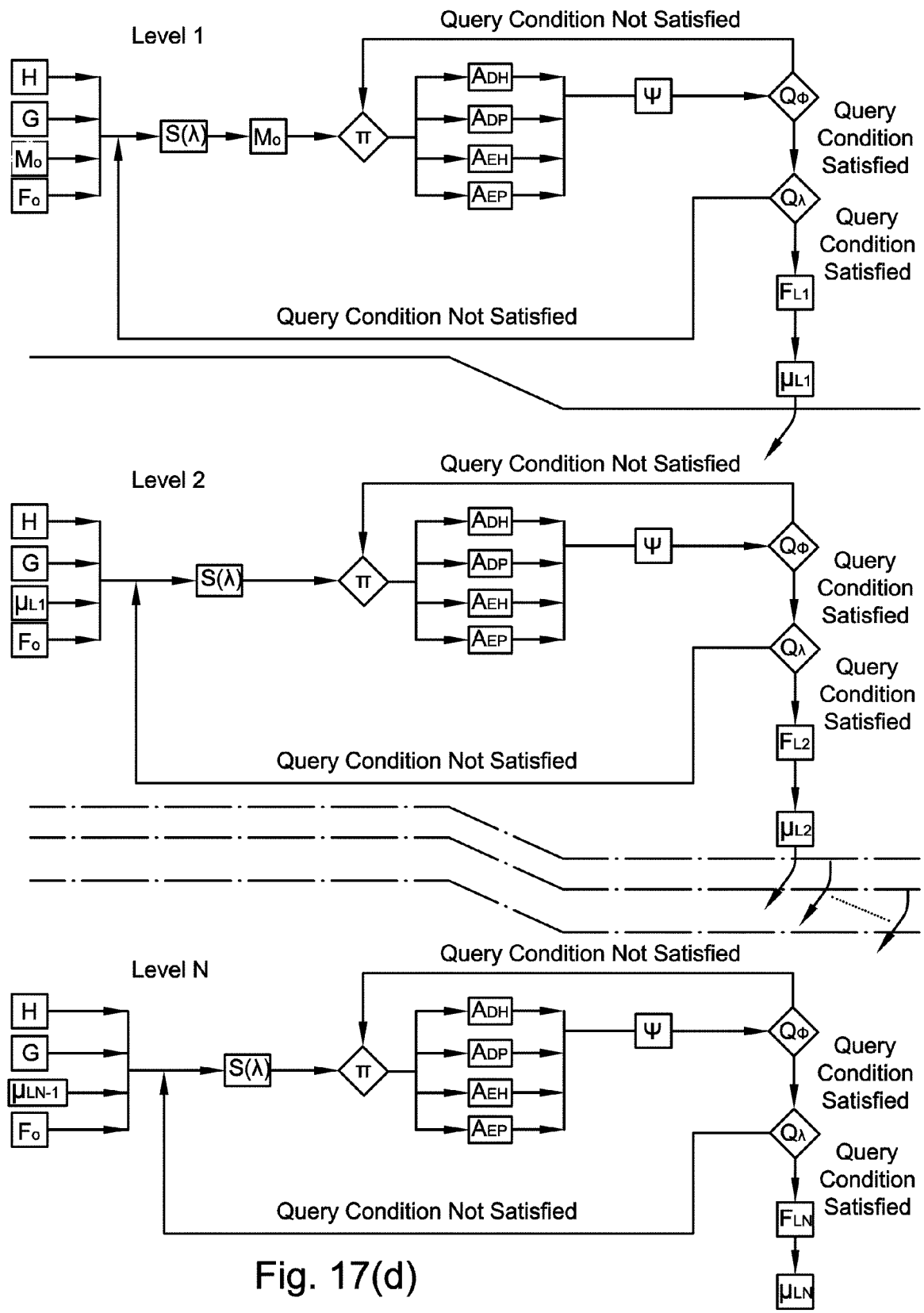
Figure 18A:
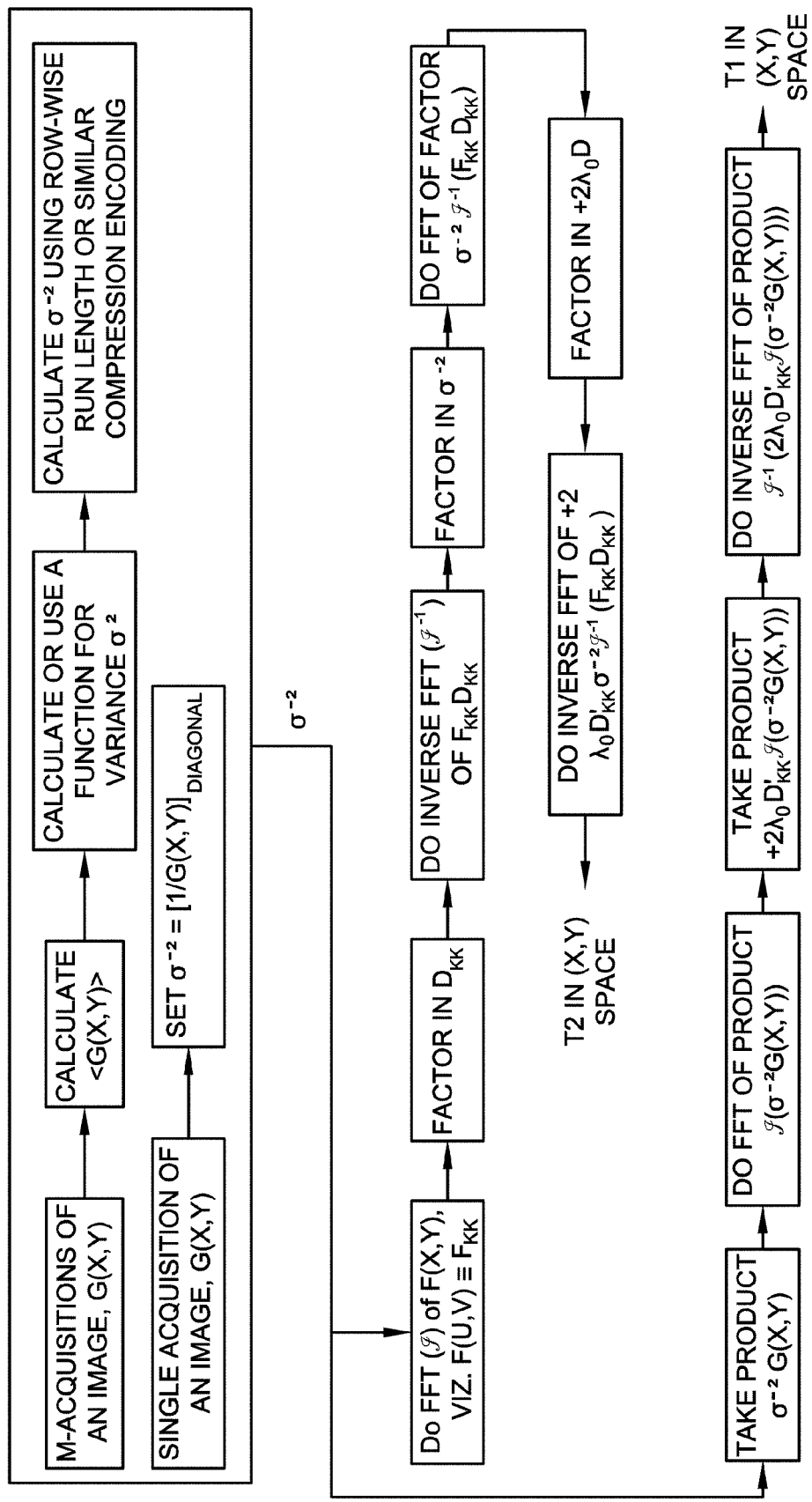
Figure 18B:
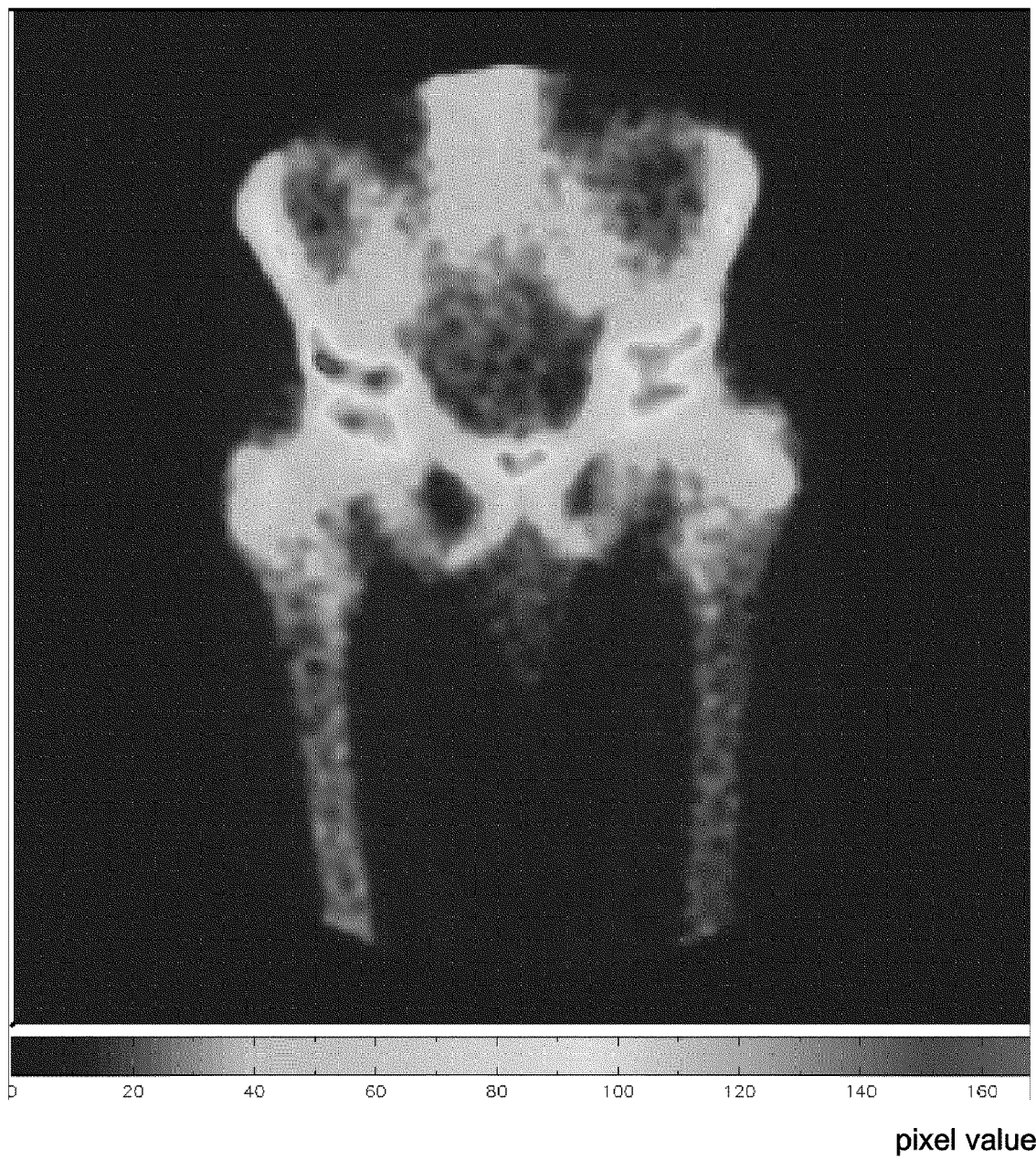
Figure 18C:
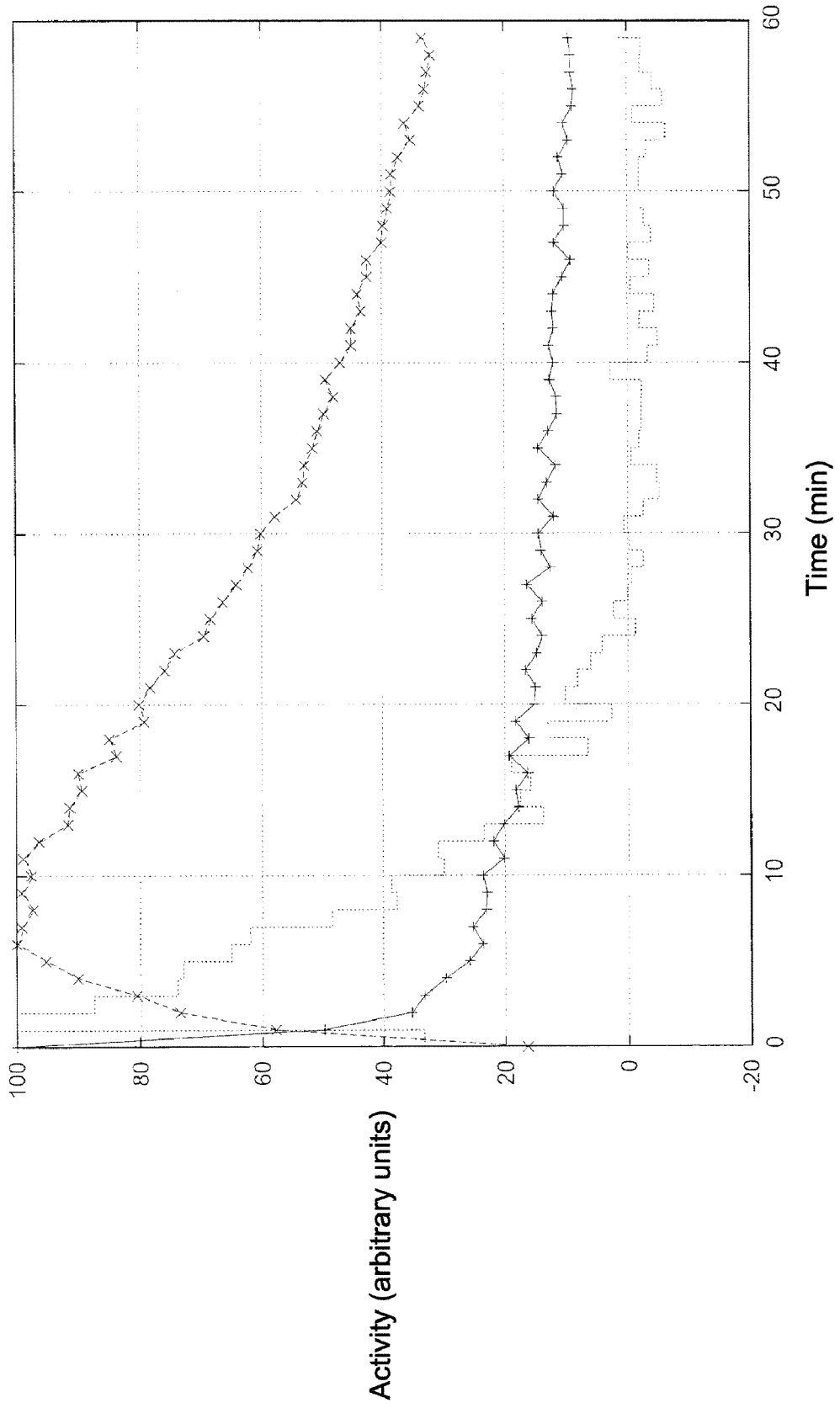
Figure 18D:
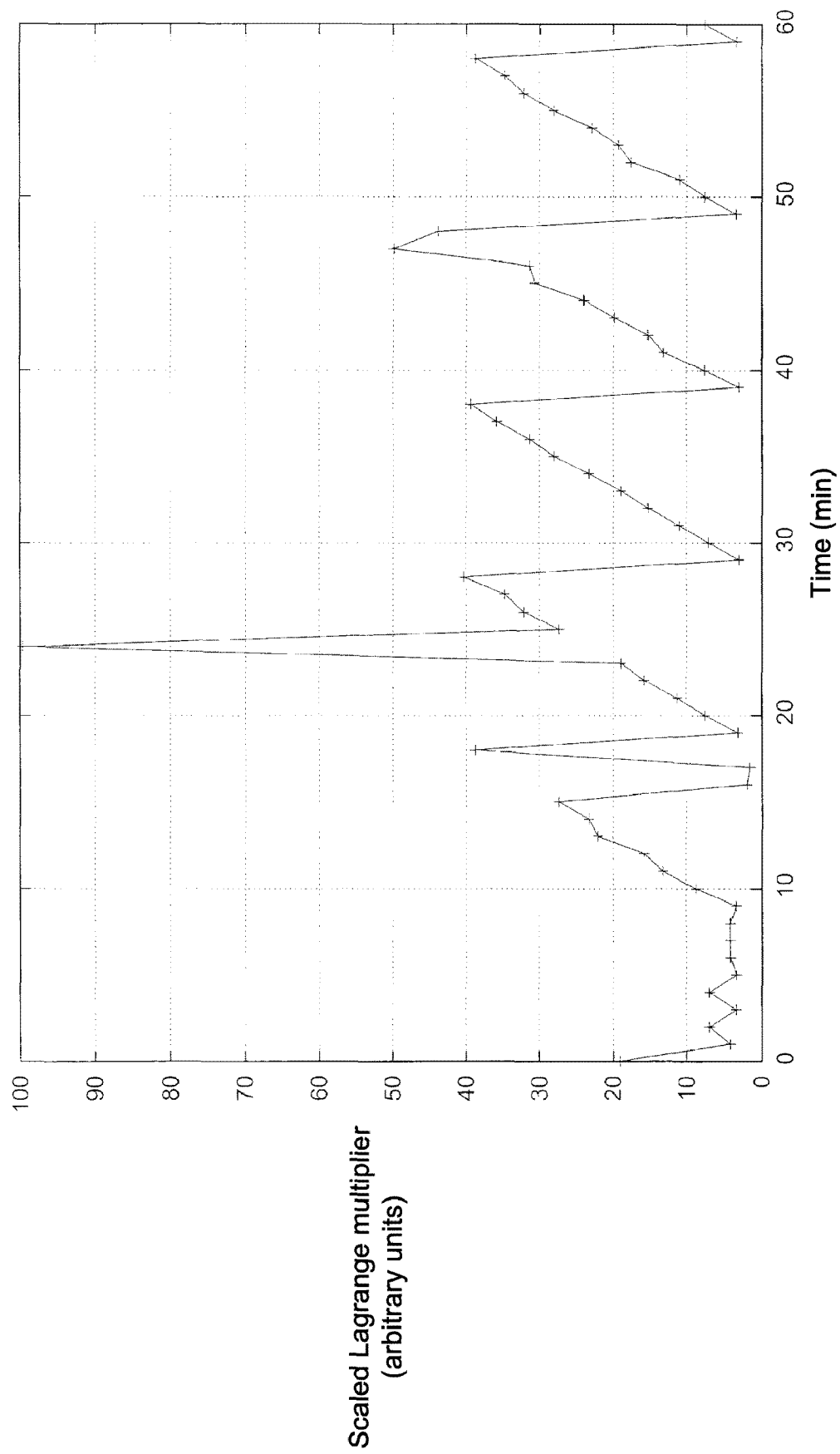
Figure 19:
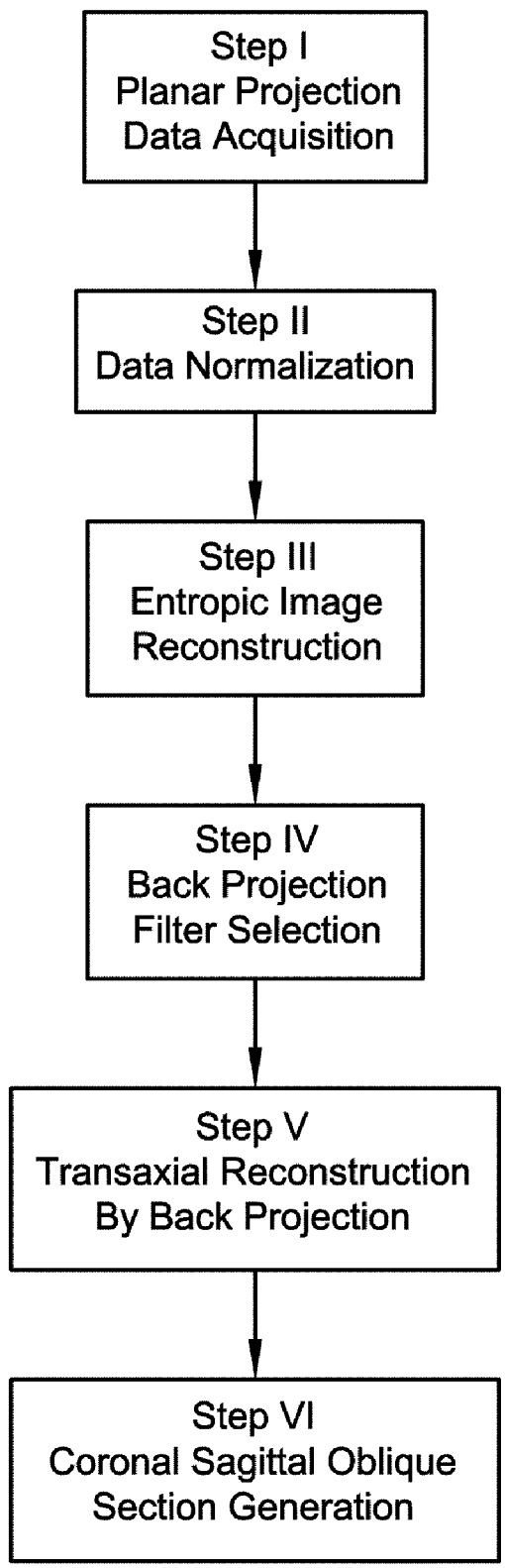
Figure 20A:
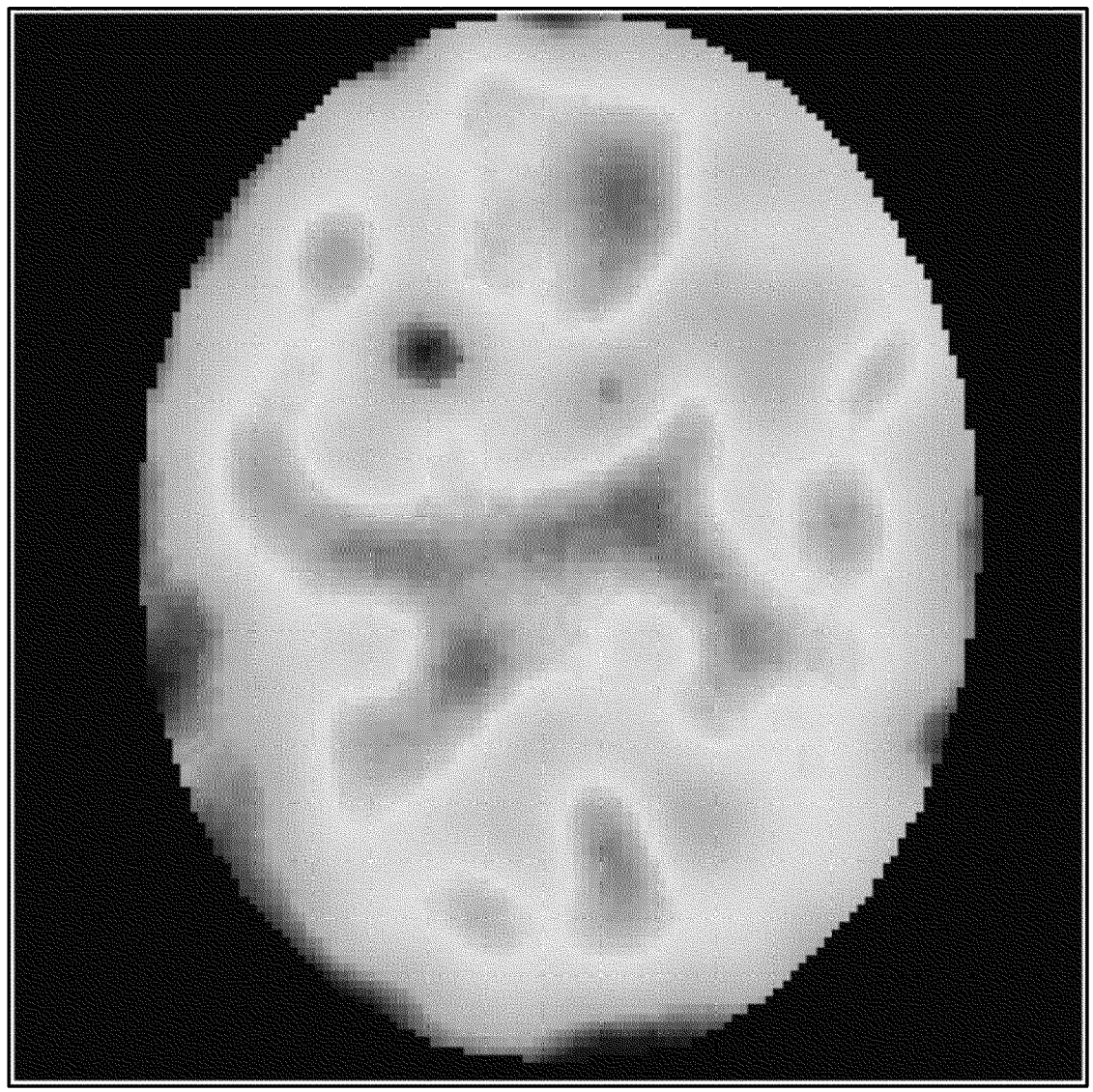
Figure 20B:
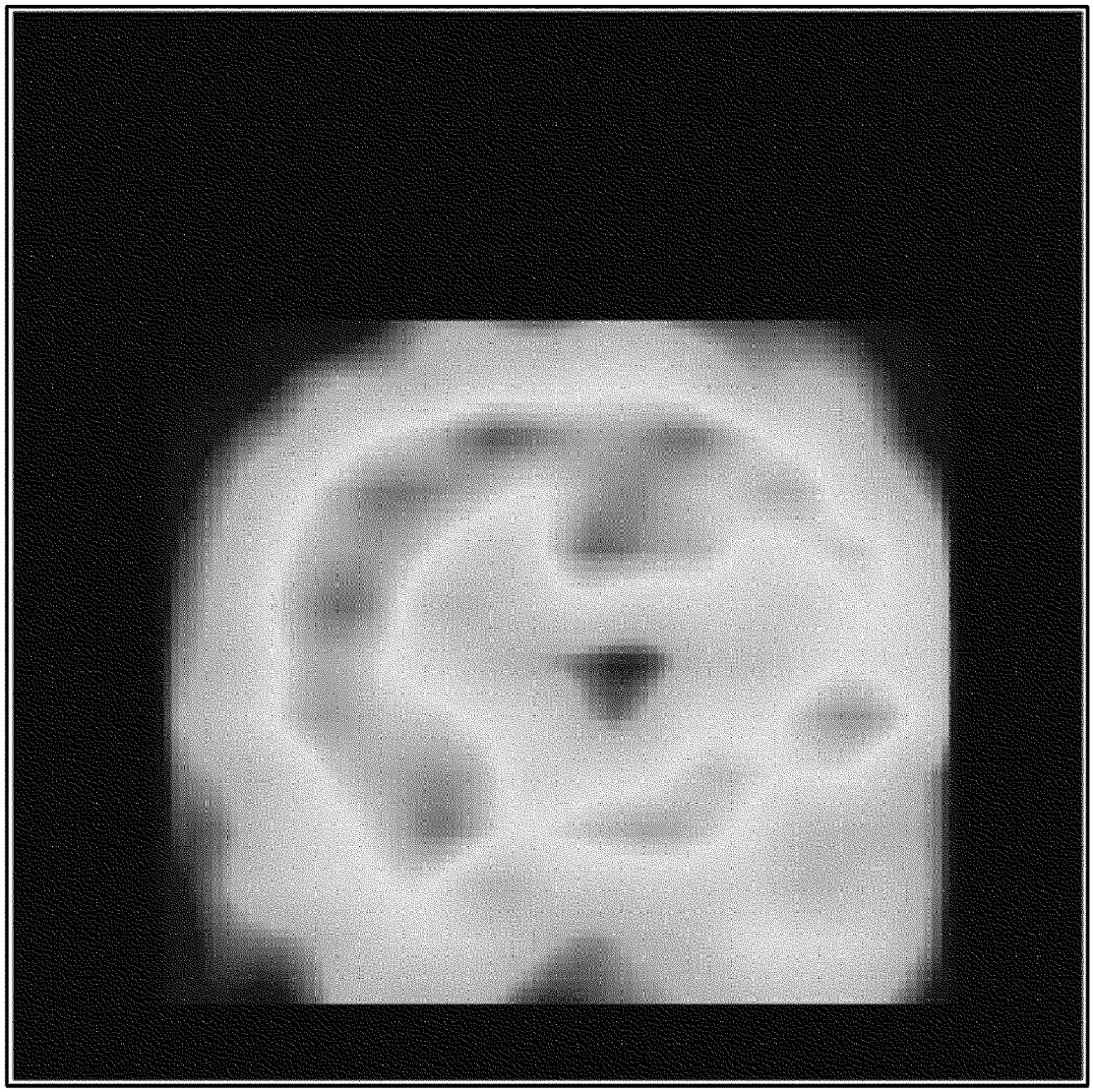
Figure 20C:
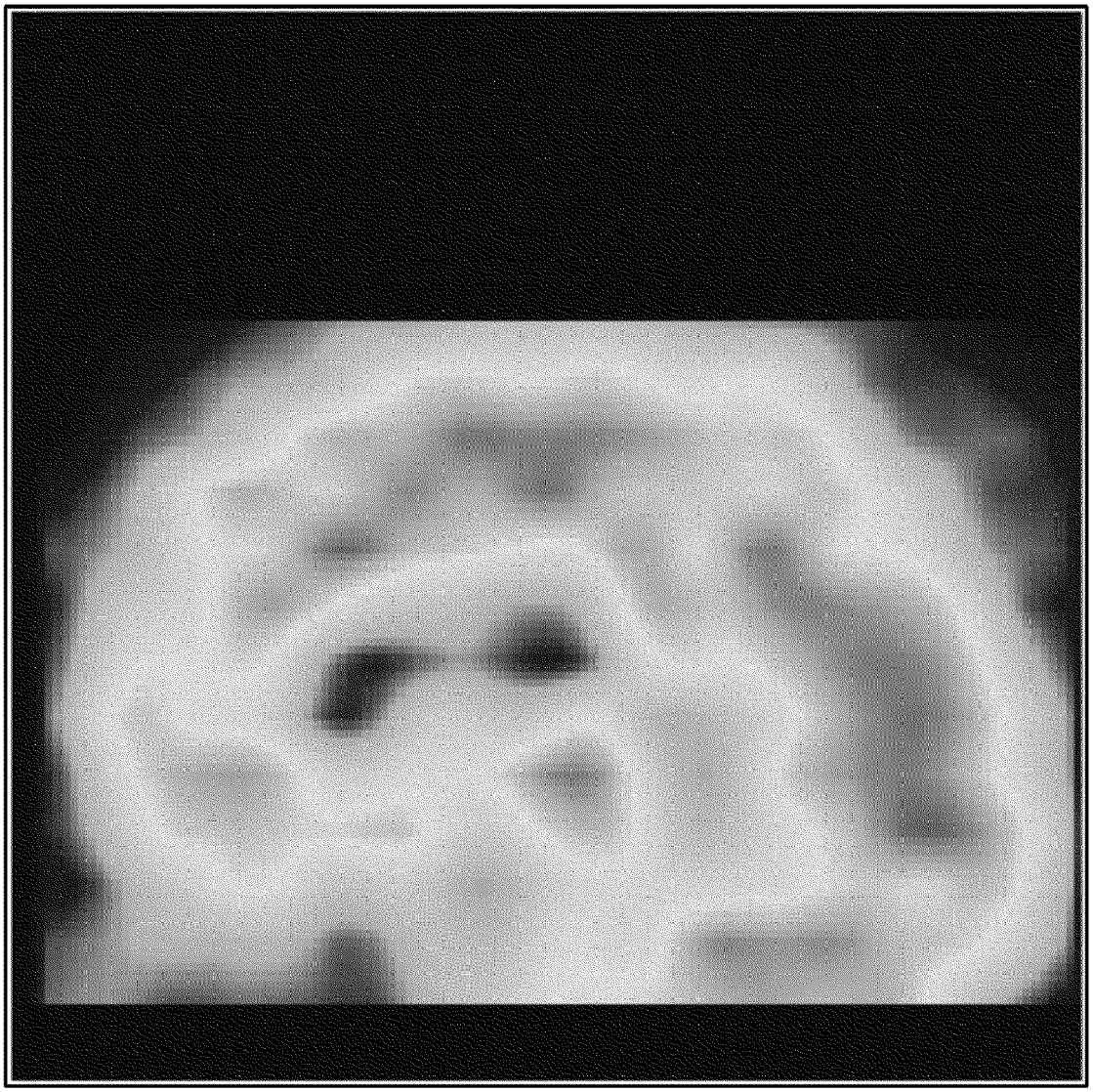
Figure 21:
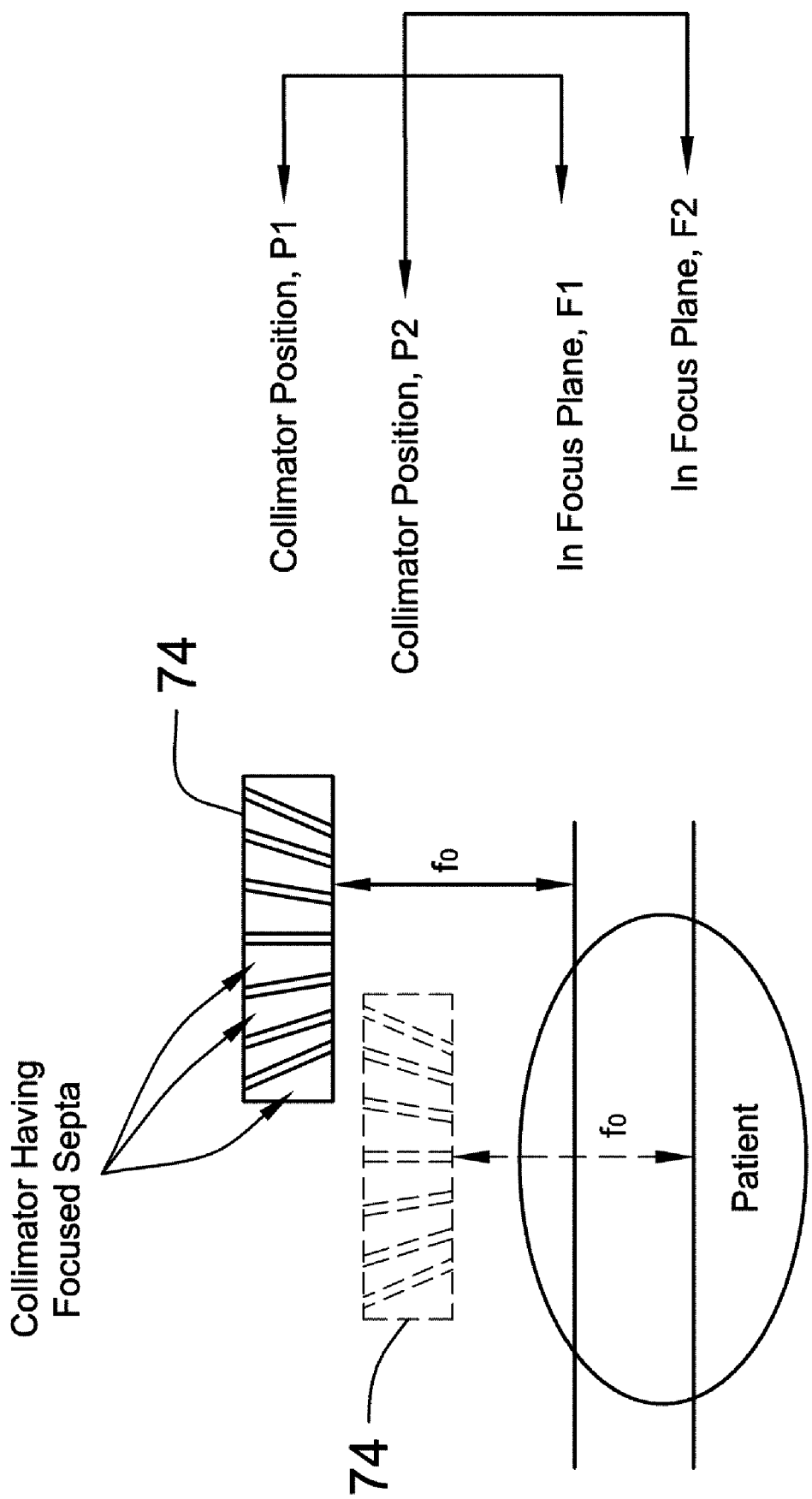
Figure 22:
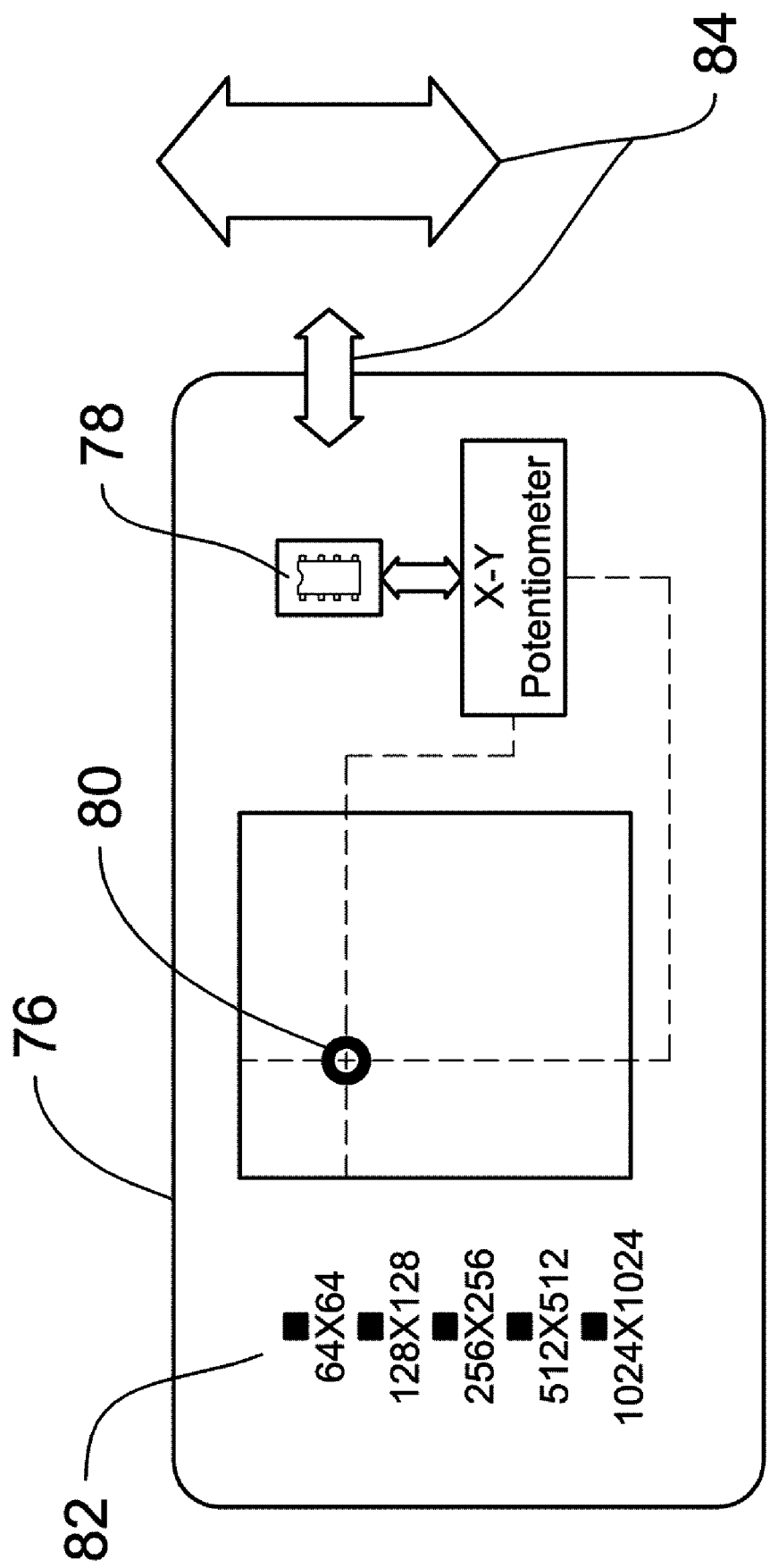
Figure 23:
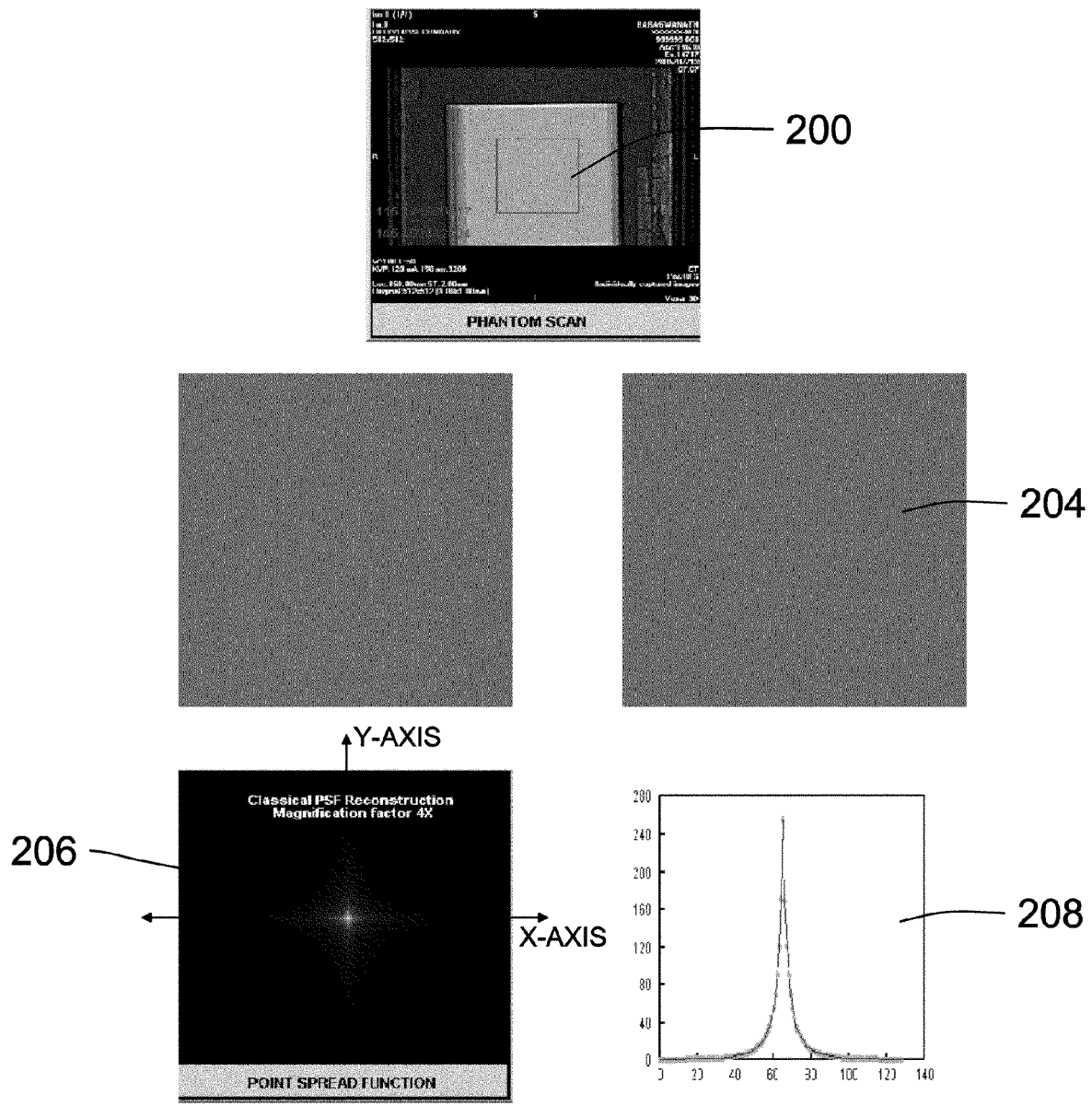
Figure 24:
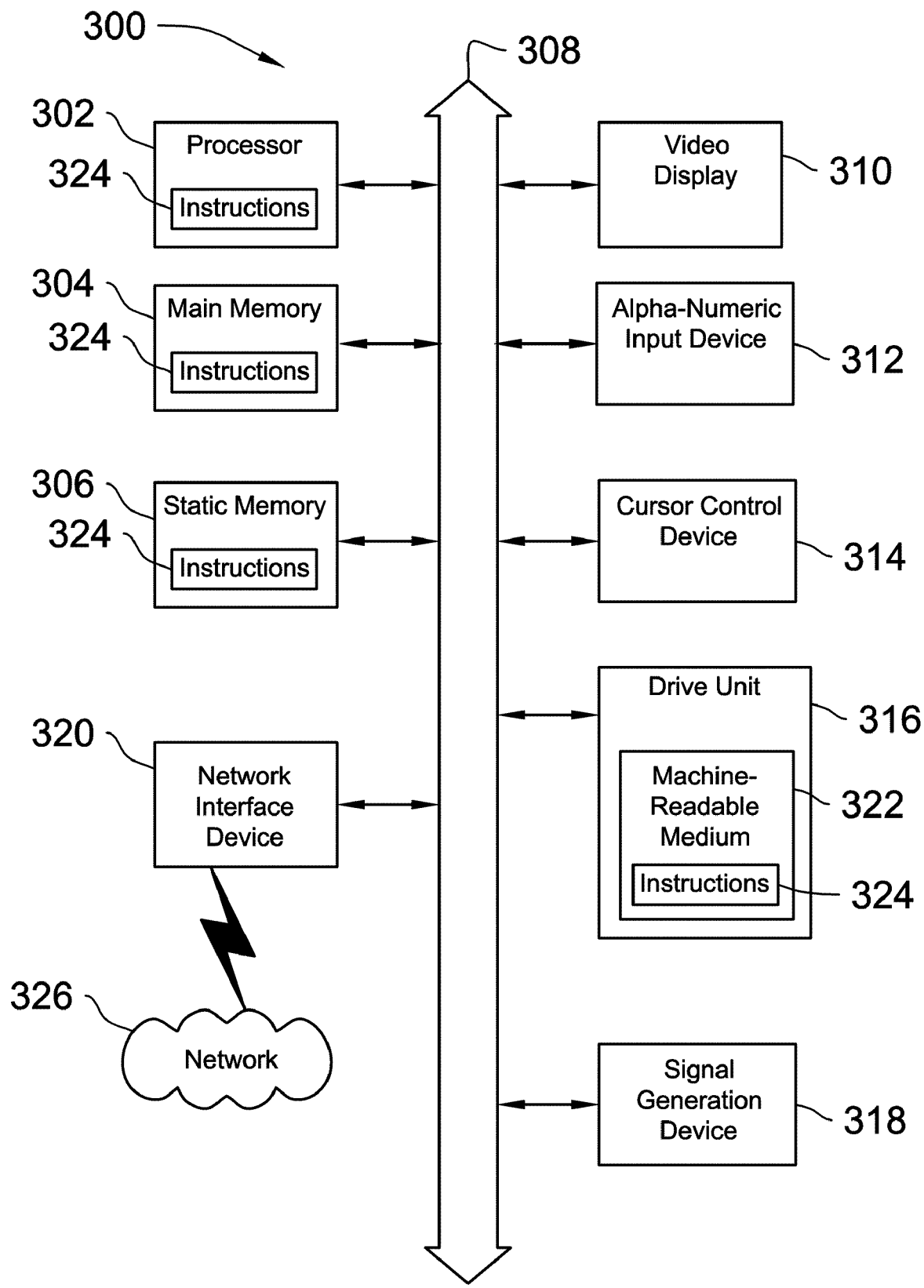

[0:1] from which the preferred method of reconstruction interpolates its required value;

FIG. 7 shows a block diagram amplifying the algorithm for solution of the derived entropic image system equations by direct numerical iteration;

FIG. 8 shows a block diagram amplifying the algorithm for solution of the derived entropic image system equations by numerical iterative extrapolation;

FIG. 9 shows an example of a graphical user interface for real time data reconstruction for pre-selected values of the Lagrange multiplier;

FIG. 10 shows a plot of the fractional difference between successive reconstruction iterations using extrapolated iteration with exact entropy, with curve (- - -) showing the Lagrange parameter ($\lambda=\lambda_a$) within an interval of convergence and curve (–) showing the Lagrange parameter ($\lambda=\lambda_b$) near the upper limit of convergence interval beyond which divergence sets in;

FIG. 11 shows a raw image acquired at 256×256 resolution of patient pelvic bone scan post Tc-99m methalene diphosphonate (MDP) radiopharmaceutical administration;

FIG. 12 shows the result of direct, non-extrapolated, image processing of the raw image of FIG. 11, using historical entropy, in terms of the algorithm set out in FIG. 7;

FIG. 13 shows the result of extrapolated, image processing of the raw image of FIG. 11, using historical entropy, in terms of the algorithm set out in FIG. 8;

FIG. 14 shows the result of direct, non-extrapolated, image processing of the raw image of FIG. 11, using primordial entropy, in terms of the algorithm set out in FIG. 7;

FIG. 15 shows the result of extrapolated, image processing of the raw image of FIG. 11, using primordial entropy, in terms of the algorithm set out in FIG. 8;

FIG. 16 shows a representation of an $N^{th}$ level recursion as a function of the statistical measure;

FIG. 17(a) shows an algorithm in which measure is explicitly given to follow the reconstruction iterate $f_{ij}$ within such iteration cycle;

FIG. 17(b) shows an algorithm in which the $N^{th}$ level measure is passed to subsequent level approximations;

FIG. 17(c) shows a scheme in which statistical measure is updated outside the reconstruction iteration cycle for $f_{ij}$;

FIG. 17(d) shows the algorithm of FIG. 17(c) as applied and extended to level N;

FIG. 18(a) shows a schematic of a generalized algorithm for image reconstruction where the variance obtainable from a single measurement or a series of measurements on a static scene can be processed;

FIG. 18(b) shows the application of the algorithm of FIG. 18(a) when $\sigma_{ij}^{-2}=g_{ij}^{31\ 1}$ is inserted in to the analysis of the unprocessed image depicted in FIG. 11;

FIG. 18(c) shows scaled line spectral reconstruction (- - -) of hepatic histogram (x) effected from heart histogram (–+–) in which hepatic response function (step plot) and then mean residence time was calculated sans background correction, hence negative signal;

FIG. 18(d) shows a search estimate derived when Lagrange multipliers were delegated to each temporal measurement of the hepatogram and cardiogram depicted in FIG. 18(c);

FIG. 19 shows a schematic of location of the entropic reconstruction algorithm within a SPECT modality;

FIG. 20(a) shows a selected transverse tomogram from SPECT transaxial reconstruction according to the entropic algorithm shown in FIG. 18(a);

FIG. 20(b) shows a corresponding coronal tomogram from SPECT transaxial reconstruction;

FIG. 20(c) shows a corresponding sagittal tomogram from SPECT transaxial reconstruction;

FIG. 21 shows a cross-section of a configuration in which 3D-confocal scanning of patient in vivo radiopharmaceutical can be effected by a focused collimator shown in two typical locations, and as used in conjunction with rectilinear scanning and variation of patient to detector distance;

FIG. 22 shows a top view schematic of a point source positioning system under pre-programmed microprocessor control with option for collection of individual pixel point spread functions of preselected grid size when positioned upon gamma camera head;

FIG. 23 shows a method of processing a digitized phantom image derived from detector instrumentation arrays to form a reconstructed point spread function image, according to a second aspect of the present invention; and FIG. 24 shows a diagrammatic representation of a machine in the exemplary form of a computer system within which a set of instructions, for causing the machine to perform any one or more of the methodologies of the present invention, may be executed.

DETAILED DESCRIPTION OF PREFERRED EMBODIMENTS

The present invention aims to reconstruct digital images by using primordial entropy, thereby ensuring more accurate reconstructions. In broad terms, the raw data stored in memory and hard drive locations 22 is sent to a processor, indicated generally by numeral 24, which processes the data in terms of algorithms that form part of the invention. These algorithms will be discussed in more detail further on in the specification.

Although the present invention will be primarily described with reference to gamma ray imaging, relevance to other imaging modalities can be readily extrapolated and inferred by substituting corresponding hardware in the place of the gamma camera. The point of convergence between the various imaging technologies is the digital signal outputs from the various imaging hardware.

Presently, the invention has been implemented with clinical data captured routinely then processed on commercial Pentium Personal computer in Fortran 77 high level programming syntax. Depending on the clinical requirements, image resolutions in use are 64×64, 128×128, 256×256 and 512×512 pixels square, in single frame or on a dynamic frame protocol. A preferred embodiment has image resolutions that are a power of 2, thereby enhancing Fast Fourier Transform implementations.

Figure 1A:
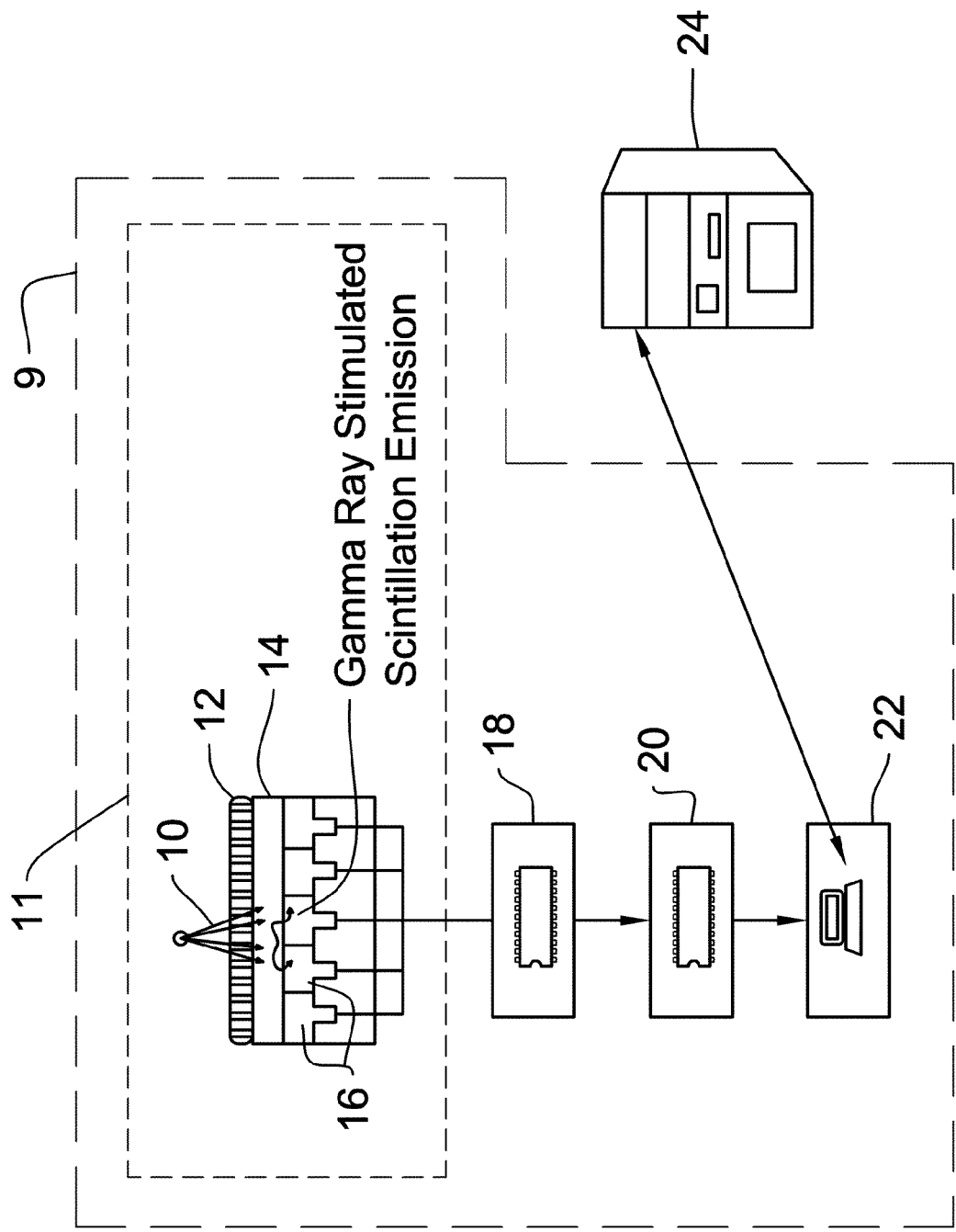
FIG. 1(a) shows a schematic representation of an embodiment of the invention, for reconstructing digitized images originating from a gamma camera head using the entropic image processing method of the present invention.
Figure 1B:
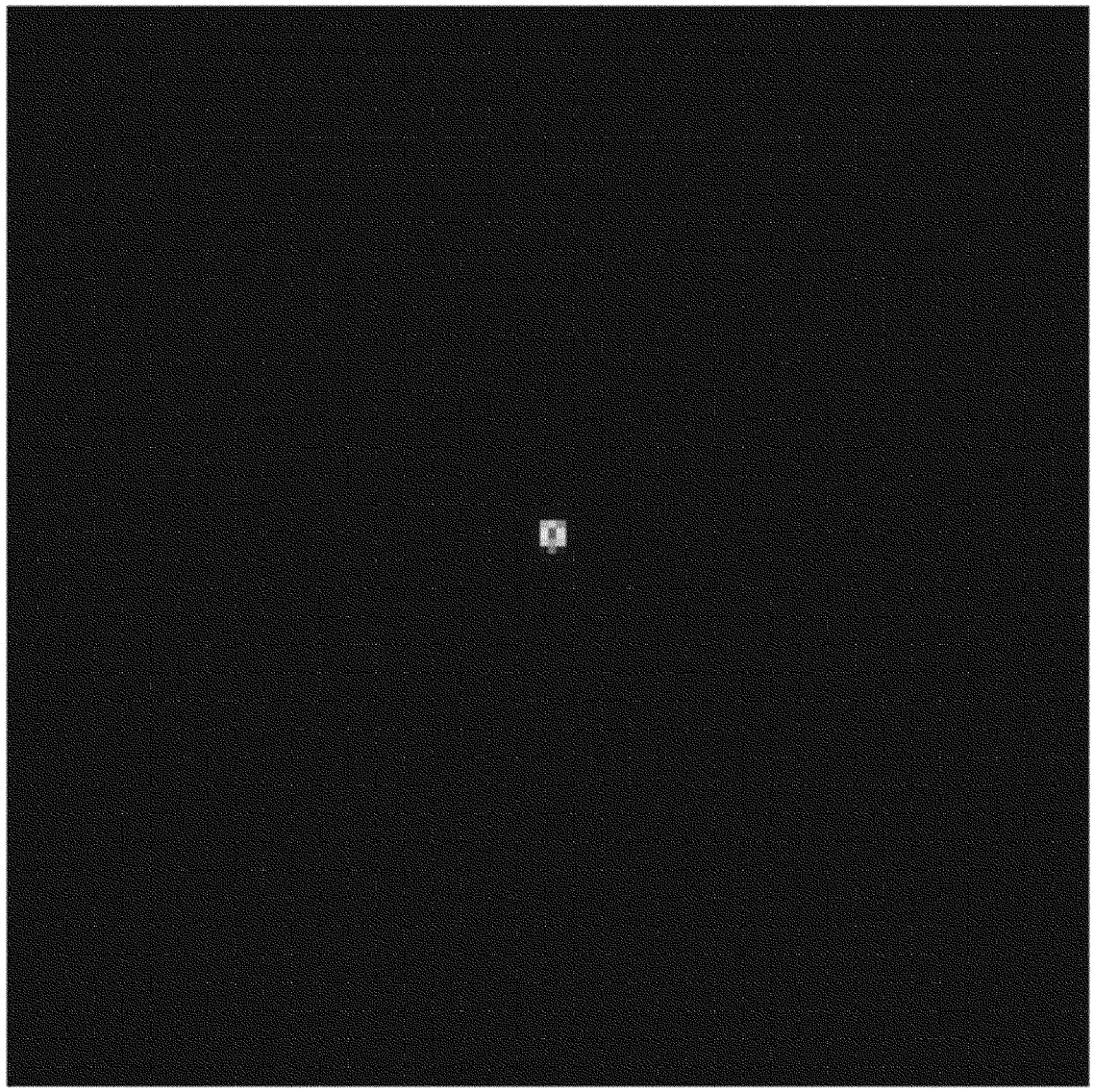
FIG. 1(b) shows a measured point spread function, which illustrates the problem that the present invention aims to address.
Figure 1B:
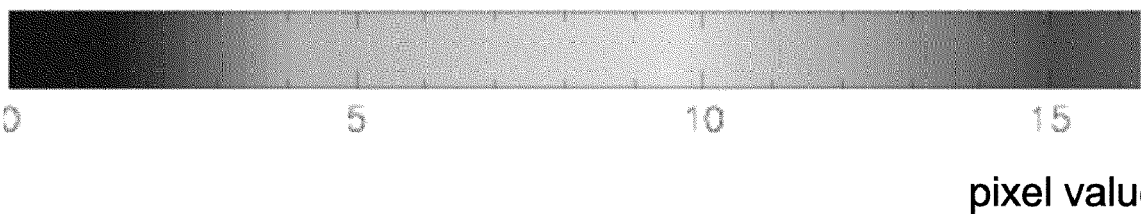
Figure 1C:
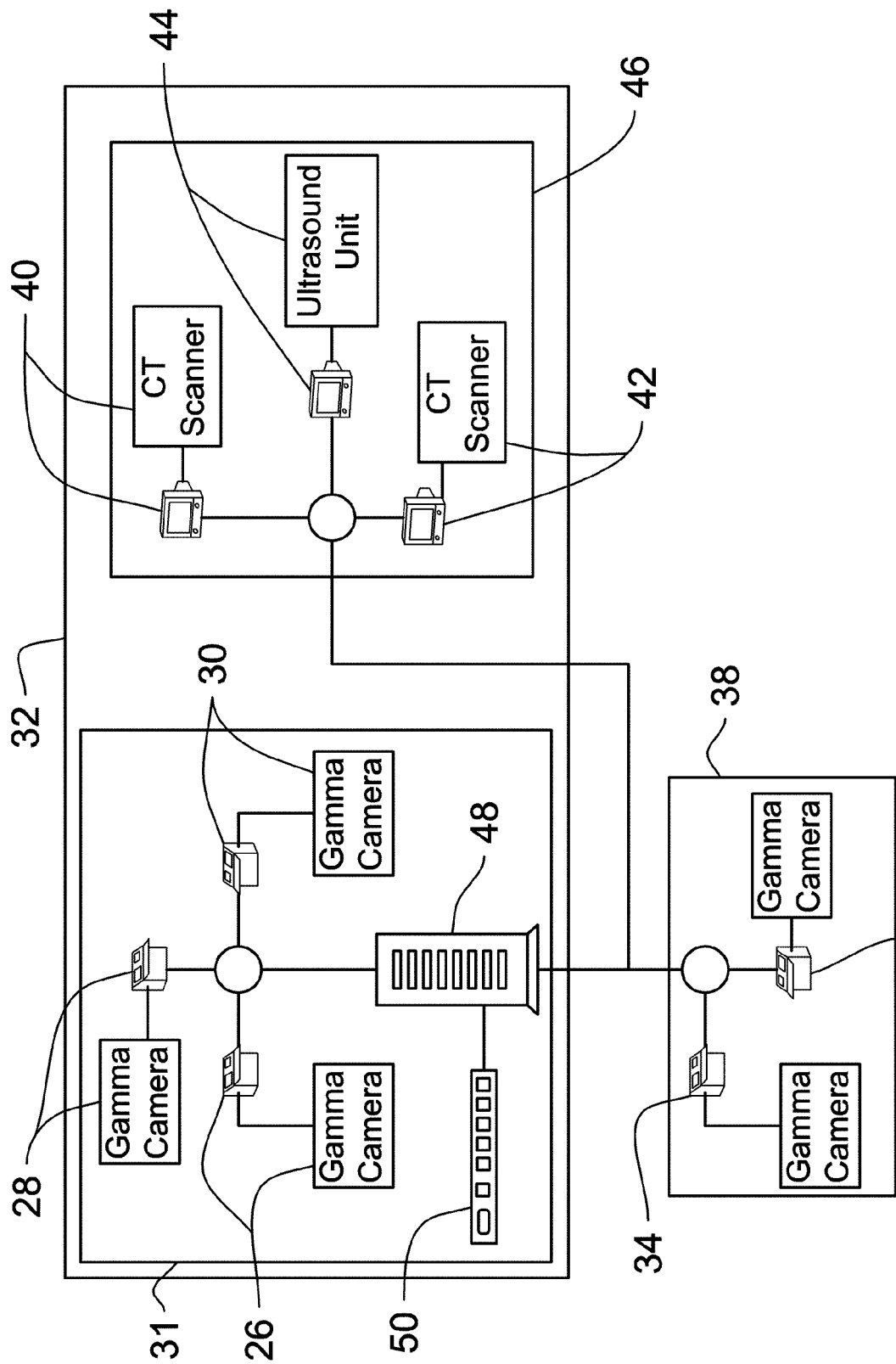
FIG. 1(c) shows a representation of an embodiment of the invention embedded in LAN Ethernet ring architectures with dedicated WAN links to remote sites.

In one version of the invention, as shown in FIG. 1(c), the invention is implemented using LAN Ethernet ring architectures with dedicated WAN links to remote, system administrator, accredited sites. In particular, a plurality of geographically dispersed gamma camera and accompanying processing consoles 26, 28 and 30 in a nuclear medicine department 31 of a first institution 32, gamma camera and accompanying processing consoles 34 and 36 in a second institution 38, CT scanners 40 and 42 as well as an ultrasound unit 44 in a radiology department of the first institution 32 are all connected to a server 48 with entropic digital signal processing (DSP) capabilities.

An option to exercise secure shell ftp and telnet clients 50 is also highlighted.

Typically, an image processing station, such as 26, is connected to imaging hardware on a local area network (LAN). At client request, raw image data files from the station would be uploaded to the server 48, and processed. The resultant filtered images are then stored in a separate data file in a similar data format to the original. The latter would then be amenable to display and analysis in the usual manner on the workstation or other consoles on the LAN.

Figure 2:
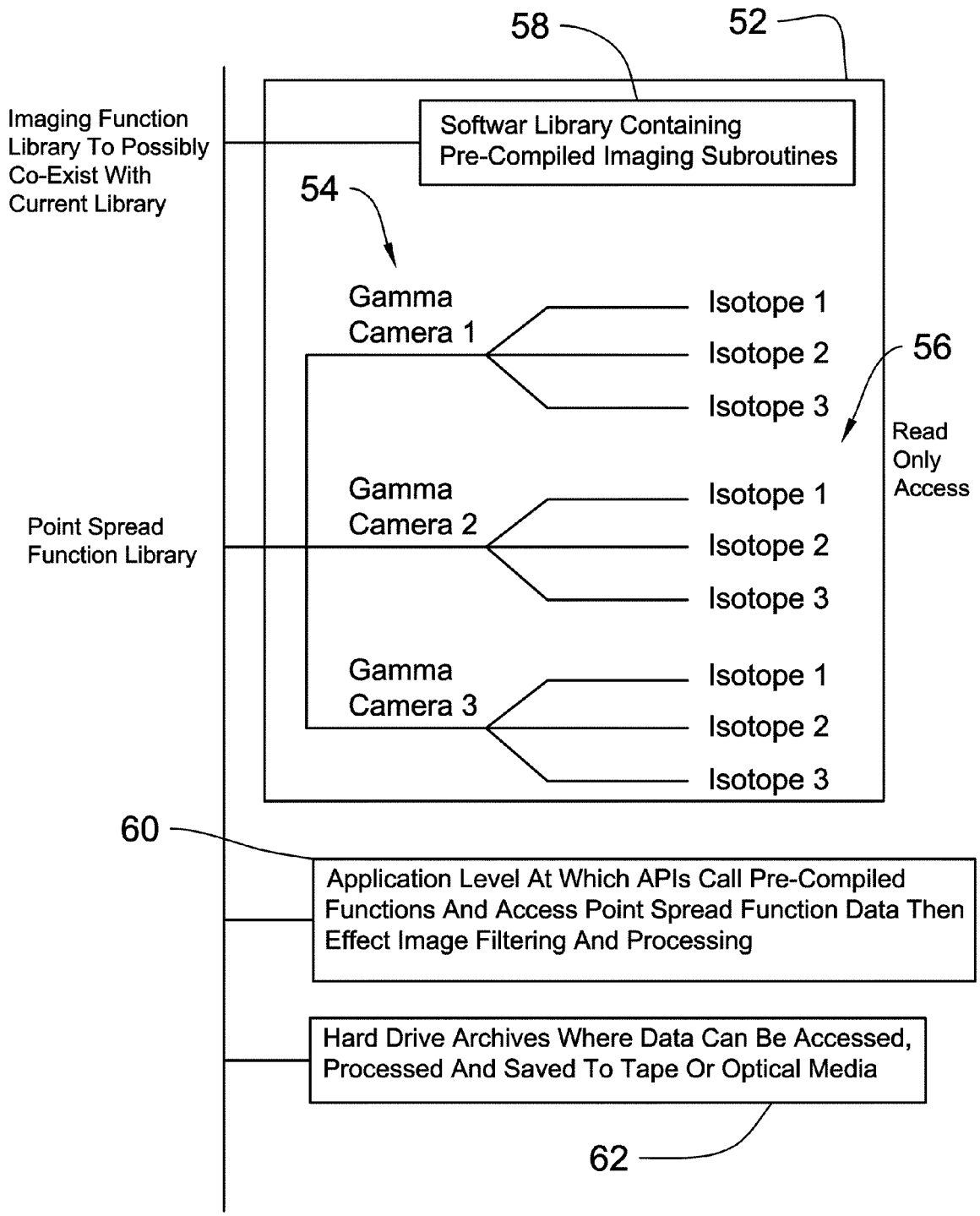
FIG. 2 shows a schematic layout of a data processing architecture for use in the present invention.

As mandatory to the server protocol, and as shown in more detail in FIG. 2, the workstation would include all point spread functions measured for each collimator with every radio-isotope in clinical use. These would be stored in a file system 52 from which each image program execution would read the appropriate point spread function relevant to the study being processed. Referring back to FIG. 1(c), acquisition parameters, such as gamma camera identifier, radio-isotope and energy emission from pulse height analyzer window captured, collimator serial number used and clinical investigation, would all be placed in user function tables and subsequently accessed to provide appropriate image reconstructions.

Turning now again to FIG. 2. For each combination of gamma camera 54 and radio-isotope 56 in clinical use there are point spread functions corresponding to each collimator registered for use with the latter-mentioned combinations. Significantly, a software library 58 containing pre-compiled imaging subroutines can also be accommodated, thereby allowing the image processing software, indicating schematically by numeral 60, to co-exist and work in tandem with other medical imaging software functions. As mentioned above, hard drive archives 62 are provided allowing on-site data storage to be effected.

Figure 3:
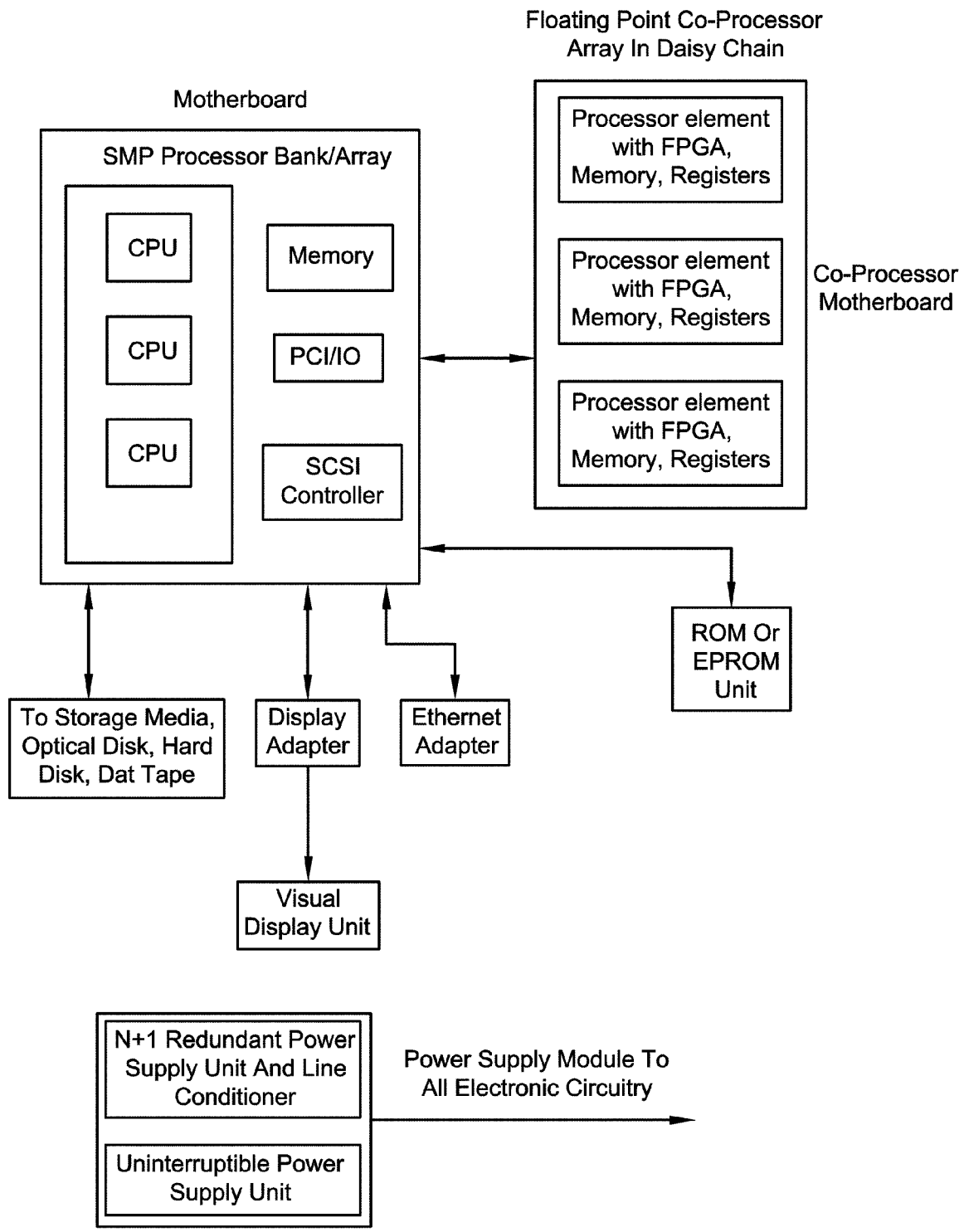
FIG. 3 shows a server hardware configuration for simultaneous, symmetric multiple processor (SMP) server array with co-processing elements for intensive floating point arithmetic, wherein a number of CPU's and co-processors can be deployed on the basis of client load and data throughput requirements.

FIG. 3 shows a hardware configuration for server 48 shown in FIG. 1(c). The file structure affixed to the embodiment of the invention permits real-time display of images, storage to hard-disk and magneto-optic and tape devices as part of one unified body connected directly to medical imaging detector arrays. Legitimate permutation of embodiments to the invention include situation in which the latter functions and capabilities are exported to and integrated with attached computer accompaniment on registered LAN. Or, as server function compliance to duly registered clients in the regard that data, images and clinical reports can be accessed, displayed and augmented by further processing and clinical studies performed on the same patient acquired at later dates. As such database construction is guaranteed by such file structure which allows data to be organized by: patient name, personal identification number, biographical data, clinical history, all image data, clinical results and reports in a single data file for ready query, access and update.

Figure 4A:
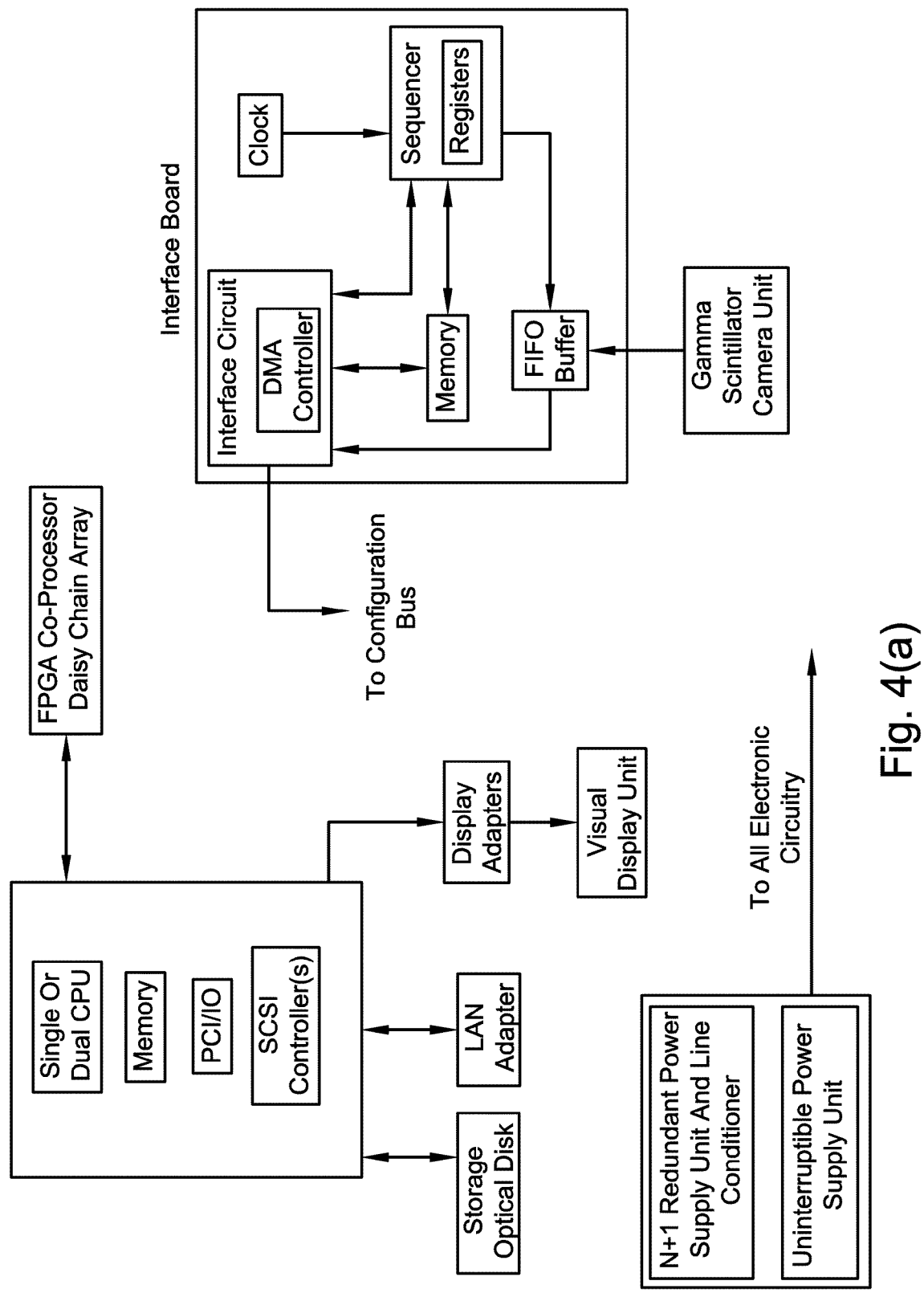
FIG. 4(a) shows a component configuration for a console workstation attached to a gamma camera, of the type shown in FIG. 1(a)

FIG. 4(a) shows the gamma camera and workstations 26, 28, 30, 34 and 36 in more detail. Although the configuration shown in this figure is one of several possible embodiments, it typically comprises various configuration options containing the algorithm e.g. code and operating system on EPROM, beside single or multiple main central processor units (SMPs), field programmable gate arrays (FPGAs) having local memory, random access memory in co-existence with a parallel heterogeneous operating systems and standard peripherals (hard disk, PCI and graphics support) are all legitimate embodiments of the invention. The specification of SMP and EPROM also takes account of the need for digital workstations to multi-task. Whilst a dynamic study of, for example, 500 images is being simultaneously acquired, transferred to console and processed, other clients in the LAN may also request data transfer services notwithstanding load on system resources. Such configuration would also support easy upgradeability in that ever-improving microprocessors can replace older ones with minimal hardware changes. EPROM could also be removed and reprogrammed with newer, complementary algorithms then subsequently re-introduced to the imaging system with minimal effort.

Figure 4B:
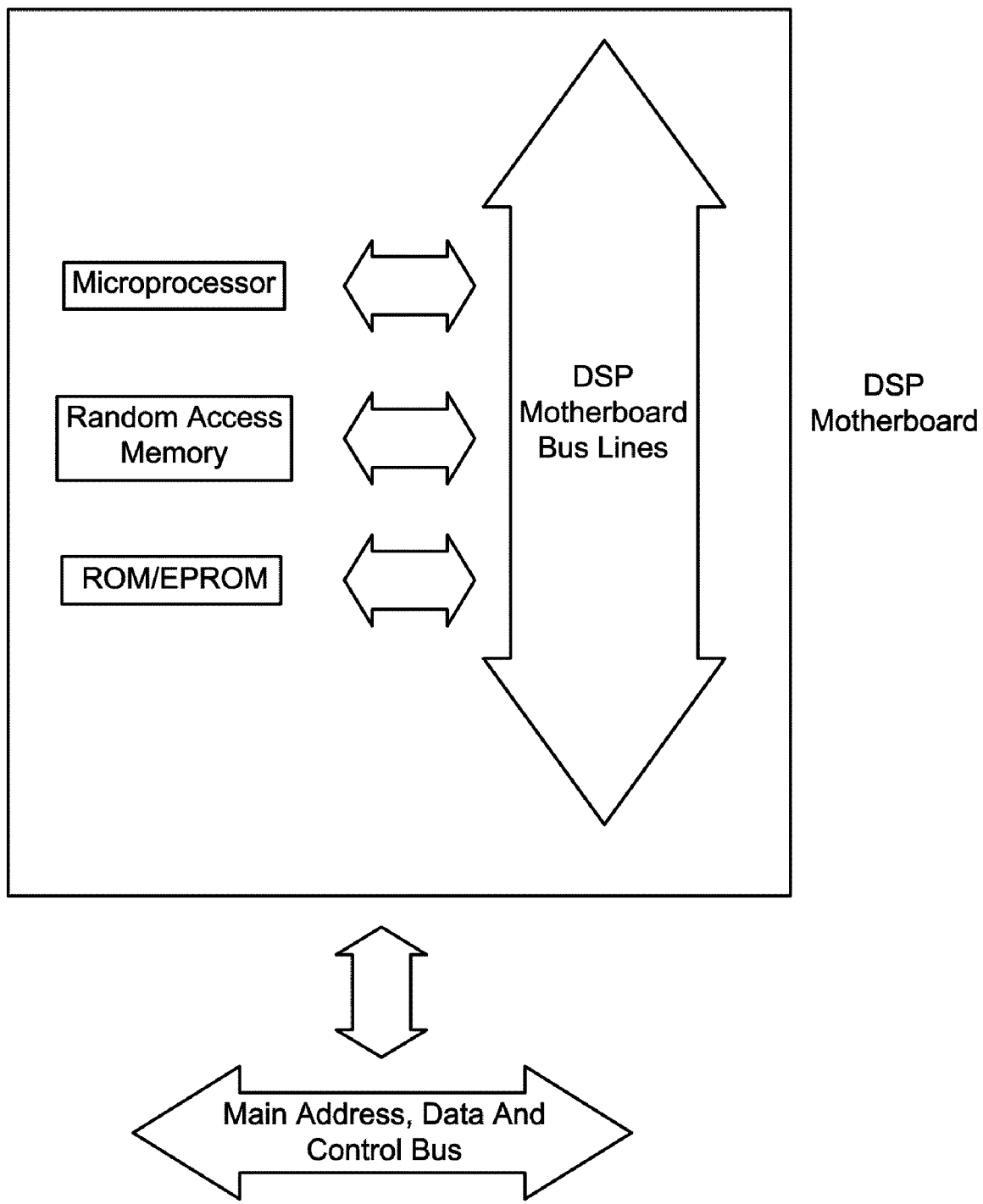
FIG. 4(b) shows an entropic digital signal processing board for implementing the method of the present invention, comprising minimal microprocessor array with random access memory and programmable read only memory chips containing a library of entropic image reconstruction algorithms.
Figure 4C:
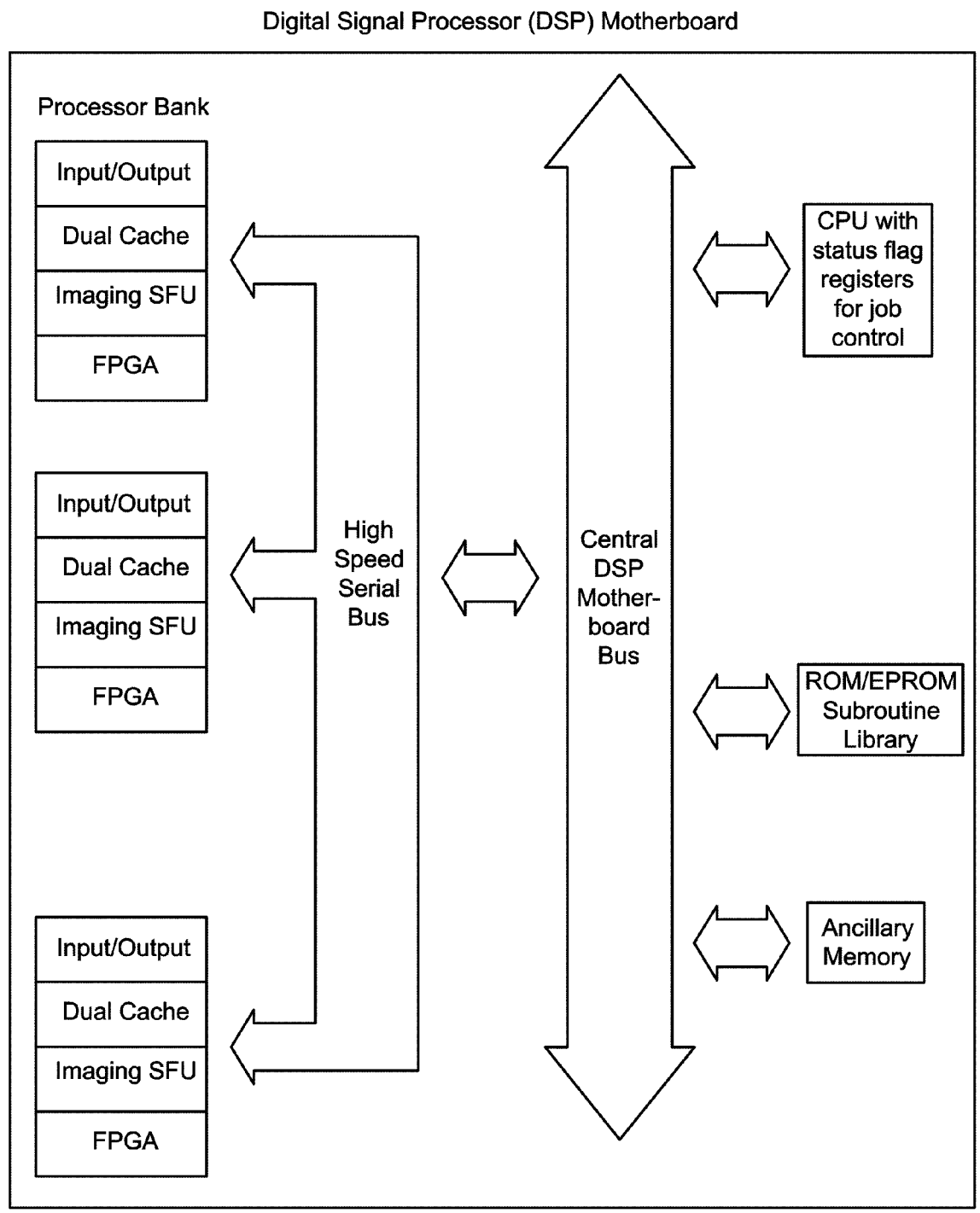
FIG. 4(c) shows an embodiment of the invention employing multiple microprocessor technologies for intensive and real-time entropic image processing.

FIGS. 4(b) and 4(c) proffer embodiments of the invention in which separate digital signal processing (DSP) motherboards can be configured to meet the various levels of processing needs. Such hardware would be designed to process data received from central data bus lines along with control signals, study parameters (image dimensions, radio-isotope, collimator) and effect signal reconstruction with local FPGA, memory and registers. On board memory configured according to the main memory management unit would act as ancillary configurable conduit for image processing data and parameters.

Figure 4D:
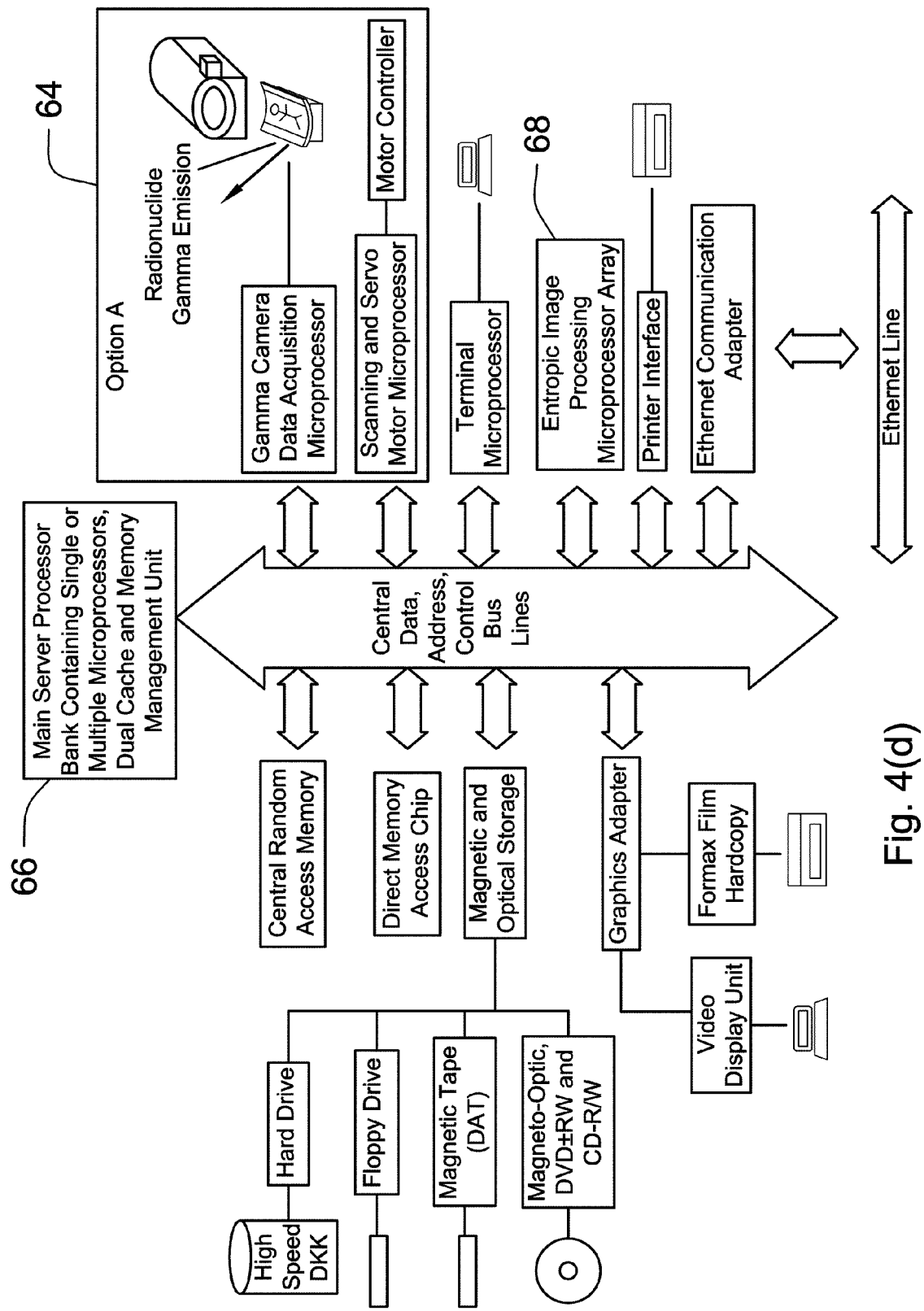
FIG. 4(d) shows a general systems architecture for a nuclear medicine gamma camera, indicated as Option A, utilizing the method of the present invention, and in particular the relationship between the entropic image processing microprocessor of the invention and the remaining components of such a system.
Figure 4E:
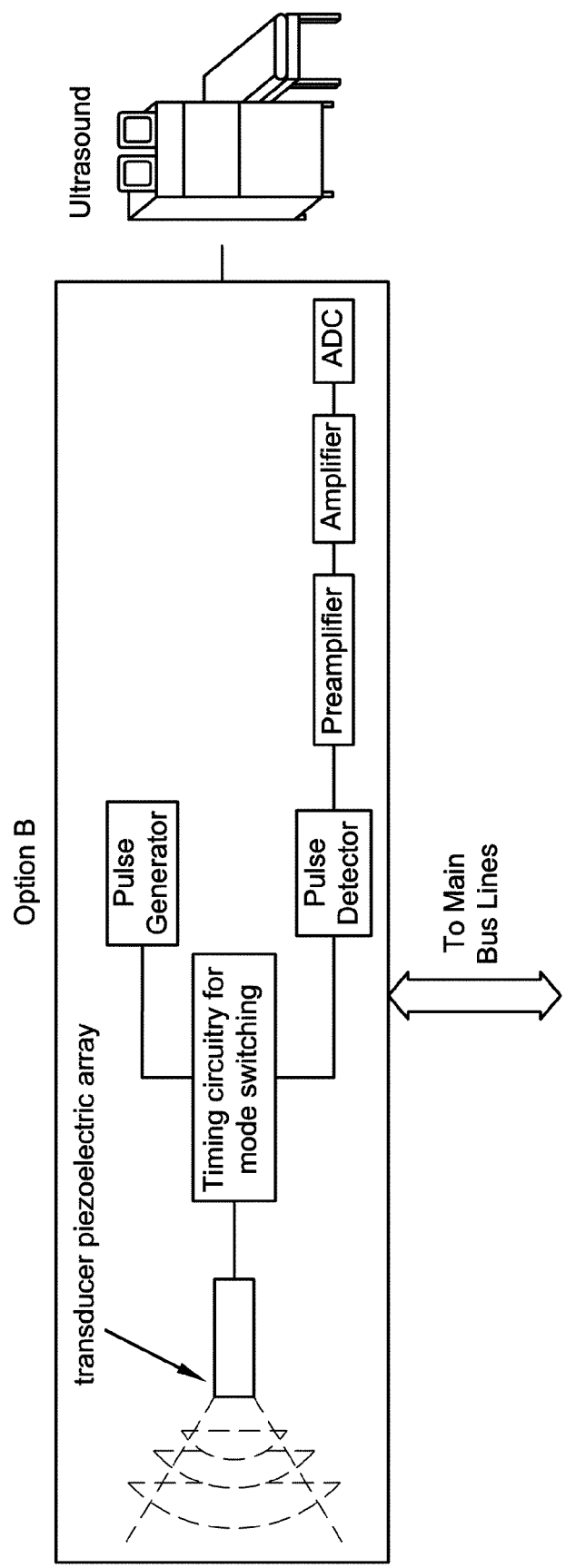
FIG. 4(e) shows an ultrasound unit, indicated as Option B, to fit in to the general systems architecture of FIG. 4(d)
Figure 4F:
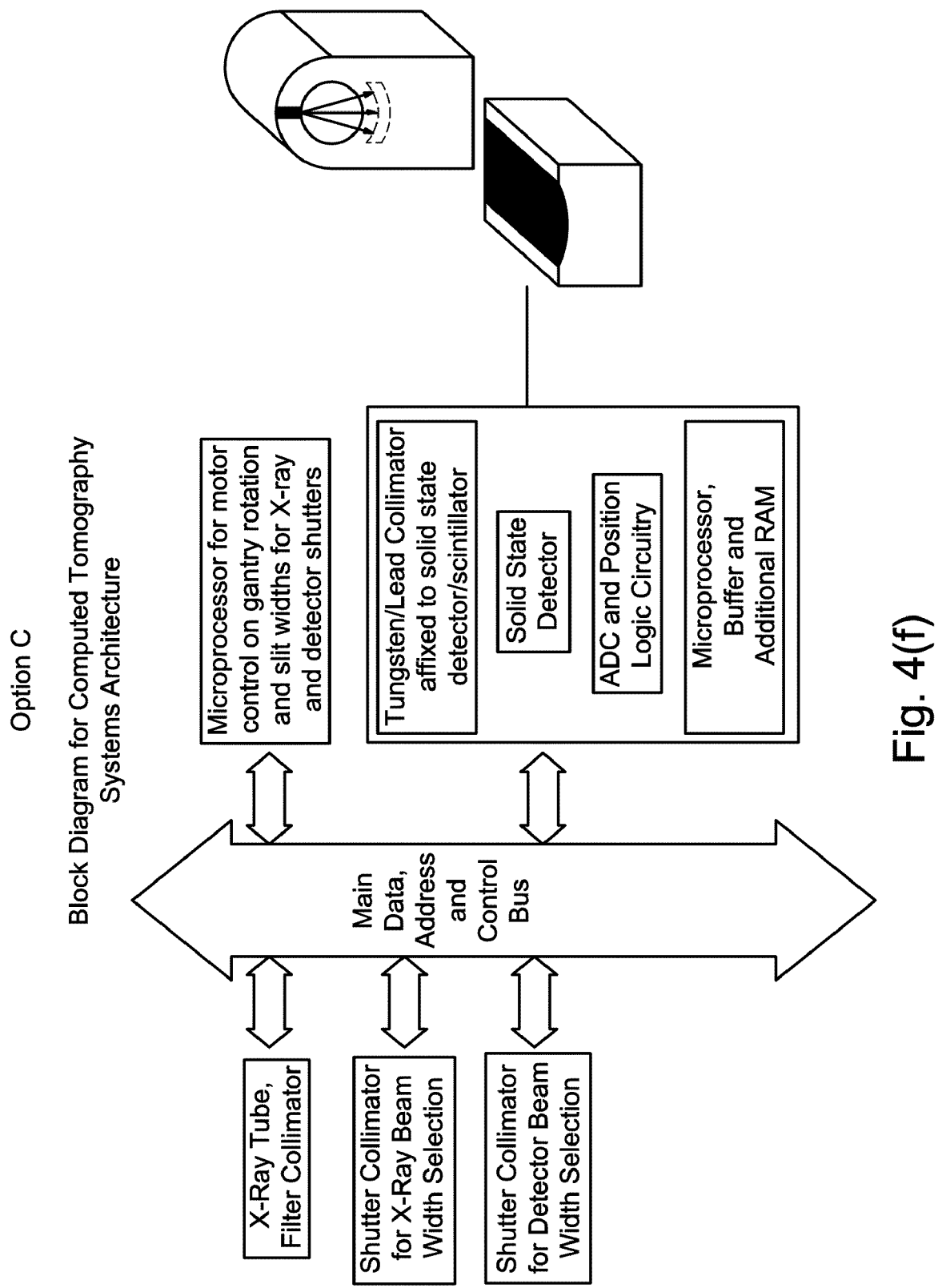
FIG. 4(f) shows a computed tomography unit, indicated as Option C, to fit in to the general architecture of FIG. 4(d)
Figure 4G:
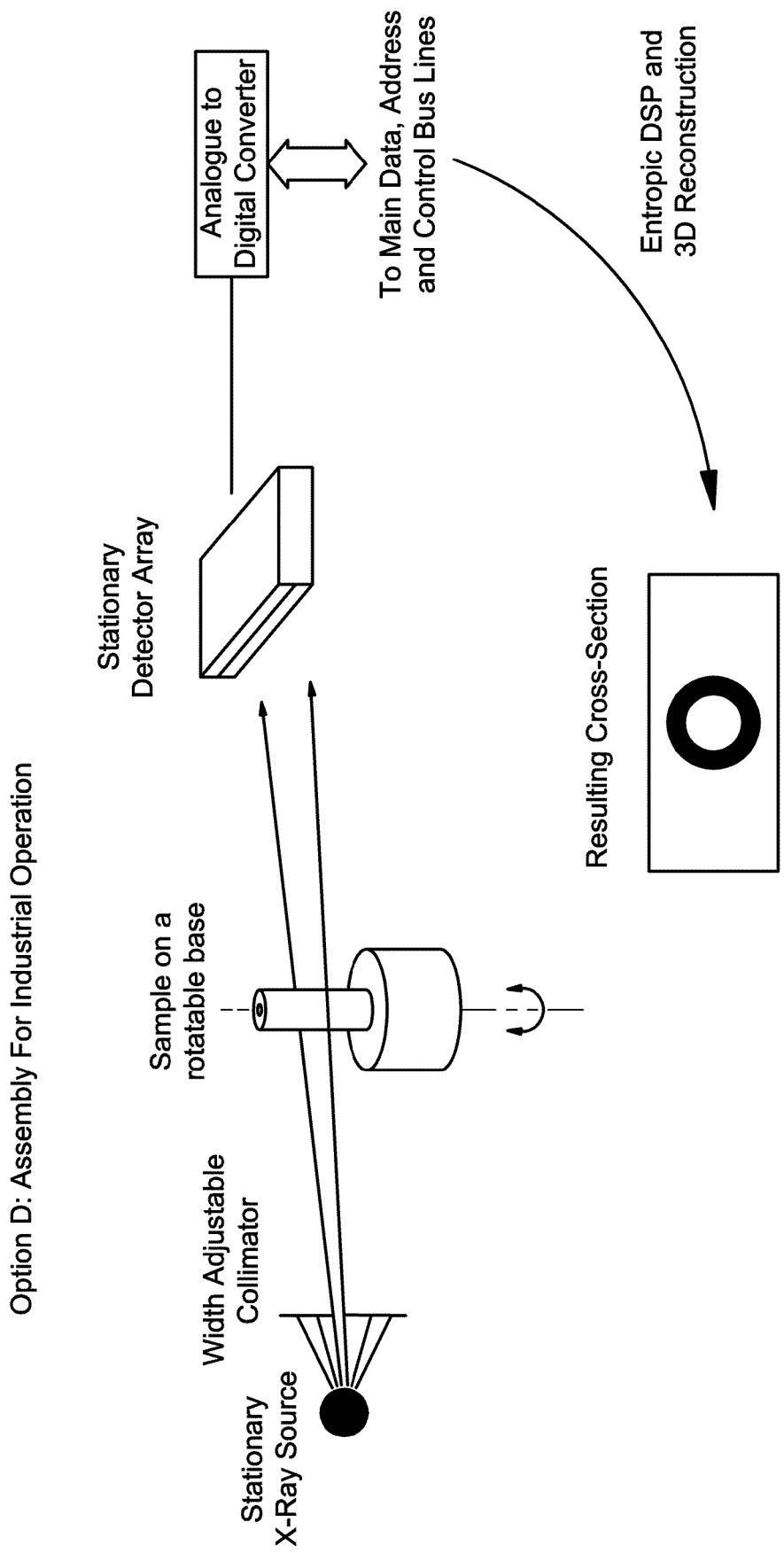
FIG. 4(g) shows an example of the integration of the entropic digital signal processing method of the invention to industrial computed tomography, indicated as Option D.

Amplification of acceptable embodiments of the invention at the microprocessor level can be gained from FIG. 4(d). The latter depicts a scalable medical imaging hardware architecture 64 where the relationship between a main control microprocessor 66 is defined with respect to imaging sensor-detector assembly, main memory, peripheral devices (data storage and hardcopy output) and most relevantly an entropic digital processor component 68. Options A; B and C and their locations in FIGS. 4(d) to 4(f) depict the nuclear medicine, ultrasound and computed tomography points of convergence in such digital architectures. More specifically the relationship with respect to the substance of the present invention, the entropic DSP for image analysis is prescribed in the descriptions provided in FIGS. 4(b) and 4(c). As is the communication component via Ethernet with other medical imaging elements which can also contain embedded entropic DSP capability. Therefore it follows that such generalized architecture is extensible to industrial applications, such as is shown in FIG. 4(g), or indeed a radio-telescope observatory bank or remote sensing satellite. It should be further noted that the invention is not necessarily confined to a single unified body, though in instances it might be for optimal component operational factors, environmental or indeed ergonomic design purposes.

Figure 5:
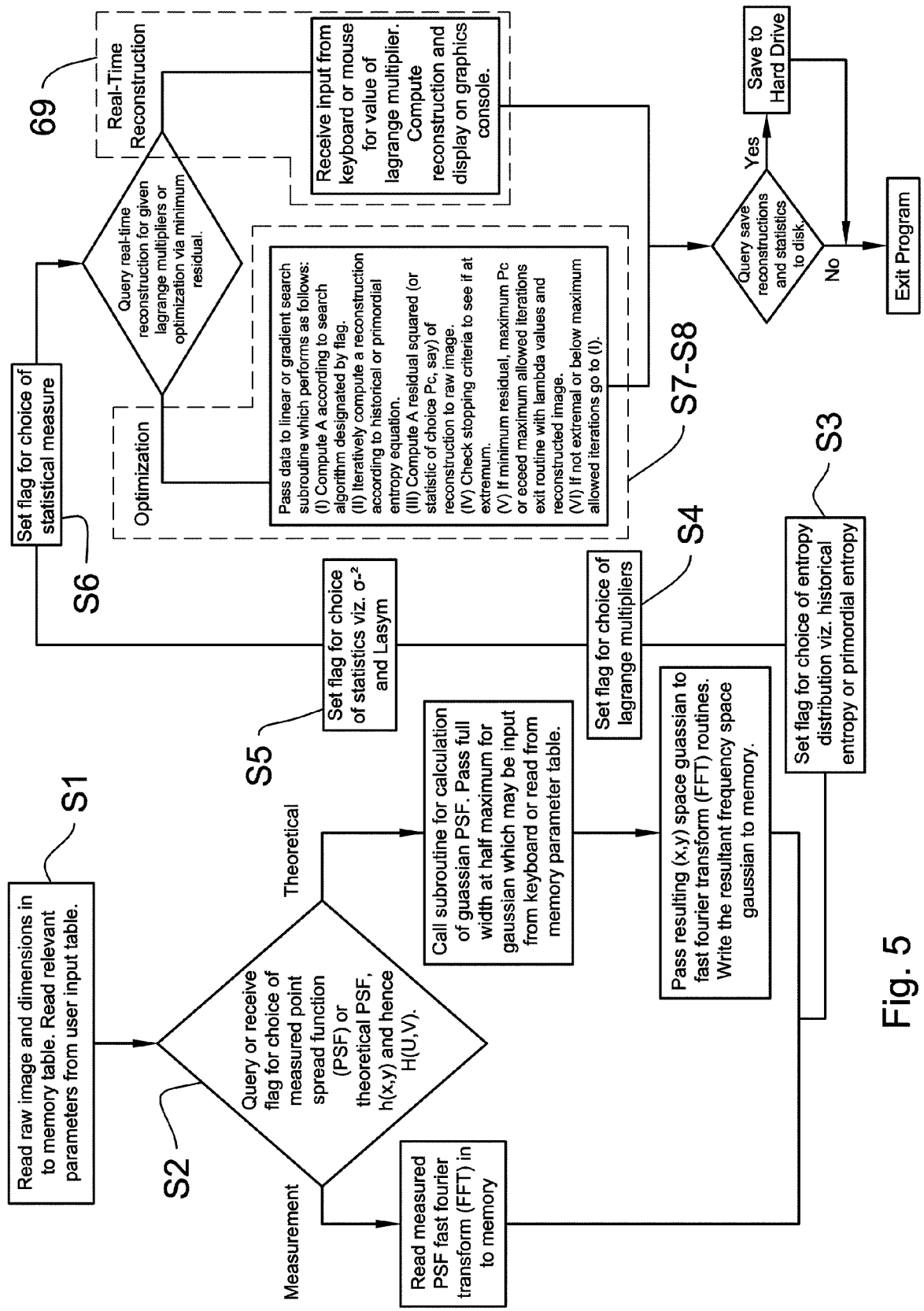
FIG. 5 shows a block diagram providing a filtering and reconstruction algorithm according to the present invention, for implementation in the form of a computer program for use with current compilers and assemblers.
Figure 6A:
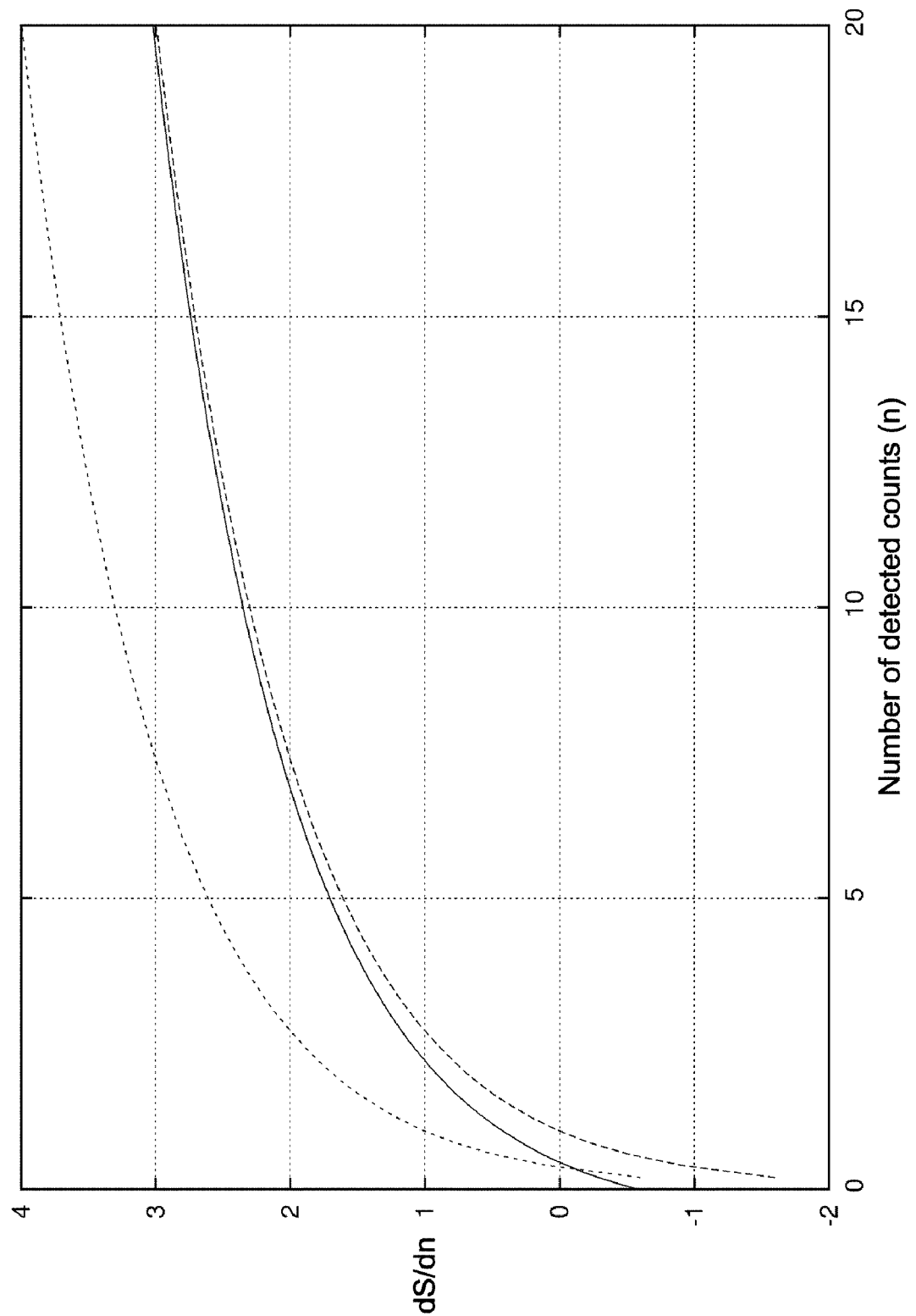
FIG. 6(a) shows a graph of ∇S as a function of counts detected for a single pixel variable n wherein uniform measure m=1 is assumed, thereby illustrating that the exact expression (–) for primordial entropy is analytically well behaved and does not explode at zero as compared to historical entropy $\log_e n+1$ (- - -) or $\log_e n$ (- - -)
Figure 6B:
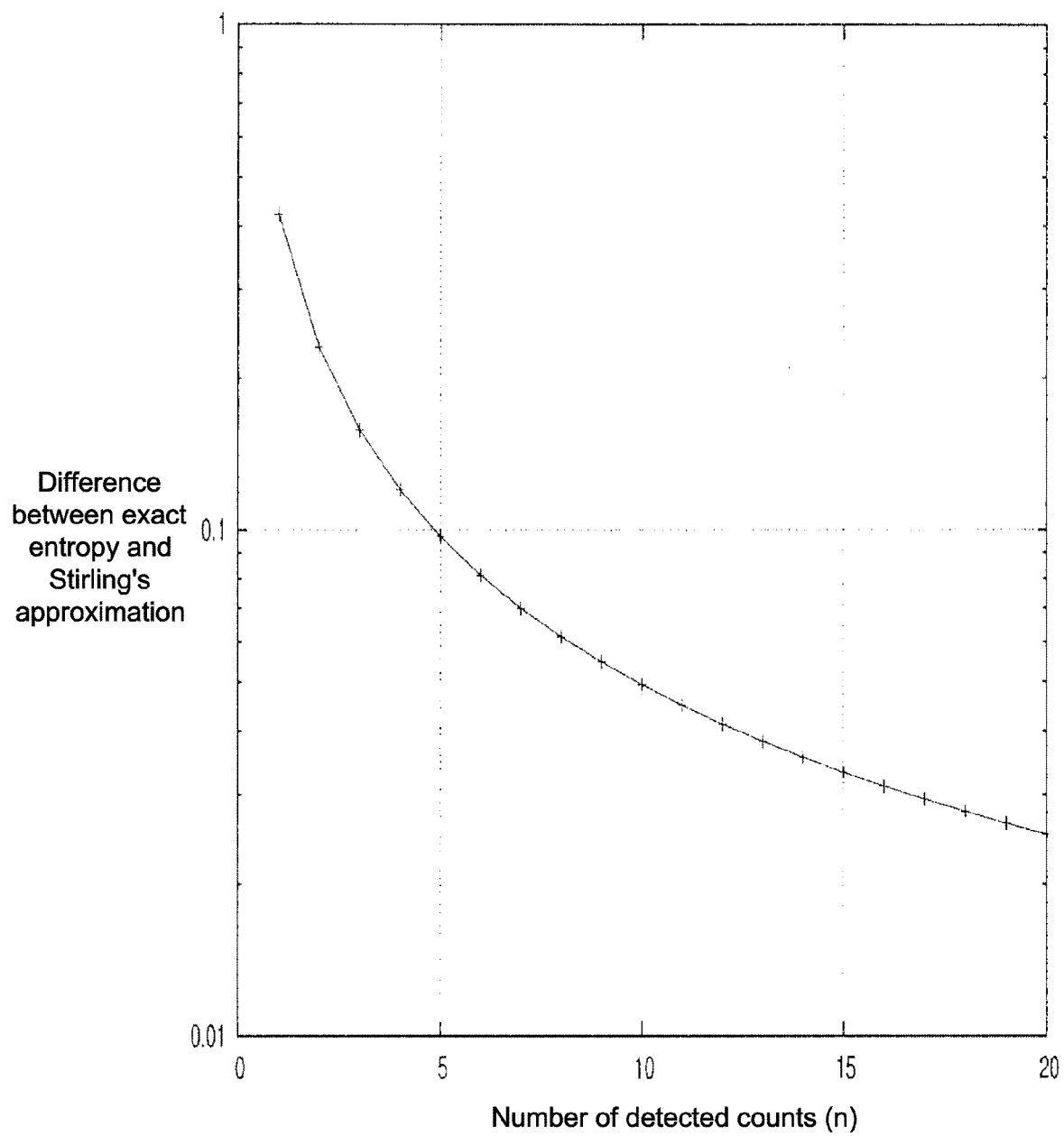
FIG. 6(b) shows a graph of the deviation of the exact, primordial expression from Stirling's approximation represented as $\log_e n$, emphasizing the deviation at low counts.
Figure 6C:
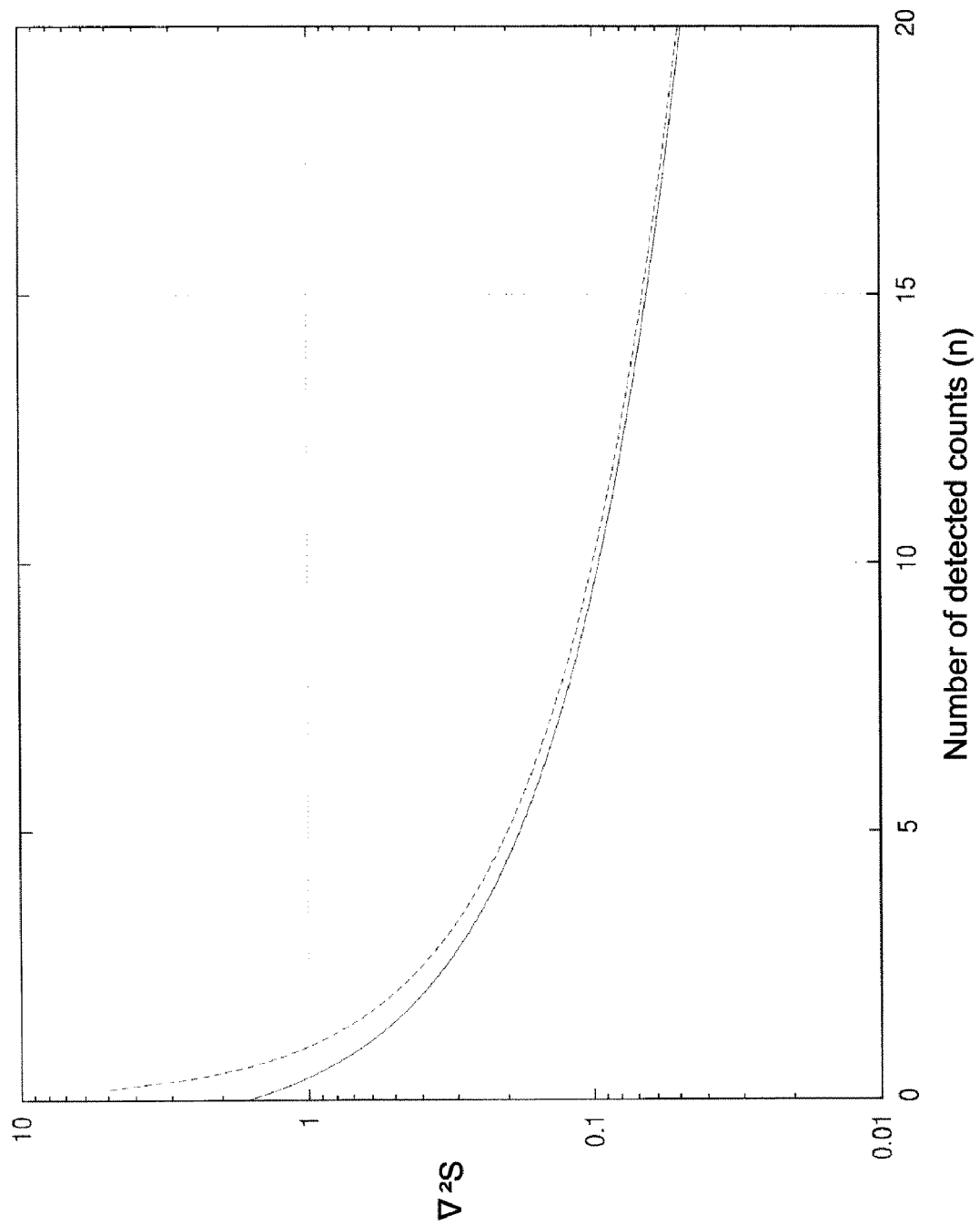
FIG. 6(c) shows a graph contrasting $\nabla^2 S$ for historic entropy where $\nabla^2 S=1/n$ (- - -) and primordial entropy of Equation 12 (–)
Figure 6D:
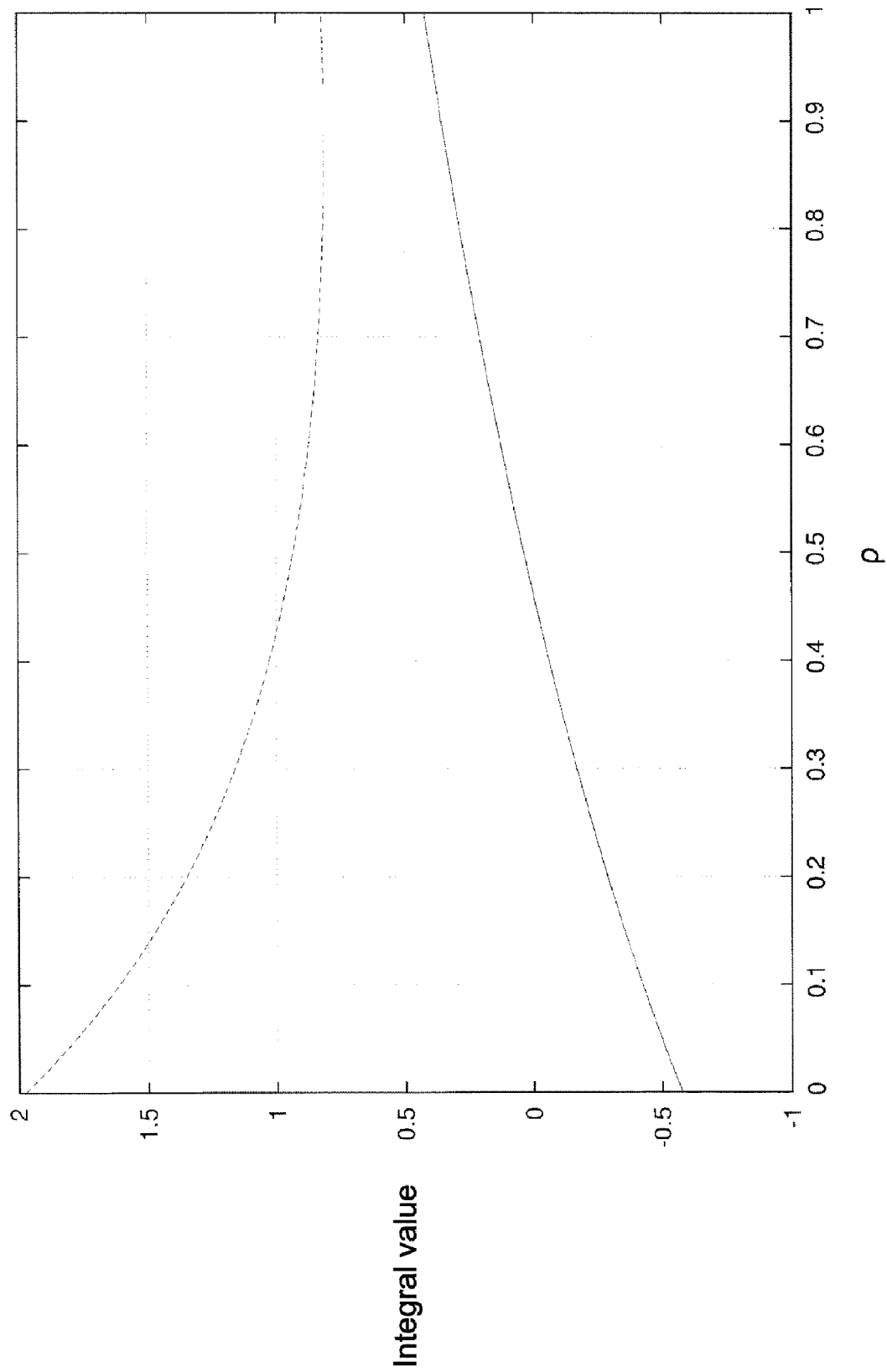

Turning now to the crux of the present invention, a microprocessor is designed to contain the algorithms described in FIGS. 5, 7 and 8 as either on-chip ROM or as on-chip special function unit (SFU). This since requirement for greater portions of microprocessor area incurs premium economic consequence. The latter might also be more general, implying greater utility in broader mathematical co-processor applications, by being hardwired to calculate widely used Fast Fourier Transforms and specific matrix image calculations and common image pixel operations say. For use with commercial microprocessors, whether complex instruction set (CISC) or reduced instruction set (RISC) based, ROM could be placed on digital signal processor (DSP) motherboard beside single processor or indeed multiple microprocessor. On receiving data and control signals from main processor algorithms stored in ROM library can be fetched by microprocessor for job processing. Measured point spread functions may either be parsed from hard disk or latter mentioned local ROM.

Microprocessor functions might also be delegated to specialized floating point processing elements having local memory, arithmetic-logic unit (ALU) and FPGA under control of a less specialized, general microprocessor. Given the need for processing speed and accuracy ancillary RAM bank should be placed on DSP motherboard to store intermediate and final image processing results. Such architecture advocating separate DSP motherboard enhances upgradeability with no down-time in normal operation modes and minimal disruption in DSP functions. This is because upgrade implies removal of DSP motherboard and (PCI) plug-in component replacements. The entropic DSP may then be programmed in parallel processing high-level languages, machine code or combinations thereof.

A real-time GUI is depicted in FIG. 9. Here a user may input a value of the Lagrange multiplier in to a menu box 70 and the reconstructed image would be displayed with its appropriate statistics. Another option of an analogue interface includes the use of a slider 72 which can be positioned with a arrow keys or mouse wheel-and-pointers to increase and decrease the value of Lagrange multiplier or the full width at half maximum of point spread function. Thence providing output image on display with statistics in menu boxes. This then also introduces the ability for data initially pre-processed by entropic algorithms to co-exist and/or be imported in to other imaging algorithms such as 3-dimensional image reconstructions. An important factor necessitating entropic DSP refers to its favorable properties conferred upon boundary detection algorithms. Current methods which filter noise without mathematical reconstruction for point-spread cannot possibly provide a most exacting determination of anatomic boundaries. Therefore pre-processing with entropic DSP incorporated in to boundary detection algorithms necessarily provide better accounts of anatomic structure whose specific physiology has been targeted for analysis. Additionally, the ability to have entropic DSP on LAN to different medical imaging modalities provides the capability to integrate a most accurate account of anatomic (CT) information with physiologic (Nuclear Medicine) data for the same patient.

A further development is the capability to select confined regions-of-interest on sections of images for quick previews of areas of suspected clinical complication. With appropriate hardware adaptation this also suggests application in field spectrometry where a laptop or miniature PDA with advanced mobile microprocessor could be attached to a sampling probe.

Referring first to FIG. 5, a method of processing a digitized image derived from detector instrumentation arrays to form a reconstructed image, according to a first aspect of the present invention, comprises the steps of:
   obtaining the digitized image from an image measuring system and representing the image as a raw image function $g(x,y)$, indicated by block S1; and
   determining for the system a point spread function $h(x,y)$, indicated by block S2.

Whereafter, an analytical form for the statistical entropy distribution of the reconstructed image is selected by setting the delegated flag which subsequently indicates the corresponding subroutines to be called (e.g. subroutines for historical entropy or primordial entropy calculations), indicated by block S3.

In the subsequent Step S4 a flag is set for the selection of Lagrange multipliers $\lambda(x,y)$ represented by image vector $\lambda=[\lambda_{ij}]$, from which a diagonal matrix representation $\Lambda_0=[\lambda_{ij}]_{diagonal}$ from said image vector components can be constructed e.g. if a single multiplier is to be used the reconstruction equation can be simplified implying that the flag setting for this selection indicates the appropriate separate utility subroutine to be called.

Thereafter, a variance statistic $\sigma^{-2}$, for normal quadratic statistics and an asymmetric statistic $L^{asym}(\Lambda_0)$ for statistical analysis beyond said normal statistics is selected by setting its delegated flag to call the subroutine coded according to the first aspect of the invention, indicated by block S5.

Thereafter, and in accordance with the first aspect of the present invention once the statistical measure, represented by an image vector $m=[m_{ij}]$, usually a first order approximation of the historical entropy, is selected S6 an optimization process is undertaken, indicated generally by broken outline S7-S8, comprising the following steps:

Step 7: producing a reconstructed image function $f(x,y)$ using the following restoration equation:

$$\nabla S = 2WD^*W^{-1}\Lambda_0\sigma^{-2}\Lambda_0(g-WDW^{-1}f) - \nabla L^{asym}(\Lambda_0)$$

wherein $W^{-1}$ and $W$ denote Fourier transform and Fourier inverse transform matrix operators respectively, D is a diagonal matrix representation of the point spread function $h(x,y)$, $g=[g_{ij}]$ and $f=[f_{ij}]$ are the vector representations of the unprocessed and normalized reconstructed images $g(x,y)$ and $f(x,y)$ respectively, $\nabla$ the gradient operator over the vector field of f represented by the vector $[\partial/\partial f_{ij}]$, * is the complex conjugation operator and further wherein $\nabla S$ incorporates either historical entropy provided by the following equation:

$$\nabla S = [\log_e f_{ij} - \log_e m_{ij} + 1]$$

or primordial entropy provided by the following recursion equation:

$$\nabla S = \left[\sum_{k=0}^{\Phi-1\geq 0} \frac{1}{f_{ij}-k} + \frac{1}{p!}\int_0^\infty dx e^{-x}x^p \log_e x - \log_e m_{ij}\right]k, \Phi \in Z\rho \in R$$

using an iterative process that is repeated until the successive change in $f(x,y)$ is smaller than a user defined tolerance; and Step 8: iteratively repeating steps 3, 4, 5, 6 and 7 to determine values for Lagrange multipliers $\lambda(x,y)$ which optimize the cumulated probability $P^c$ of data reconstruction $g^{recon}(x,y)$, represented as an image vector $g^{recon}=[g_{ij}^{recon}]$ and defined as $h(x,y)$ convoluted with $f(x,y)$, matching $g(x,y)$ further wherein $g^{opt}(x,y)$ represented by image vector $g^{opt}=[g_{ij}^{opt}]$ is the optimum data reconstruction vector at which values said probability is maximal.

Alternatively, and as mentioned above and indicated in broken outline 69, a user may input a Lagrange multiplier of personal choice.

Turning now to the software algorithms themselves that are used in the present invention, the heart of the iterative algorithms described can be understood from the following optimization of Equation 2(b) given by Equations 3 and 4. Equation 2(a) is discussed in more detail later in the specification.

$$\frac{\partial J}{\partial f} = \nabla J = 0 \qquad (3)$$

which discounting normalization term can be cast in the form:

$$\Im\{\nabla S\} = 2\lambda\{H^*(u,v)G(u,v) - |H(u,v)|^2 F(u,v)\} \qquad (4)$$

where $\Im$ denotes Fourier transform operation and * is the complex conjugation operator. $H(u,v)$, $G(u,v)$ and $F(u,v)$ are the frequency space transforms of $h(x,y)$ the point spread function, $g(x,y)$ the raw image and $f(x,y)$ the reconstructed image. The initial value for statistical measure, for either historical or primordial entropy image reconstruction, is set equal to the first order solution for the given $\lambda$ of Equation 4 when historical entropy $S=\Sigma f_{ij} \log_e f_{ij}/m_{ij}$ is applied viz.

$$m(x, y) = \mathcal{F}^{-1}\left\{\frac{2\lambda H^*(u,v)G(u,v)}{2\lambda|H(u,v)|^2 + 1}\right\} \quad (5)$$

Initial value for F(u,v) is then set to zero matrix and the right hand side of Equation 4 is calculated. The value of f(x,y) for which the left hand side is equal to the latter provides the first iterated value for the reconstruction which is normalized to total counts contained on raw image. This process is repeated until the successive change in f(x,y) is smaller than some user defined tolerance, one percent say. This process is depicted in FIG. 7 in addition to the following procedure described. Explicitly, historical entropy provides:

$$\nabla S = [\log_e f_{ij} - \log_e m_{ij} + 1] \quad (6)$$

For exact, primordial entropy the following applies for $\nabla S$:

$$\nabla S = \left[\sum_{k=0}^{\Phi-1 \geq 0} \frac{1}{f_{ij}-k} + \frac{1}{p!}\int_0^\infty dx e^{-x} x^p \log_e x - \log_e m_{ij}\right] k, \Phi \in Z \rho \in R \quad (7)$$

full specification wherein the integer portion of $f_{ij}$ is $\Phi$ and the fractional remainder is $\rho$ being given by:

$$0 < \rho = f_{ij} - \Phi < 1, f_{ij} \in R \quad (8)$$

For values of $f_{ij} < 1$, $\Phi = 0$, the first term of Equation 7 is zero and solution is found in the remaining terms thereof, as per FIGS. 6(*c*) and 6(*d*).

Furthermore to exploit numerical techniques to find optimal image reconstructions $\nabla^2 S$ is also of certain interest.

$$\nabla^2 S = -\phi^2(f_{ij}) + \sum_{k=0}^{\Phi-1 \geq 0} \frac{2\phi(f_{ij}-k-1)}{f_{ij}-k} + \frac{1}{0!}I(0) \quad (9)$$

$$= -\phi^2(f_{ij}) + \sum_{k=0}^{\Phi-1 \geq 0} \frac{2\phi(f_{ij}-k-1)}{f_{ij}-k} + \int_0^\infty dx e^{-x}(\log_e x)^2 f_{ij}, k, \Phi \in Z \quad (10)$$

and making an analytic extension to real variable:

$$\nabla^2 S = -\phi^2(f_{ij}) + \sum_{k=0}^{\Phi-1 \geq 0} \frac{2\phi(f_{ij}-k-1)}{f_{ij}-k} + \frac{I(\rho)}{\rho!} \quad (11)$$

$$= -\phi^2(f_{ij}) + \sum_{k=0}^{\Phi-1 \geq 0} \frac{2\phi(f_{ij}-k-1)}{f_{ij}-k} + \frac{1}{p!}\int_0^\infty dx e^{-x} x^p (\log_e x)^2 k, \quad (12)$$

$$\Phi \in Z f_{ij}, \rho \in R$$

where:

$$\phi(f_{ij}) = \sum_{k=0}^{\Phi-1 \geq 0} \frac{1}{f_{ij}-k} + \frac{1}{\rho!}\int_0^\infty dx e^{-x} x^p \log_e x \, k, \Phi \in Z \rho \in R$$

$$I(\rho) = \int_0^\infty dx e^{-x} x^p (\log_e x)^2$$

In effecting image processing, for example, error is thus constrained to experimental and computational numeric limitations. There are no theoretical approximations to the entropic contribution. Consequently a preferred numerical implementation of the invention with primordial entropy provides machine instruction and embodiment which when directed: (i) Produce numerical values for the integral terms of Equations 7 and 12 at pre-selected equidistant spacing of p on the relevant interval [0:1]; (ii) Compute interpolation coefficients; and (iii) Store such values to permanent memory. When required, and on demand, instructions for transfer of such values in to volatile memory for ready access, on further direction produce interpolated solutions to Equation 4 or the more general equation to follow further on in the specification. Explicitly, since solution to Equation 4 implies solution of the following form:

$$\nabla S(f_{ij}) = \kappa$$

Wherein $\kappa$ is just some real number computed from a current estimate of $f_{ij}$, an updated or new $f_{ij}$ may then be determined from machine implemented gradient search instructions such as provided by the Newton-Raphson technique wherein:

$$f_{ij}^{new} = f_{ij}^{old} - \frac{\nabla S(f_{ij}^{old}) - \kappa}{\nabla^2 S(f_{ij}^{old})}$$

Which iteration may be terminated when a user defined tolerance level $\delta$, such that $|f_{ij}^{new} - f_{ij}^{old}| < \delta$, is at once satisfied. A preferred method of computing $\nabla S(f_{ij}^{old})$ and $\nabla^2 S(f_{ij}^{old})$ comprises steps of finding the nodes in each case on FIG. 6(*d*) between which $f_{ij}^{old}$ fits and exacting a value based upon the interpolation coefficients between said nodes. Since any number of standard conventional methods, e.g. linear splines, cubic splines, etc, can be used though with variable computational burden they fall under the methods of the invention. Furthermore as such coefficients may be computed once and archived for subsequent use, implying thereby that computational burden can be limited to an single, initial processing step so as not to factor in to the real-time processing effort, higher accuracies can be readily justified.

In order to accelerate convergence the following extrapolated iteration sequence described in a paper by Jones B (1982), "A note on the T transformation" *Nonlinear analysis, Theory, Methods and Applications* 6 303-305 is also included, along with the direct iteration algorithm, as an enhanced embodiment of the substance of the invention.

$$f_{ij}^{new} = \frac{f_{ij}^n f_{ij}^{n+2} - \{f_{ij}^{n+1}\}^2}{f_{ij}^{n+2} - 2f_{ij}^{n+1} + f_{ij}^n} \quad (13)$$

Here $f^{new}$ would represent the result of an extrapolation of three previous iterates viz. $f^n$, $f^{n+1}$, and $f^{n+2}$ of the $(ij)^{th}$ pixel of interest and it is this step that is depicted in FIG. 8 in relation to the broader method of the invention. To address the optimal selection of Lagrange multiplier, an example of cumulated probability $P^c$ is given by:

$$P^c = e^{-\xi^2}, \xi^2 = \|g - Hf\|^2 \quad (14)$$

and may be used as a means to choose a reconstruction which has minimum residual. However, the following more general form:

$$P^c = \exp\left(\sum_{ij} -S_{ij} - L_{ij}\right)$$

is incorporated in to the invention.

Furthermore algorithms and methods in which the latter indices are used in tracking and optimizing individual image pixels also fall under the purview of the invention, though with further consequence for memory and computational consumption.

As can be appreciated from the raw data depicted in FIG. 11 and the reconstructions of FIGS. 12-15 considerable enhancements in local smoothness are gained with an increase in structural definition. This is a hallmark of the statistical entropy reconstruction methods which seek Lagrange multiplier satisfying Equation 4, while providing minimum reconstruction image versus original image residual. The difference in Equations 6 and 7 can be seen in FIGS. 13 and 15 where the extrapolated iteration technique was applied. One aspect of this example is that better local smoothness with good structural resolution was achieved on the exact entropy calculation (FIG. 15). Therefore the effect of the latter would be greatest where high frame rates arm used in dynamic acquisitions to study blood flow and cardiac function for example.

Higher level embodiments of the invention engage the recursion in which the optimal reconstruction chosen as measure and the entire iteration sequence of Equation 4 and its algorithmic permutations that are Equations 6 and 7 are applied.

FIG. 16 depicts the different levels of recursion as implemented by the invention for unknown statistical measures theoretically thought to follow image reconstructions and vice versa. Prior art describing the latter concept, though without real world implementation, may be found in a paper by Akaike H (1977) entitled "An objective use of Bayesian models" *Ann. Inst. Statist. Math* 29 Part A 9-20. At first level an initial λ and corresponding measure ($M_0$) of Equation 5 is input to the optimization subroutines along with raw image (G), point spread function (H) and initial guess for the reconstruction (zero or equal to $M_0$).

The subroutine controlling the search for optimal Lagrange multiplier (S(λ)) may optionally compute an initial, thence subsequent guesses for multiplier along with updated $M_0$ for such value of λ. The iteration subroutine (A) is then called for the given value of λ and the solution for Equations 4 and either of Equations 6 or 7 sought. Within the latter subroutine the fractional difference between current iterate and previous iterate is computed (Ψ). If it is less than a user defined tolerance the subroutine is exited. If not, a further iteration is performed. This query is represented in the block diagram as $Q_f$. The subroutine is also exited if some pre-selected maximum number of iterations occurs without the tolerance being met.

On exit from the iteration loop the residual square or $P^c$ of the reconstructed image is computed and the test for convergence $Q_\lambda$ as a function of λ is computed. If the selected tolerance is not met then the algorithm which computes the next guess for λ viz. S(λ) is re-entered. If such tolerance is met then the optimal reconstruction may be passed to the next level iteration cycle where it can be used as initial estimate for the statistical measure. In higher such level iteration cycles statistical measure need not be updated according to Equation 5 and the search for λ can be confined to the locally converged to in the first level iteration cycle.

Permutations of such iteration cycles over the measure include choices of:
  (i) Historical signal entropy or primordial signal entropy.
  (ii) Measured point spread function or theoretically derived Gaussian of pre-selected full width at half maximum for H.
  (iii) Zero initial guess for reconstruction $f_{ij}=0$ or choice of measure as described by Equation 5, namely $f_{ij}=m_{ij}$.
  (iv) Different search algorithms for best estimate of Lagrange multiplier, S(λ). Once the termination criterion is cast as an equation, standard search algorithms can be applied for solution. Typical convergence criteria used are minimum chi-squared, $\chi^2 \cong N$, or maximum $P^c$.
  (v) Direct iteration (D), extrapolated iteration (E), historical entropy (H) and primordial entropy (P) combinatorial selections are depicted in FIGS. 17(a) to 17(d) by A with the appropriately positioned subscripts defined here. The first subscript refer's to iteration algorithm while the second refers to the choice of entropic representation.

Rather than engaging an $N^{th}$ level recursion for, the statistical measure according to FIG. 16, the following introduces a mathematical means with which to incorporate the theoretical knowledge that reconstructions should follow the measure along stable iteration cycles and vice versa. The overall functional J can be adapted thus:

$$J(f) = S + \lambda_0 \lfloor \|g - Hf\|^2 - \|n_\sigma\|^2 \rfloor + \qquad (15)$$
$$\lambda_1 \lfloor \|f - m\|^2 - \|r\|^2 \rfloor + \lambda_2 \left[\Gamma_0 - \sum_{ij} f_{ij}\right] + \lambda_3 \left[\Gamma_0 - \sum_{ij} m_{ij}\right]$$

which implies $$m_{ij} = \frac{2\lambda_1 f_{ij} + \sqrt{4\lambda_1^2 f_{ij}^2 + 8\lambda_1 f_{ij}}}{4\lambda_1} \qquad (16)$$

which introduces further permutations. One may use Equation 15 in isolation or in conjunction with Equation 2(b). FIG. 17(a) depicts an iteration cycle $\Pi \Leftrightarrow Q_\phi$ in which the measure is updated to follow the reconstruction iterate (μ) as specified by Equation 16. As an $N^{th}$ level algorithm the situation depicted in FIG. 17(b) applies. This also suggests a permutation in which measure is updated after iteration cycle $A_{ij}$, FIG. 17(c), which is then passed to the next level, FIG. 17(d). Since the similarities with FIG. 16 are clearly evident, slightly greater computational effort is expected, with the economic consequence being relatively similar.

Focusing now on optimizing the more general embodiment of the invention encapsulated in Equation 2(a) wherein the following, quasi-reducible matrix system discounting normalization terms is produced:

$$0 = W^{-1}\nabla S - 2\lambda_0 D^* W^{-1} \sigma^{-2} g + 2\lambda_0 D^* W^{-1} \sigma^{-2} WDW^{-1} f \qquad (17)$$

when the asymmetric statistic is omitted. In this form Equation 18 can be used when a number of measurements (M, say) of the image, $g_1$ to $g_M$ say, under analysis will be available. In such a case the $\sigma^{-2}$ covariance matrix can be computed by the standard form given in Equations 18 and 19.

$$\sigma^2 \approx \frac{1}{M} \sum_{l=1}^{M} (g_1 - \bar{g})(g_1 - \bar{g})^T \quad (18)$$

$$\bar{g} = \frac{1}{M} \sum_{l=1}^{M} g_1 \quad (19)$$

In cases where the latter matrix has banded structure with respect to its diagonal efficient forms of run-length row encoding can be used to minimize storage requirements. This is significant since the size of a covariance matrix of a 1024×1024 image is a Terabyte. Despite the availability of 64-bit microprocessor technologies to address, theoretically at least, several Exabytes of random access memory, storage of uncompressed covariance matrices presupposes practical economic consequences.

FIG. 18(a) provides a schematic representation for real-world application where inversion to obtain $\sigma^{-2}$ is necessary for applications of Equation 17. As to be appreciated from this more algebraic operations are required as compared to the optimization problem of Equation 2(b) where $\sigma^{-2}$ is omitted.

When $\sigma^{-2} \sim [1/g_{ij}]_{diagonal}$ the problem addressed is the $\chi^2$ problem. This simplification to the algorithm described in FIG. 18(a) reduces storage requirements for the variance structure, $\sigma^{-2}$ and corresponding matrix multiplications required for solution.

$$0 = W^{-1} \nabla S - 2\lambda_0 D^* W^{-1} 1 + 2\lambda_0 D^* W^{-1} \sigma^{-2} W D W^{-1} f \quad (21)$$

An example of which reconstruction can be viewed in FIG. 18(b).

Furthermore, when the quadratic mathematical interpretation that provides $\sigma^{-2} \sim \nabla^2 J$ is applied, the need for massive computational effort is emphasized since the following iterative cycles suggest.

$$0 = W^{-1} \nabla S - 2\lambda_0 D^* W^{-1} \sigma_n^{-2} g + 2\lambda_0 D^* W^{-1} \sigma_n^{-2} W D W^{-1} f \quad (22)$$

where $\sigma_0^{-2}$ can be taken to be I, the identity matrix, or $[1/g_{ij}]_{diagonal}$. Such embodiments become the more vital in the clinical setting (dynamic flow studies) where one cannot perform more than one image sample of patient due to ethical consideration and limitation to acceptable administered radiation dosages as weighted against patient benefit etc. The implication then is that one may adopt an initial guess for the variance model and iterate over Equation 17 until some convergence criterion is met.

FIG. 18(c) provides an example of a clinical application of Equation 17 to 60, 1 minute temporal measurements comprising hepatic histogram, g. The depicted cardiac histogram of identical temporal resolution was taken to represent radiopharmaceutical supply to liver, f, which when convoluted with unknown hepatic temporal point spread function h results in reconstructions of g. This reconstruction used historical entropy and measure assigned according to Equation 5, omitted $L^{asym}(\Lambda_0)$ and substituted diagonal matrix $\Lambda_0 = [\lambda_{ij}]_{diagonal}$ for $\lambda_0$ in Equation 17 as follows:

$$W^{-1} \nabla S = 2\Lambda_0 D^* W^{-1} \sigma^{-2} g - 2\Lambda_0 D^* W^{-1} \sigma^{-2} W D W^{-1} f$$

As can be seen from the figure, the optimal temporal point spread function is a reasonable representation of expected decaying exponential behavior from which a mean residence time of radiopharmaceutical in liver can be computed.

Prior art in which a comparable approach was applied for reconstructing one-dimensional optical line spectra of limited length is described in a paper by Frieden B R (1972) entitled "Restoring with Maximum Likelihood and Maximum Entropy" *J. Opt. Soc. Amer.* 62 511-518. FIG. 18d shows the multipliers derived from the restoration. Though FIG. 18c provides good representations of the data g a method of delegating a Lagrange multiplier to each residual is formally given by:

$$J = S + (g - Hf)^T \Lambda_0 \sigma^{-2} \Lambda_0 (g - Hf) + L^{asym}(\Lambda_0) \quad (23)$$

Since Lagrange multipliers are simply scale factors, the selections $\Lambda_0 = [\lambda_{ij}]_{diagonal}$ and $\Lambda_0 = [\sqrt{\lambda_{ij}}]_{diagonal}$ are equivalent. So as the optimization result is:

$$\nabla S = 2 H^T \Lambda_0 \sigma^{-2} \Lambda_0 (g - Hf) - \nabla L^{asym}(\Lambda_0) \quad (24)$$

In the less likely case where $\sigma^{-2}$ is asymmetric the following may be used:

$$\nabla S = H^T \Lambda_0 (\sigma^{-2} + \sigma^{-2T}) \Lambda_0 (g - Hf) - \nabla L^{asym}(\Lambda_0) \quad (25)$$

Since the usual matrix operators are used as follows:

$$\nabla S = 2 W D^* W^{-1} \Lambda_0 \sigma^{-2} \Lambda_0 (g - W D W^{-1} f) - \nabla L^{asym}(\Lambda_0) \quad (26)$$

greater computational expense results in attempts to find AO which provides optimal $P^c$. This also instructs formation and delegation of Lagrange multipliers to each residual of $L^{asym}$ whose structure is taken from Taylor's series as follows:

$$\nabla L^{asym} = \left[ \sum_{n=3}^{r} \frac{\nabla}{n!} \left[ \sum_{ij} \lambda_{ij} (g_{ij} - g_{ij}^{recon}) \left\{ \frac{\partial}{\partial g_{ij}^{recon}} \right\}_{g_{ij}^{opt}} \right]^n L + \nabla R_n \right]$$

where $R_n$ is used to assess the error in the calculation.

Continuing to consider algorithms for 3-dimensional data reconstructions, FIG. 19 provides a schematic representation of an embodiment of the invention within single photon emission computed tomography (SPECT) modality as routinely applied in Nuclear Medicine departments. As can be seen the first data acquisition step entails effecting planar projections at a pre-selected number of angular positions on elliptic or circular circumference about the patient undergoing examination. Such projection data are then corrected for non-uniformity in:
    (i) camera rotation;
    (ii) photomultiplier gain;
    (iii) collimator-scintillator crystal response; and
    (iv) centre-of-rotation misalignment.

As compared to current practice the invention introduces the capability to reconstruct projection data to effect noise-reduction (the entropic term) and correct for image degradation due to point spread spatial resolution limitation. This is depicted as Step III in FIG. 19. Subsequently the option of applying a user specified filter (Ramp, Hanning, Butterworth, etc.) to correct artifact from the transaxial reconstruction process of simplistic back projection can be chosen as usual (Step IV). Other steps in the image processing entail attenuation correction and production of data sets containing user selected coronal, sagittal or oblique images (Steps V and VI).

FIGS. 20(a) to 20(c) depict transverse, sagittal and coronal sections through patient undergoing Tc-99m- hexamethyl-propyleneamine oxime (HMPAO) brain study. Quantitative regional cerebral blood distribution of this radiopharmaceutical in patient subjects is an important diagnostic procedure so that a most accurate account of transaxial compound distribution is highly desirable. The latter was achieved with normalized images of Step II being reconstructed subject to primordial entropy constraint in which mean square deviation was minimized (cf. Equations 2b and 7). As is readily appreciable the invention does not introduce any artifice or deleterious effects per se, while providing 3D-reconstruction from empirically corrected projection images.

Application of the methods of this invention to other nuclear medicine 3D-imaging systems as depicted in FIG. 21, whereby a focused lead collimator 74 of fixed focal length, $f_o$, attached to scintillator and PMTs and imaging instrumentation in the conventional manner described in FIG. 1(a) and configured for rectilinear scanning, can also provide maps of patient in vivo radioactivity distributions. Such 3D-imaging systems do not require mathematical transaxial reconstructions as described in the method of FIG. 19, but do however retain features of point spread degradation due to out-of-focus γ-radiation being detected in each pixel measurement. In the latter aspect the system depicted in FIG. 21 is similar to other optical 3D-scanning spectroscopy systems, as described in U.S. Pat. No. 5,737,456 for example, in the respect that focusing collimator can be functionally juxtaposed with corresponding optical lens. However, obvious exceptions in novelty present in the methods of other image reconstruction algorithms, as contrasted to those embodied in the current invention.

Notwithstanding the exclusive application of the invention for position invariant point spread degradation given thus far and the economic and practical consequence of determining point spread for each pixel position, the case of individual pixel point spread mathematical restoration falls under the aegis of this invention. This is because:

(i) The method as prescribed in Equation 2(a) and 2(b) and algorithms of the invention outlined thus far still apply with straight forward substitution for H with its corresponding individual $(kl)^{th}$ pixel representation $H_{kl}$ collected in the manner proposed shortly.

(ii) The system of the invention is amenable to incorporation of further novel instrumentation and a protocol to collect values of $H_{kl}$.

FIG. 22 clearly shows a system for collection of $H_{kl}$ which can be introduced in to the invention as such. It depicts a configuration in which a positioning system similar to a conventional graph plotter 76 under microprocessor control 78 can be used to accurately position a point source of radioisotope in container 80 in the x-y plane of the gamma camera subsequent to some or other selection of pixel grid size 82. Requirement for plug-in to central gamma camera bus lines 84 for sending and receiving control signals is also accounted for. Though the projected time to accumulate such data is longer than that required of single measurement, source decay is not a serious factor when an appropriately intense activity is used. Each pixel response can be accumulated to identical total count, or identical total time period. In the latter case counting statistics are more significant while minor differences in total count are less so, since each $H_{kl}$ is normalized to unity anyway.

With regards economic consequence propagating to the method of the invention:

(i) Firstly, values of $H_{kl}$ for each pixel have to be written to and accessed from hard drive and memory locations.

(ii) There is also an increased load on mathematical operation as more Fourier transform operations have to be performed upon each such pixel point spread response. Then these have to be stored to and accessed from hard drive and/or memory location.

(iii) In performing the algorithms described in FIGS. 7, 8, 16, 17(a) to 17(d), 18 and text access and loading of an increased number of pixel point spread values for mathematical operation increases processing times and load upon processor resources.

FIG. 23 shows a method of processing a digitized phantom image derived from detector instrumentation arrays to form a reconstructed point spread function image, according to a second aspect of the present invention. In particular, this figure shows the determination of a CT scanner point spread function from the measurement of a perspex (adipose equivalent) phantom comprising eight 20 mm×250 mm×250 mm slabs as depicted by:

a rectilinear scan of said phantom in a plate 200, with a 128×128 region sampled for analysis shown separately in plate 202;

the ideal image of the perspex phantom in plate 204;

the CT scanner's point spread function reconstructed from images of plates 202 and 204 in plate 206; and an x-axis profile of plate 206 in plate 208.

The point spread function 206 was reconstructed using the following equation:

$$\nabla S = 2\lambda_0 W D^* W^{-1} \sigma^{-2} g - 2\lambda_0 W D^* W^{-1} \sigma^{-2} W D W^{-1} h$$

Wherein historical entropy was used with the measure of equation 5 applied. D the diagonal matrix representation of the calibration phantom image f(x,y) 204. In this case $g=[g_{ij}]$ and $h=[h_{ij}]$ are the vector representations of the unprocessed 202 and normalized reconstructed point spread function 206 images g(x,y) and h(x,y) respectively. $\nabla$ is the gradient operator over the vector field of h represented by the vector $[\partial/\partial h_{ij}]$. As readily seen this expression exploits the commutative properties of the convolution operation enabling its derivation by the juxtaposition of h with f in Equation 17.

FIG. 24 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

In closing, the present invention provides an image reconstruction method that optimizes the exact, primordial entropy of digitized image signals routine, but by no means confined, to the medical setting. These entropic forms demonstrably provide reconstructions of good local smoothness with retention of high structural definition, improved resolution and reduced noise structure consistently better than unprocessed data. In comparison to other entropic methods, the exact form permits accurate quantification of low count densities, a vital requirement for accurate high frequency imaging where count densities are typically lower and images more diffuse. Significantly, statistical marginalization and regularization are not required, and no individual pixels get excluded in any part of the analysis. Rather, the nonlinear equations are solved exactly for each Lagrange multiplier of choice within a well-defined interval of convergence. Hence an immediate advantage is that there can be no undesirable effects or loss of accuracy in the invention which necessarily propagate from approximations employed by other methods.

Finally, in clinical nuclear medicine scintigraphy where better boundary detections and increased pathologic lesion resolutions are attained by virtue and means of the invention, higher confidence levels should enhance clinical decision making. Also, an attractive possibility that better image resolutions are attainable via entropic filtering at lower patient radiopharmaceutical dosages than unprocessed images acquired at larger patient dosages thus presents.

The invention claimed is:

1. A method of processing a digitized image derived from detector instrumentation to form a reconstructed image comprising the steps of:
   (S1) obtaining the digitized image from an image measuring system comprising the detector instrumentation, and representing the image as a raw image function g(x,y);
   (S2) obtaining for the system a point spread function h(x,y);
   (S3) selecting an analytical form for a reconstructed image entropy distribution S(x,y), a function of statistical measure m(x,y), represented by its image vector $[S_{ij}]$ wherein the following equivalent forms for a total reconstructed image entropy, $$S = \int_\Omega dx\,dy\,S(x,y) x, y \in \Omega \text{ and } S = \sum_{ij} S_{ij}$$

are used;
   (S4) selecting a set of Lagrange multipliers λ(x,y) represented by image vector $\lambda=[\lambda_{ij}]$ and constructing a diagonal matrix representation $\Lambda_0=[\lambda_{ij}]_{diagonal}$ from said image vector components;
   (S5) calculating a variance statistic $\sigma^{-2}$ for normal quadratic statistics and an asymmetric statistic $L^{asym}(\Lambda_0)$ for statistical analysis beyond said normal statistics;
   (S6) selecting the statistical measure m(x,y) represented by an image vector $m=[m_{ij}]$;
   (S7) producing a reconstructed image function f(x,y) using the following restoration equation wherein an iterative process is repeated until the successive change in f(x,y) is smaller than a user defined tolerance:
   $\nabla S = 2WD^*W^{-1}\Lambda_0\sigma^{-2}\Lambda_0(g-WDW^{-1}f)-\nabla L^{asym}(\Lambda_0)$
   further wherein $W^{-1}$ and W denote Fourier transform and Fourier inverse transform matrix operators respectively, D is a diagonal matrix representation of the point spread function h(x,y), $g=[g_{ij}]$ and $f=[f_{ij}]$ are the vector representations of the unprocessed and normalized reconstructed images g(x,y) and f(x,y) respectively and ∇ the gradient operator over the vector field of f represented by the vector $[\partial/\partial f_{ij}]$ and * is the complex conjugation operator; and
   (S8) iteratively repeating steps (S3), (S4), (S5), (S6) and (S7) to determine values for Lagrange multipliers λ(x,y) which optimize the cumulated probability $P^c$ of data reconstruction $g^{recon}(x,y)$, represented as an image vector $g^{recon}=[g_{ij}^{recon}]$ and defined as h(x,y) convoluted with f(x,y), matching g(x,y) further wherein $g^{opt}(x,y)$ represented by image vector $g^{opt}=[g_{ij}^{opt}]$ is the optimum data reconstruction vector at which values said probability is maximal.

2. The method according to claim 1, wherein the historical entropy:

$$S \equiv \sum_{ij} S_{ij} = \sum_{ij} f_{ij} \log_e\left(\frac{f_{ij}}{m_{ij}}\right)$$

is selected and represented in the restoration equation by the following image vector elements:

$\nabla S = [\log_e f_{ij} - \log_e m_{ij} + 1]$.

3. The method according to claim 1, wherein the primordial entropy:

$$S \equiv \sum_{ij} S_{ij} = \sum_{ij} \log_e f_{ij}! - f_{ij}\log_e m_{ij}$$

is selected and represented in the restoration equation by the following image vector elements:

$$\nabla S = \left[ \sum_{k=0}^{\Phi-1 \geq 0} \frac{1}{f_{ij}-k} + \frac{1}{\rho!} \int_0^\infty dx e^{-x} x^\rho \log_e x \cdot \log_e m_{ij} \right] k, \Phi \in Z\ \rho \in R.$$

4. The method according to claim 3, wherein an optimal recursion equation for computing primordial entropy of each specified $f_{ij}$ is selected by computing a correspondingly unique integer $\Phi$ and fractional remainders $\rho$ pair to satisfy $0<\rho=f_{ij}-\Phi<1$.

5. The method according to claim 3, wherein gradient search methods incorporating the Laplacian of entropy, namely:

$$\nabla^2 S = -\phi^2(f_{ij}) + \sum_{k=0}^{\Phi-1 \geq 0} \frac{2\phi(f_{ij}-k-1)}{f_{ij}-k} + \frac{1}{\rho!} \int_0^\infty dx e^{-x} x^\rho (\log_e x)^2$$

wherein:

$$\phi(f_{ij}) = \sum_{k=0}^{\Phi-1 \geq 0} \frac{1}{f_{ij}-k} + \frac{1}{\rho!} \int_0^\infty dx e^{-x} x^\rho \log_e x\ k, \Phi \in Z\ \rho \in R$$

are used in determining solutions to the primordial entropy for each specified value of $f_{ij}$.

6. The method according to claim 5, wherein integrals of the form:

$$\frac{1}{\rho!} \int_0^\infty dx e^{-x} x^\rho \log_e x = \frac{1}{\rho!} \int_0^1 dy (\log_e y^{-1})^\rho \log_e \{\log_e y^{-1}\}$$

and:

$$\frac{1}{\rho!} \int_0^\infty dx e^{-x} x^\rho (\log_e x)^2 = \frac{1}{\rho!} \int_0^1 dy (\log_e y^{-1})^\rho [\log_e \{\log_e y^{-1}\}]^2$$

are calculated using interpolating coefficients derived from numerical values of said integrals computed on a preselected range of $\rho$ values, and further wherein said integrals and said interpolation coefficients are determined prior to the steps (S1-S8).

7. The method according to claim 1, wherein Lagrange multipliers are selected by the steps of initially selecting $\Lambda_0 = \lambda_0\ 1$ wherein the equivalent restoration equation is:

$$\nabla S = 2\Lambda_0 W D^* W^{-1} \sigma^{-2}(g - W D W^{-1} f) - \nabla L^{asym}(\Lambda_0), \text{ and}$$

subsequently selecting $\Lambda_0 = [\lambda_{ij}]_{diagonal}$ for said restoration equation.

8. The method according to claim 1, wherein the statistical measure $m(x,y)$ is set to the following normalized first-order approximation of the entropy functional:

$$m(x,y) = \mathfrak{F}^{-1}\left\{ \frac{2\lambda(x,y) H^*(u,v) G(u,v)}{2\lambda(x,y) |H(u,v)|^2 + 1} \right\}$$

wherein $\mathfrak{F}^{-1}$ represents the inverse Fourier transform operation and $H(u,v)$ and $G(u,v)$ denote the Fourier transforms of $h(x,y)$ and $g(x,y)$, respectively.

9. The method according to claim 1, wherein the image data probability distribution $P(x,y)$, represented as an image vector $[P_{ij}]$, of each data reconstruction $g^{recon}(x,y)$ is set to the following equivalent forms for all convergent sets of $\lambda(x,y)$:

$$P(x,y) = \exp(-S(x,y) - L(x,y))$$

and $$P_{ij} = \exp(-S_{ij} - L_{ij})$$

further wherein the equivalent forms for cumulated probability are:

$$P^c = \exp\left( \int_\Omega dx\,dy\{-S(x,y) - L(x,y)\} \right) x, y \in \Omega$$

and $$P^c = \exp\left( \sum_{ij} -S_{ij} - L_{ij} \right)$$

wherein the natural logarithm of the data probability distribution proportional to $L(x,y)$ is a function of the components of $g$ and $g^{recon}$ represented furthermore as L in its Taylor series expansion at $g^{opt}$ and by its image vector $[L_{ij}]$.

10. The method according to claim 9, wherein said method selects an integer value of $r \geq 3$ prior to computing $$\nabla L^{asym}(\Lambda_0) = \left[ \sum_{n=3}^{r} \frac{\nabla}{n!} \left[ \sum_{ij} \lambda_{ij}(g_{ij} - g_{ij}^{recon}) \left\{ \frac{\partial}{\partial g_{ij}^{recon}} \right\}_{g_{ij}^{opt}} \right]^n L + \nabla R_n \right]$$

wherein $R_n$ is a remainder term used for error assessment when the topology of L is asymmetric with respect to $g^{recon}$ in the vicinity of $g^{opt}$, or the solution $\nabla L^{asym} = 0$ when the topology of L is predominantly symmetric with respect to $g^{recon}$ in the vicinity of $g^{opt}$.

11. The method according to claim 1, wherein $P^c$ is computed from any one of the following formulae containing the row-column transposition operation denoted by the superscripted T:

from $P^c = \exp\{-(g - g^{recon})^T (g - g^{recon})\}$;

from $P^c = \exp\{(g - g^{recon})^T [1/g_{ij}]_{diagonal}(g - g^{recon})\}$, wherein $[1/g_{ij}]_{diagonal}$ is a diagonal matrix constructed from the elements of g;

from $P^c = \exp\{-S - (g - g^{recon})^T (g - g^{recon})\}$; or from $P^c = \exp\{-S - (g - g^{recon})^T [/g_{ij}]_{diagonal}(g - g^{recon})\}$.

12. The method according to claim 1, wherein the step of obtaining a point spread function $h(x,y)$ for the image measuring system further comprises the steps of suspending a radioisotope point source above the detector instrumentation of the image measuring system, and generating a digitized planar point spread function image from the image measuring system for selected co-ordinates of the radioisotope point source relative to the detector instrumentation.

13. The method according to claim 12, wherein either a mean value of $h(x,y)$ is computed and used in the restoration equation, or location dependent point spread functions $h(x,y)$ are used in the restoration equation.

14. The method according to claim 1, which comprises obtaining a set of M multiple digitized planar images g wherein each said image is distinguished by the vector sequencing notation $g_k$, with k ranging from 1 to M.

15. The method according to claim 14, wherein the normal variance statistic $\sigma^{-2}$ is computed in any one of the following ways:

from $$\sigma^{-2} = \left[\frac{1}{M}\sum_{k=1}^{M}(g_k - \bar{g})(g_k - \bar{g})^T\right]^{-1} \quad \bar{g} = \frac{1}{M}\sum_{k=1}^{M}g_k$$

for a static scene wherein the superscripted T denotes row-column transposition;

from $\sigma^{-2}=[(g-g^{recon})(g-g^{recon})^T]^{-1}$ wherein the superscripted T denotes row-column transposition;

from diagonal matrix $\sigma^{-2}=[1/g_{ij}]_{diagonal}$;

from $\sigma^{-2}=I$ the identity matrix; or from $\sigma^{-2}=I$ further wherein the application of Lagrange multipliers are selected by the steps of initially selecting $\Lambda_0$ I wherein the equivalent restoration equation is:

$\nabla S = 2\Lambda_0 WD^*W^{-1}\sigma^{-2}(g-WDW^{-1}f) - \nabla L^{asym}(\Lambda_0)$, and subsequently selecting $\Lambda_0 = [\lambda_{ij}]_{diagonal}$ for said restoration equation provides the following for the restoration equation:

$$\Im\{\nabla S\} = 2\lambda_{ij}\{H^*(u,v)G(u,v) - |H(u,v)|^2 F(u,v)\}$$

wherein $\Im$ represents the Fourier transform operation and H(u,v), G(u,v) and F(u,v) denote the Fourier transforms of h(x,y), g(x,y) and f(x,y) respectively.

16. The method according to claim 1, wherein the statistical measure m is set equal to the reconstructed image $f=[f_{ij}]$ prior to the method being repeated.

17. A non-transitory computer readable medium comprising instructions which, when executed by a machine, cause the machine to perform instructions for:

(I1) obtaining a digitized image from an image measuring system comprising a detector instrumentation, and representing the image as a raw image function g(x,y);

(I2) obtaining for the system a point spread function h(x,y);

(I3) selecting an analytical form for a reconstructed image entropy distribution S(x,y), a function of statistical measure m(x,y), represented by its image vector $[S_{ij}]$ wherein the following equivalent forms for a total reconstructed image entropy, $$S = \int_\Omega dx\,dy\,S(x,y) x, y \in \Omega \text{ and } S = \sum_{ij} S_{ij}$$

are used;

(I4) selecting a set of Lagrange multipliers $\lambda(x,y)$ represented by image vector $\lambda=[\lambda_{ij}]$ and constructing a diagonal matrix representation $\Lambda=[\lambda_{ij}]_{diagonal}$ from said image vector components;

(I5) calculating a variance statistic $\sigma^{-2}$ for normal quadratic statistics and an asymmetric statistic $L^{asym}(\Lambda_0)$ for statistical analysis beyond said normal statistics;

(I6) selecting the statistical measure m(x,y) represented by an image vector $m=[m_{ij}]$;

(I7) producing a reconstructed image function f(x,y) using the following restoration equation wherein an iterative process is repeated until the successive change in f(x,y) is smaller than a user defined tolerance: $\nabla S = 2WD^*W^{-1}\Lambda_0\sigma^{-2}\Lambda_0(g-WDW^{-1}f) - \nabla L^{asym}(\Lambda_0)$ further wherein $W^{-1}$ and W denote Fourier transform and Fourier inverse transform matrix operators respectively, D is a diagonal matrix representation of the point spread function h(x,y), $g=[g_{ij}]$ and $f=[f_{ij}]$ are the vector representations of the unprocessed and normalized reconstructed images g(x,y) and f(x,y) respectively and $\nabla$ the gradient operator over the vector field of f represented by the vector $[\partial/\partial f_{ij}]$ and * is the complex conjugation operator; and (I8) iteratively repeating previous instructions (I3), (I4), (I5), (I6) and (I7) to determine values for Lagrange multipliers $\lambda(x,y)$ which optimize the cumulated probability $P^c$ of data reconstruction $g^{recon}(x,y)$, represented as an image vector $g^{recon}=[g_{ij}^{recon}]$ and defined as h(x,y) convoluted with f(x,y), matching g(x,y) further wherein $g^{opt}(x,y)$ represented by image vector $g^{opt}=[g_{ij}^{opt}]$ is the optimum data reconstruction vector at which values said probability is maximal;

further wherein said instructions being embodied on the non-transitory computer readable medium.

18. An image measuring system for processing a digitized image to form a reconstructed image comprising:

a detector instrumentation for generating a raw image function g(x,y) represented by an image vector $g=[g_{ij}]$, and a point spread function h(x,y) represented by an image vector $h=[h_{ij}]$;

a processor configured to process said image vector g and said point spread function image vector h by performing the steps of:

(S1) obtaining the digitized image from an image measuring system comprising the detector instrumentation, and representing the image as a raw image function g(x,y);

(S2) obtaining for the system a point spread function h(x,y);

(S3) selecting an analytical form for a reconstructed image entropy distribution S(x,y), a function of statistical measure m(x,y), represented by its image vector $[S_{ij}]$ wherein the following equivalent forms for a total reconstructed image entropy, $$S = \int_\Omega dx\,dy\,S(x,y) x, y \in \Omega \text{ and } S = \sum_{ij} S_{ij}$$

are used;

(S4) selecting a set of Lagrange multipliers $\lambda(x,y)$ represented by image vector $\lambda=[\lambda_{ij}]$ and constructing a diagonal matrix representation $\Lambda_0=[\lambda_{ij}]_{diagonal}$ from said image vector components;

(S5) calculating a variance statistic $\sigma^{-2}$ for normal quadratic statistics and an asymmetric statistic $L^{asym}(\Lambda_0)$ for statistical analysis beyond said normal statistics;

(S6) selecting the statistical measure m(x,y) represented by an image vector $m=[m_{ij}]$;

(S7) producing a reconstructed image function f(x,y) using the following restoration equation wherein an iterative process is repeated until the successive change in f(x,y) is smaller than a user defined tolerance:

$\nabla S = 2WD^*W^{-1}\Lambda_0\sigma^{-2}\Lambda_0(g-WDW^{-1}f) - \nabla L^{asym}(\Lambda_0)$ further wherein $W^{-1}$ and W denote Fourier transform and Fourier inverse transform matrix operators respectively, D is a diagonal matrix representation of the point spread function h(x,y), $g=[g_{ij}]$ and $f=[f_{ij}]$ are the vector representations of the unprocessed and normalized reconstructed images g(x,y) and f(x,y)

respectively and ∇ the gradient operator over the vector field of f represented by the vector $[\partial/\partial f_{ij}]$ and * is the complex conjugation operator; and (S8) iteratively repeating steps (S3), (S4), (S5), (S6) and (S7) to determine values for Lagrange multipliers $\lambda(x,y)$ which optimize the cumulated probability $P^c$ of data reconstruction $g^{recon}(x,y)$, represented as an image vector $g^{recon}=[g_{ij}^{recon}]$ and defined as $h(x,y)$ convoluted with $f(x,y)$, matching $g(x,y)$ further wherein $g^{opt}(x,y)$ represented by image vector $g^{opt}=[g_{ij}^{opt}]$ is the optimum data reconstruction vector at which values said probability is maximal;

a memory means for storing at least the image vectors g, h, m, $\lambda$, $[S_{ij}]$ and f; and a visual display means for displaying the reconstructed image vector f.

19. The image measuring system according to claim 18, wherein the detector instrumentation comprises: an emission or transmission photon radiation source; a beam collimating device; a scintillator; an analogue detector including a photomultiplier tube; analogue-to-digital signal conversion circuitry; and position logic circuitry.

20. The image measuring system according to claim 18, wherein the detector instrumentation comprises: a transducer including a piezoelectric crystal array; source signal generating circuitry; circuitry for reflected acoustic signal detection; and analogue-to-digital signal conversion circuitry.

* * * * *